(12) United States Patent
Kurosawa et al.

(10) Patent No.: US 8,947,732 B2
(45) Date of Patent: Feb. 3, 2015

(54) PRINT CONTROL DEVICE AND PRINT CONTROL METHOD

(71) Applicants: Masanori Kurosawa, Tokyo (JP); Hiroaki Suzuki, Chiba (JP); Masato Iio, Kanagawa (JP); Tadashi Kasai, Kanagawa (JP); Makoto Yasuda, Kanagawa (JP); Masakazu Terao, Kanagawa (JP); Yuichi Aizawa, Kanagawa (JP); Yoichi Sakurai, Kanagawa (JP)

(72) Inventors: Masanori Kurosawa, Tokyo (JP); Hiroaki Suzuki, Chiba (JP); Masato Iio, Kanagawa (JP); Tadashi Kasai, Kanagawa (JP); Makoto Yasuda, Kanagawa (JP); Masakazu Terao, Kanagawa (JP); Yuichi Aizawa, Kanagawa (JP); Yoichi Sakurai, Kanagawa (JP)

(73) Assignee: Ricoh Company, Limited, Tokyo (JP)

( * ) Notice: Subject to any disclaimer, the term of this patent is extended or adjusted under 35 U.S.C. 154(b) by 0 days.

(21) Appl. No.: 13/861,769

(22) Filed: Apr. 12, 2013

(65) Prior Publication Data

US 2013/0278943 A1    Oct. 24, 2013

(30) Foreign Application Priority Data

Apr. 18, 2012 (JP) ................................ 2012-095168

(51) Int. Cl.

| H04N 1/60 | (2006.01) |
|---|---|
| G06F 15/00 | (2006.01) |
| G06K 1/00 | (2006.01) |
| G03G 15/01 | (2006.01) |
| G03G 15/00 | (2006.01) |
| G06K 15/12 | (2006.01) |
| G06K 15/02 | (2006.01) |

(52) U.S. Cl.

CPC ........ *G03G 15/0121* (2013.01); *G03G 15/6585* (2013.01); *G06K 15/129* (2013.01); *G06K 15/1867* (2013.01)

USPC .......................................... 358/1.9; 358/3.23

(58) Field of Classification Search

CPC ............ G06K 15/129; G06K 15/1867; G06G 15/0121; G06G 15/6585
USPC .......................... 358/1.1, 1.9, 3.23, 3.33, 3.24
See application file for complete search history.

(56) References Cited

U.S. PATENT DOCUMENTS 5,915,144 A    6/1999    Ide et al.

(Continued)

FOREIGN PATENT DOCUMENTS

| JP | 4-204670 | 7/1992 |
|---|---|---|
| JP | 4-278967 | 10/1992 |
| JP | 7-038084 | 2/1995 |

(Continued)

*Primary Examiner* — Douglas Tran
(74) *Attorney, Agent, or Firm* — Oblon, Spivak, McClelland, Maier & Neustadt, L.L.P.

(57) ABSTRACT

An inverse image data generating unit that generates inverse image data that indicates a transparent developer amount that indicates an amount of a transparent developer, and a region where the transparent developer amount is used, based on a color plane image data that indicates a color developer amount that indicates an amount of a color developer, and a region where the color developer amount is used; a conversion unit that converts the transparent developer amount of the inverse image data into a transparent developer amount larger than the transparent developer amount by referring to a conversion table; and a transparent developer plane image data generating unit that generates transparent developer plane image data used in image formation of a transparent developer in an image forming apparatus based on the inverse image data indicating a transparent developer amount after the conversion.

3 Claims, 22 Drawing Sheets

(56) References Cited

U.S. PATENT DOCUMENTS

| | | |
|---|---|---|
| 8,477,376 B2 * | 7/2013 | Robinson et al. ............... 358/1.9 |
| 8,606,132 B2 * | 12/2013 | Tanimura et al. ................ 399/54 |
| 2012/0062956 A1 | 3/2012 | Kitagawa et al. |
| 2012/0063802 A1 | 3/2012 | Suzuki et al. |

FOREIGN PATENT DOCUMENTS

| | | |
|---|---|---|
| JP | 7-072696 | 3/1995 |
| JP | 3066995 | 5/2000 |
| JP | 3518257 | 2/2004 |
| JP | 2007-286510 | 11/2007 |

\* cited by examiner

| GLOSS CONTROL NAME | GLOSS | DEVIATION |
|---|---|---|
| SPECULAR GLOSS (PG) | Gs≥80 | ΔGs≤10 |
| SOLID GLOSS (G) | Gs=Gs (SOLID GLOSS) | ΔGs≤10 |
| HALFTONE MATT (M) | Gs=Gs (1C 30% HALFTONE DOT) | ΔGs≤10 |
| MATT (PM) | Gs≤10 | ΔGs≤10 |

GLOSS-CONTROL PLANE IMAGE DATA

▨ : REGION WHERE PG IS DESIGNATED (DENSITY RATIO 98%)

▩ : REGION WHERE G IS DESIGNATED (DENSITY RATIO 90%)

▤ : REGION WHERE M IS DESIGNATED (DENSITY RATIO 16%)

CLEAR PLANE IMAGE DATA

| TYPES OF SURFACE EFFECT DESIGNATED BY USER | DENSITY RATIO OF GLOSS-CONTROL PLANE [%] |
|---|---|
| PG | 98% |
| G | 90% |
| M | 16% |
| PM | 6% |

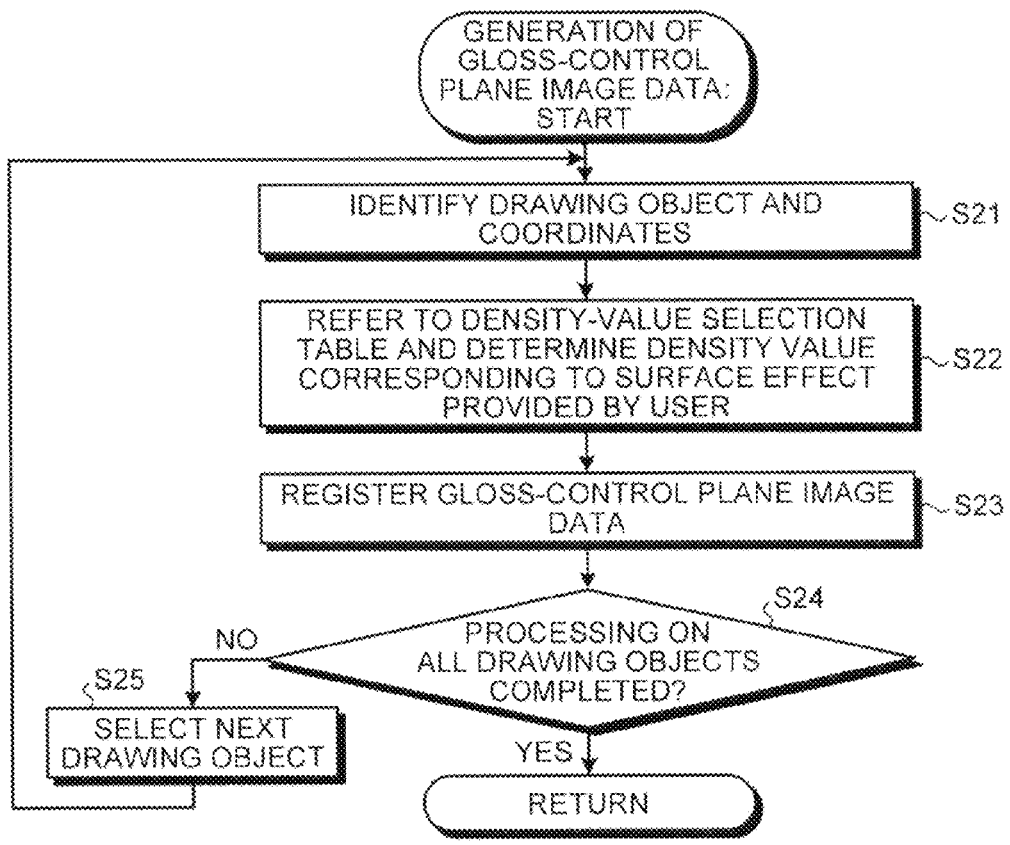

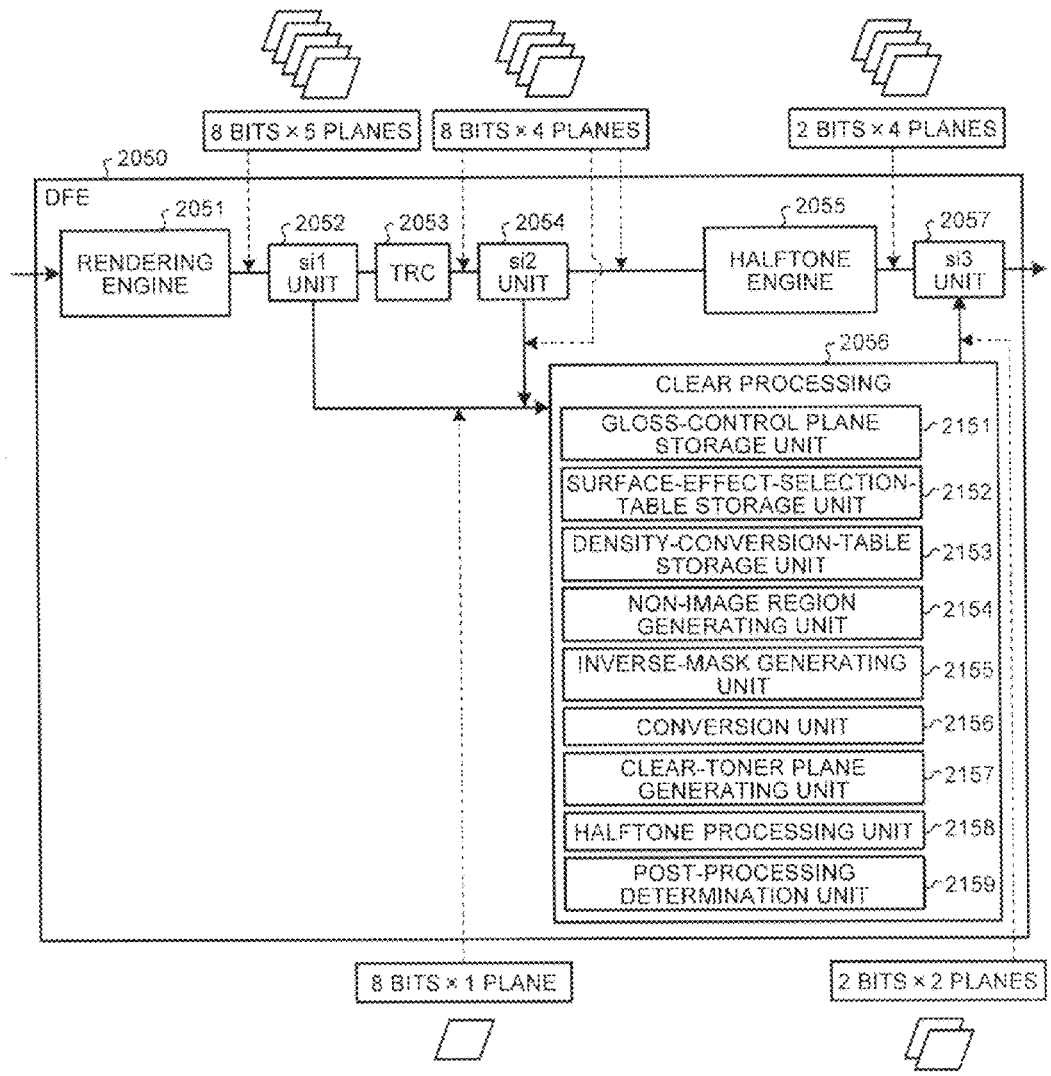

FIG.15

| DENSITY RATIO (%) | DENSITY VALUE REPRESENTATIVE VALUE | DENSITY VALUE NUMERIC RANGE | | SURFACE EFFECTS | GLOSSER ON/OFF (ON-OFF INFORMATION) | CLEAR TONER PLANE 1 (PRINTER DEVICE) | CLEAR TONER PLANE 2 (LOW-TEMPERATURE FIXING DEVICE) |
|---|---|---|---|---|---|---|---|
| 98% | 250 | 248 | 255 | SPECULAR GLOSS TYPE A | ON | INVERSE MASK A | NO DATA |
| 96% | 245 | 243 | 247 | SPECULAR GLOSS TYPE B | ON | INVERSE MASK B | NO DATA |
| 94% | 240 | 238 | 242 | SPECULAR GLOSS TYPE C | ON | INVERSE MASK C | NO DATA |
| 92% | 235 | 233 | 237 | RESERVED | | | |
| 90% | 230 | 228 | 232 | SOLID GLOSS TYPE 1 | OFF | INVERSE MASK 1 | NO DATA |
| 88% | 224 | 222 | 227 | SOLID GLOSS TYPE 2 | OFF | INVERSE MASK 2 | NO DATA |
| 86% | 219 | 217 | 221 | SOLID GLOSS TYPE 3 | OFF | INVERSE MASK 3 | NO DATA |
| 84% | 214 | 212 | 216 | SOLID GLOSS TYPE 4 | OFF | INVERSE MASK 4 | NO DATA |
| 82% | 209 | 207 | 211 | RESERVED | | | |
| 46% | 117 | 115 | 119 | RESERVED | | | |
| 44% | 112 | 110 | 114 | WATERMARK CHARACTER 3 (XXX) | OFF | NO DATA | TILE CHARACTER STRING 3 |
| 42% | 107 | 105 | 109 | WATERMARK CHARACTER 2 (REPRODUCTION PROHIBITED) | | NO DATA | TILE CHARACTER STRING 2 |
| 40% | 102 | 100 | 104 | WATERMARK CHARACTER 1 (SAMPLE) | | NO DATA | TILE CHARACTER STRING 1 |
| 38% | 97 | 95 | 99 | RESERVED | | | |
| 36% | 92 | 90 | 94 | RESERVED | | | |
| 34% | 87 | 85 | 89 | BACKGROUND PATTERN 3 (XXX) | | NO DATA | TILE BACKGROUND PATTERN 3 |
| 32% | 82 | 80 | 84 | BACKGROUND PATTERN 2 (GRID) | | NO DATA | TILE BACKGROUND PATTERN 2 |
| 30% | 76 | 74 | 79 | BACKGROUND PATTERN 1 (WAVE) | | NO DATA | TILE BACKGROUND PATTERN 1 |
| 28% | 71 | 69 | 73 | RESERVED | | | |
| 26% | 66 | 64 | 68 | RESERVED | | | |
| 24% | 61 | 59 | 63 | TEXTURE PATTERN TYPE 3 (ROUGH) | | NO DATA | TILE MESH PATTERN 3 |
| 22% | 56 | 54 | 58 | TEXTURE PATTERN TYPE 2 (MIDDLE) | | NO DATA | TILE MESH PATTERN 2 |
| 20% | 51 | 49 | 53 | TEXTURE PATTERN TYPE 1 (THIN) | | NO DATA | TILE MESH PATTERN 1 |
| 18% | 46 | 44 | 48 | RESERVED | | | |
| 16% | 41 | 39 | 43 | HALFTONE MATT 4 | OFF | HALFTONE 4 | NO DATA |
| 14% | 36 | 34 | 38 | HALFTONE MATT 3 | OFF | HALFTONE 3 | NO DATA |
| 12% | 31 | 29 | 33 | HALFTONE MATT 2 | OFF | HALFTONE 2 | NO DATA |
| 10% | 25 | 23 | 28 | HALFTONE MATT 1 | OFF | HALFTONE 1 | NO DATA |
| 8% | 20 | 18 | 22 | RESERVED | | | |
| 6% | 15 | 13 | 17 | MATT TYPE C | ON&OFF | NO DATA | MATT |
| 4% | 10 | 8 | 12 | MATT TYPE B | ON&OFF | NO DATA | MATT |
| 2% | 5 | 1 | 7 | MATT TYPE A | ON&OFF | NO DATA | MATT |
| 0% | 0 | 0 | 0 | NONE | OFF | NO DATA | NO DATA |

BEFORE COOLING AND REMOVING

AFTER COOLING AND REMOVING

FIG.19A
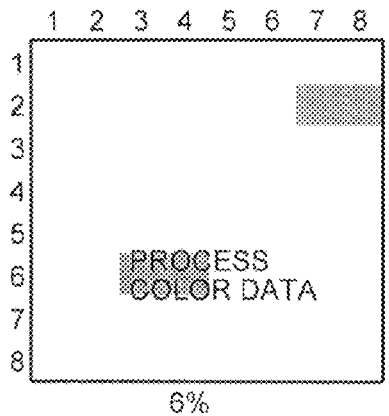
ORIGINAL IMAGE DATA
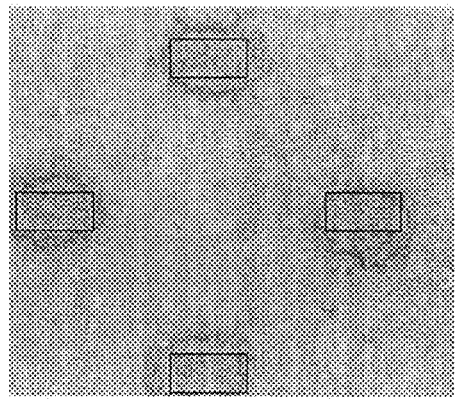
OUTPUT IMAGE
FIG.19B
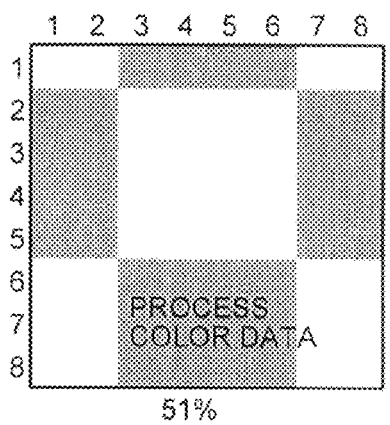
ORIGINAL IMAGE DATA
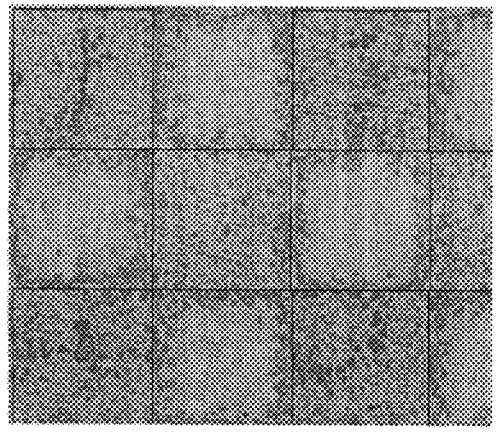
OUTPUT IMAGE
FIG.19C
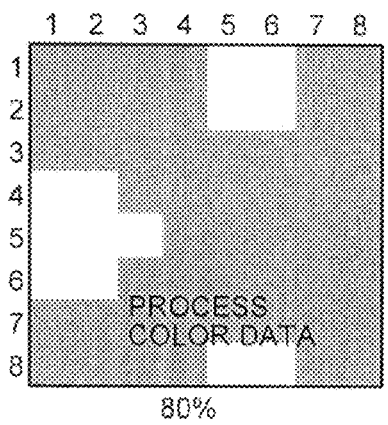
ORIGINAL IMAGE DATA
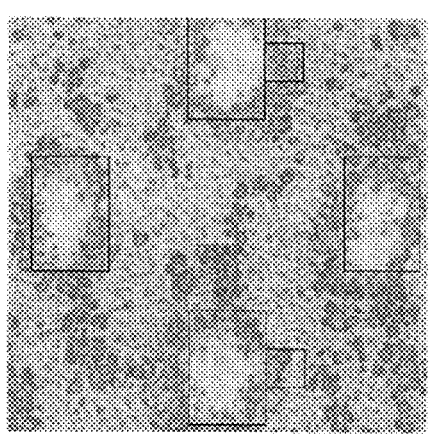
OUTPUT IMAGE

PRINT CONTROL DEVICE AND PRINT CONTROL METHOD

CROSS-REFERENCE TO RELATED APPLICATIONS

The present application claims priority to and incorporates by reference the entire contents of Japanese Patent Application No. 2012-095168 filed in Japan on Apr. 18, 2012.

BACKGROUND OF THE INVENTION

1. Field of the Invention

The present invention relates to a print control device and a print control method.

2. Description of the Related Art

In the past, there have been image forming apparatuses that incorporates a clear toner therein, in addition to CMYK four-color toners, the clear toner being a colorless toner that does not contain color materials. A toner image formed by the clear toner is fixed on a recording medium, such as a transfer paper, on which an image by the CMYK toners is formed. As a result, a visual effect or a tactile effect (called a surface effect) is realized on the recording medium. As a technology related to a clear toner, Japanese Patent No. 3518257 discloses a technology that uniformly reproduces high glossiness on a transfer material by developing a clear toner, for example.

Also, with an objective to acquire a high-quality image where glossiness is controlled and uneven gloss is prevented, while saving energy at a low cost, Japanese Patent Application Laid-open No. 2007-286510 discloses a technology that provides heat required for leveling a surface of a toner image on a surface of an image-quality control roller by allowing a heat pipe array as a heat transfer means to contact with a surface of a heat roller and the surface of the image-quality control roller, without causing the image-quality control roller to have own heat source.

However, there may be a case in an image forming apparatus where an image with a color toner is formed on a region, which is different from a region designated with an original data as an object of image forming, due to variable factors, such as a dot gain and a misregistration. Therefore, if a position on which a clear-toner image is formed is simply determined based on the original data, a clear-toner image according to the variable factors cannot be formed, and therefore, it is difficult to uniformly provide high glossiness over the whole sheet of paper on which an image is formed with a clear toner.

In view of the foregoing, there is needed to provide a print control device and a print control method using a clear toner capable of realizing a surface effect that provides high glossiness even in a case where a dot gain or a misregistration is caused in an image forming apparatus.

SUMMARY OF THE INVENTION

It is an object of the present invention to at least partially solve the problems in the conventional technology.

According to the present invention, there is provided: a print control device comprising: a color plane image data acquisition unit configured to acquire a color plane image data used in an image forming apparatus and indicating a color developer amount that indicates an amount of one or more color developers, and a region where the color developer amount is used; an inverse image data generating unit configured to calculate a value obtained by subtracting a total amount of the one or more color developers allocated to the region from a predetermined value based on the color plane image data, and, by using a calculated value as an amount of a transparent developer used in the image forming apparatus, to generate inverse image data indicating a transparent developer amount that indicates the amount of a transparent developer, and a region where the transparent developer amount is used; a storage unit storing a conversion table configured to convert a first transparent developer amount into a second transparent developer amount determined based on the first transparent developer amount and larger than the first transparent developer amount; a conversion unit configured to convert the transparent developer amount of the inverse image data into the transparent developer amount larger than the transparent developer amount by referring to the conversion table; and a transparent developer plane image data generating unit configured to generate transparent developer plane image data used in image formation of the transparent developer in the image forming apparatus based on the inverse image data indicating the transparent developer amount after the conversion by the conversion unit.

The invention also provides a print control device comprising: a color plane image data acquisition unit configured to acquire a color plane image data used in an image forming apparatus and indicating a color developer amount indicating an amount of one or more color developers with a multi value larger than a binary, and a region where the color developer amount is used; an inverse image data generating unit configured to calculate a value obtained by subtracting a total amount of one or more color developers allocated to the region from a predetermined value based on the color plane image data, and, by using a calculated value as an amount of a transparent developer used in the image forming apparatus, to generate inverse image data indicating an transparent developer amount that indicates the amount of a transparent developer, and a region where the transparent developer amount is used; a halftone processing unit configured to binarize the transparent developer amount indicated with the multi value in the inverse image data by halftone processing; an expansion processing unit configured to expand an area of a region designated to use the transparent developer by the halftone processing unit; and a transparent developer plane image data generating unit configured to generate transparent developer plane image data for forming an image of a transparent developer in the image forming apparatus based on the inverse image data after expanded by the expansion processing unit.

The invention also provides a print control method executed in a print control device that generates transparent developer plane image data used for image formation of a transparent developer in an image forming apparatus.

In the print control method mentioned above, the print control device including a storage unit storing a conversion table configured to convert a first transparent developer amount that is an amount of a transparent developer used for image formation into a second transparent developer amount determined based on the first transparent developer amount and larger than the first transparent developer amount, and the method comprising: a step of acquiring color plane image data used in the image forming apparatus and indicating a color developer amount that indicates an amount of one or more color developers, and a region where the color developer amount is used; a step of calculating a value obtained by subtracting a total amount of the one or more color developers allocated to the region from a predetermined value based on the color plane image data, and, by using a calculated value as an amount of a transparent developer used in the image forming apparatus, generating inverse image data indicating a transparent developer amount that indicates the amount of a transparent developer, and a region where the transparent developer amount is used; a step of converting the transparent developer amount of the inverse image data into the transparent developer amount larger than the transparent developer amount by referring to the conversion table; and a step of generating transparent developer plane image data used in image formation of the transparent developer in the image forming apparatus based on the inverse image data indicating the transparent developer amount after the conversion by the conversion unit.

The above and other objects, features, advantages and technical and industrial significance of this invention will be better understood by reading the following detailed description of presently preferred embodiments of the invention, when considered in connection with the accompanying drawings.

BRIEF DESCRIPTION OF THE DRAWINGS

FIG. 12 is a flowchart of a procedure of generation processing of gloss-control plane image data;

FIG. 13 is a diagram illustrating a corresponding relation among a drawing object, coordinates, and a density value in the gloss-control plane image data of FIG. 4;

FIG. 14 is a diagram exemplarily illustrating a configuration of a DFE;

FIG. 15 is a diagram exemplarily illustrating a data configuration of a surface-effect selection table;

FIG. 19A is a diagram illustrating original image data and an output image;

FIG. 19B is a diagram illustrating original image data and an output image;

FIG. 19C is a diagram illustrating original image data and an output image;

DETAILED DESCRIPTION OF THE PREFERRED EMBODIMENTS

Figure 1:
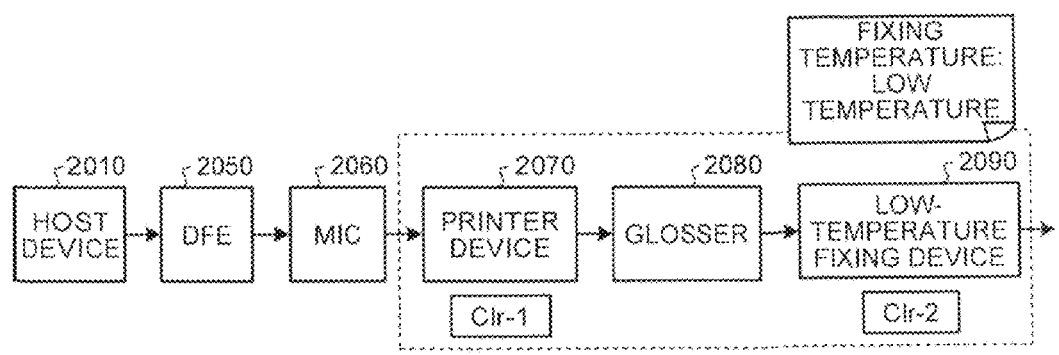
FIG. 1 is a diagram exemplarily illustrating a configuration of an image forming system according to a first embodiment.

Hereinafter, an embodiment of a print control device, a print control method, and a computer-readable recording medium including a program will be described in detail with reference to the appended drawings.

First, a configuration of an image forming system according to a present embodiment will be described with reference to FIG. 1. In the present embodiment, the image forming system is configured such that a printer control device (DFE: Digital Front End) 2050 (hereinafter, referred to as "DFE 2050"), an interface controller (MIC: Mechanism I/F Contoroller) 2060 (hereinafter, referred to as "MIC 2060"), a printer device 2070, and a glosser 2080 and a low-temperature fixing device 2090 as a post-processing devices are connected. The DFE 2050 communicates with the printer device 2070 via the MIC 2060, and controls formation of an image in the printer device 2070. Also, the DFE 2050 is connected with a host device 2010 such as a personal computer (PC), and the DFE 2050 receives image data from the host device 2010, generates image data to be used by the printer device 2070 to form a toner image in accordance with CMYK toners and a clear toner, and transmits the generated image data to the printer device 2070 via the MIC 2060. The printer device 2070 includes at least color toners of cyan (C), magenta (M), yellow (Y), and black (K), and a clear toner, and includes an image forming unit including a photosensitive element, a charger, a developing unit, and a photosensitive element cleaner, an exposing unit, and a fixing unit for each toner.

Here, the clear toner is a transparent (colorless) toner that does not include a color material. Note that the transparent (colorless) indicates that transmissivity is 70% or more.

The printer device 2070 forms a toner image of each of toner on the photosensitive element by exposing with a light beam from the exposing unit in accordance with the image data transmitted from the DFE 2050 via the MIC 2060, transfers the toner image on a sheet of paper as a recording medium, and fixes the toner image to the sheet by heating and pressurizing at a temperature in a predetermined range (a normal temperature) by the fixing unit. As a result, an image is formed on the sheet. The sheet of paper is one example of the recording medium, and the recording medium is not limited to the sheet of paper. For example, a synthetic paper, a vinyl paper, and the like can be applied as the recording medium.

ON and OFF of the glosser 2080 is controlled with on-off information designated by the DFE 2050. When turned ON, the glosser 2080 pressurizes the image formed on the sheet by the printer device 2070 at a high pressure and a high temperature. Following that, the sheet having the image formed thereon is cooled and removed from a main body. Consequently, the total amount of toner attached to each pixel, which is more than a predetermined amount, can be uniformly compressed over the whole image formed on the sheet. The low-temperature fixing device 2090 includes a clear-toner image forming unit having a photosensitive element, a charger, a developing unit, and a photosensitive-element cleaner, an exposing unit, and a fixing unit for fixing a clear toner, and receives clear-toner plane image data generated by the DFE 2050 for using the low-temperature fixing device 2090, which will be described below. When the DFE 2050 generates the clear-toner plane image data (hereinafter, referred to as "clear-toner plane data") to be used by the low-temperature fixing device 2090, the low-temperature fixing device 2090 generates a toner image with the clear toner using the image data, superimposes the toner image on the sheet pressurized by the glosser 2080, and fixes the toner image on the sheet by the fixing unit with heat or a pressure that is lower than normal heat or pressure.

The host device 2010 generates image data with a pre-installed image processing application (an image processing unit 2120, a plane data generating unit 2122, a print data generating unit 2123, and the like, which will be described below), and transmits the image data to the DFE 2050. Such an image processing application can handle image data of a special-color plane with respect to image data in which a value of density (referred to as a "density value") of each color in each color plane such as an RGB plane or a CMYK plane is defined for each pixel. The special-color plane is image data used for adding a special toner or ink, such as white, gold, and silver, in addition to basic colors such as CMYK and RGB. The special-color plane may be used for adding R to CMYK basic colors or adding Y to RGB basic colors in order to improve color reproducibility. Typically, the clear toner has been handled as one of the special colors.

In the embodiments, the clear toner as the special color is used for forming a surface effect that is a visual or tactile effect to be provided to a sheet of paper, and for forming a transparent image, such as a watermark or a texture, other than the above surface effect.

Therefore, the image processing application in the host device 2010 generates image data of a color plane (hereinafter, also referred to as "color plane image data") as well as image data of a gloss-control plane (hereinafter, also referred to as "gloss-control plane image data") and/or image data of a clear plane (hereinafter, also referred to as "clear plane image data") as image data of the special-color plane (hereinafter, also referred to as "special-color plane image data") according to designation made by a user, with respect to input image data.

Figure 2:
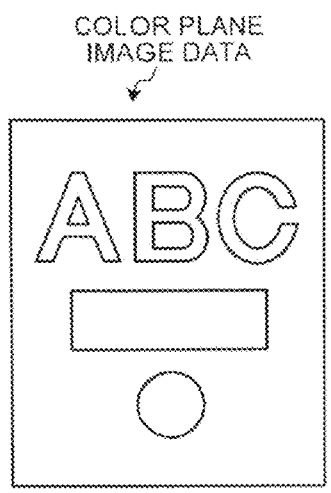
FIG. 2 is a diagram illustrating an example of color plane image data.

The color plane image data is image data in which a density value of a color such as RGB or CMYK is defined for each pixel. In the color plane data, one pixel is expressed in eight bits according to a color designated by a user. FIG. 2 is a diagram illustrating an example of color plane image data. In FIG. 2, a density value corresponding to a color designated by a user through the image processing application is provided to each of drawing objects such as "A", "B", and "C".

The gloss-control plane image data is image data in which a region to which a surface effect is to be provided and a type of the surface effect are identified in order to control adhesion of the clear toner in accordance with the surface effect that is a visual or a tactile effect to be applied to a sheet.

In the gloss-control plane image data, each pixel is expressed in eight bits with a density value in a range from "0" to "255" similarly to the color plane image data of RGB, CMYK, and the like, and a type of the surface effect is associated with the density value (the density value may be expressed by 16 bits or 32 bits, or 0 to 100%). The same value is set to a range to which the same surface effect is to be applied regardless of the density of the clear toner to be actually attached. Therefore, if needed, it is possible to easily identify the region from the image data without data that indicates the region. That is, the gloss-control plane image data indicates the type of the surface effect and the region to which the surface effect is provided (data indicating the region may be additionally provided). In this example, the density value of the gloss-control plane image data can be taken as a gloss-control value for identifying a type of a surface effect that is a visual or a tactile effect to be provided in a recording medium and a region in the recording medium to which the surface effect is provided.

Here, the host device 2010 generates the gloss-control plane image data in a vector format by setting a type of the surface effect for a drawing object designated by a user through the image processing application as a density value that is the gloss-control value for each drawing object.

Each pixel that configures the gloss-control plane image data corresponds to a pixel of the color plane image data. Note that the color plane image data and the gloss-control plane image data are configured in page units. In the color plane image data and the gloss-control plane image data, the density value indicated by each pixel becomes a pixel value. Here, the density value of a pixel of each image data is corresponding to an amount of toner attached to a corresponding recording medium, that is, an amount of toner used in the printer device 2070.

The types of the surface effects include the existence of gloss, surface protection, a watermark with embedded information, and a texture. As the surface effect related to the existence of gloss, as exemplarily illustrated in FIG. 3, there are mainly the following four types: specular gloss (Premium Gloss (PG)); solid gloss (Gloss (G)); halftone matt (Matt (M)); and matt (Premium Matt (PM)) in descending order of the degree of gloss (glossiness). Hereinafter, the specular gloss may be referred to as "PG", the solid gloss may be referred to as "G", the halftone matt may be referred to as "M", and the matt may be referred to as "PM".

The specular gloss and the solid gloss have a higher degree of providing gloss while the halftone matt and the matt are used for reducing gloss. In particular, the matt is used for realizing lower glossiness than the glossiness of a normal sheet of paper. In the drawing, the specular gloss indicates the glossiness Gs of 80 or more, the solid gloss indicates the solid glossiness of a primary color or a secondary color, the halftone matt indicates the glossiness of a primary color and halftone dots of 30%, and the matt indicates the glossiness of 10 or more. Also, the deviation of the glossiness is expressed by ΔGs, and is set to be 10 or less. For the above types of the surface effects, high density values are associated with the surface effect having the higher degree of providing gloss, and low density values are associated with the surface effect that reduces gloss. Intermediate density values are associated with the other surface effects, such as the watermark and the texture. As the watermark, a character or a background pattern may be used. The texture shows a character or a pattern, and can give a tactile effect in addition to a visual effect. For example, a stained glass pattern can be realized by a clear toner. The surface protection is realized by using the specular gloss or the solid gloss as a substitute for the surface protection. A region to which a surface effect is to be applied in an image indicated by image data to be processed and a type of the surface effect to be provided are designated by a user through the image processing application. The after-mentioned host device 10 that executes the image processing application generates gloss-control plane image data by setting a density value corresponding to the surface effect designated by the user with respect to a drawing object that configures the region designated by the user. A corresponding relation between the density value and the type of the surface effect will be described below.

Figures 3, 4:
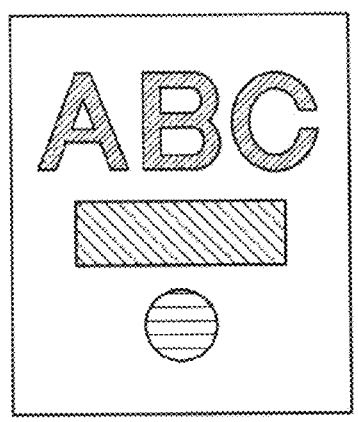
FIG. 3 is a diagram exemplarily illustrating types of surface effects related to existence of gloss.
FIG. 4 is a diagram illustrating gloss-control plane image data as an image.

FIG. 4 is an explanatory diagram illustrating an example of the gloss-control plane image data. In the example of the gloss-control plane illustrated in FIG. 4, a case is illustrated in which the surface effect "PG (specular gloss)" is provided to a drawing object "ABC", the surface effect "G (solid gloss)" is provided to a drawing object "a rectangle", and the surface effect "M (halftone matt)" is provided to a drawing object "a circle" by the user. The density ratio of each surface effect is designated by the user from among the density ratio determined in accordance with the type of the surface effect in a density-value selection table (see FIG. 9) to be described below.

Note that, in the present embodiment, the user designates density of gloss-control plane image data or clear plane image data in density ratio in a range from 0 to 100%. Then, in the image forming system, the density ratio from 0 to 100% is converted into a density value in a range from 0 to 255 in the host device 2010 described below.

Figure 5:
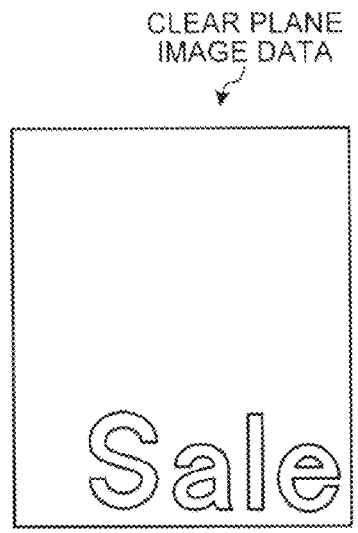
FIG. 5 is a diagram illustrating an example of clear plane image data.

The clear plane image data is image data in which a transparent image such as a watermark or a texture, other than the above-described surface effects is designated. FIG. 5 is an explanatory diagram illustrating an example of the clear-toner plane image data. In the example illustrated in FIG. 5, a watermark "Sale" is designated by the user.

As described above, the gloss-control plane image data and the clear plane image data that are the special-color image data are generated with the image processing application in the host device 2010 in separate planes from the color plane image data. A portable document format (PDF) is used as an image data format of each of the color plane image data, the gloss-control plane image data, and the clear plane image data, and the PDF image data of each plane are integrated into document data. Note that the data format of the image data of each plane is not limited to PDF, and any formats may be used.

Figure 6:
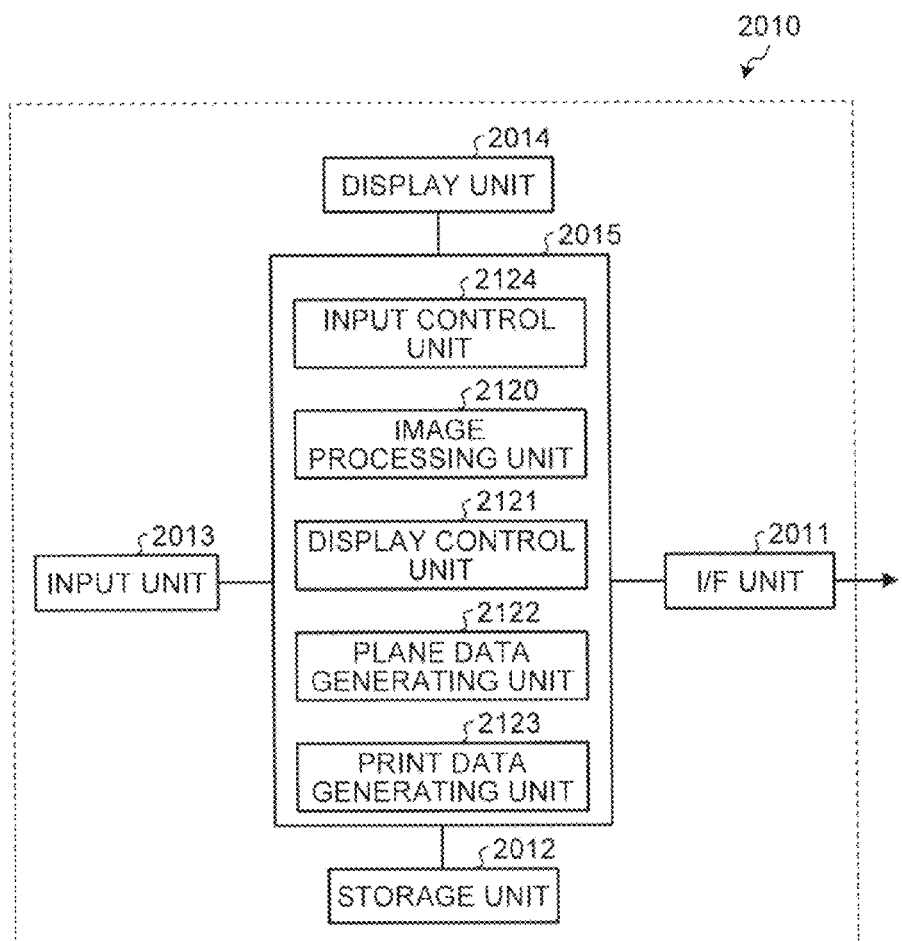
FIG. 6 is a block diagram illustrating a schematic configuration example of a host device.

Next, the host device 2010 that generates image data of each plane will be explained below. FIG. 6 is a block diagram of a schematic configuration example of the host device 2010. As illustrated in FIG. 6, the host device 2010 includes an I/F unit 2011, a storage unit 2012, an input unit 2013, a display unit 2014, and a control unit 2015. The I/F unit 2011 is an interface device for communicating with the DFE 2050. The storage unit 2012 is a storage medium such as a hard disk drive (HDD) or memory that stores various types of data. The input unit 2013 is an input device used for inputting various operation by the user, and can be configured from a keyboard, a mouse, and the like, for example. The display unit 2014 is a display device for displaying various screens, and can be configured from a liquid crystal panel and the like, for example.

The control unit 2015 is a computer that controls the entire host device 2010, and includes a CPU, ROM, RAM, and the like. As illustrated in FIG. 6, the control unit 2015 mainly includes an input control unit 2124, the image processing unit 2120, a display control unit 2121, the plane data generating unit 2122, and the print data generating unit 2123. The input control unit 2124 and the display control unit 2121 among these units are realized by causing the CPU of the control unit 2015 to read a program of an operating system stored in the ROM or the like, to load the program into the RAM, and to execute the loaded program. The image processing unit 2120, the plane data generating unit 2122, and the print data generating unit 2123 are realized by causing the CPU of the control unit 2015 to read a program of the image processing application stored in the ROM or the like, to load the program to the RAM, and to execute the loaded program. Here, the plane data generating unit 2122 is provided as, for example, a plug-in function installed in the image processing application. It is possible to realize at least a part of the above units by an individual circuit (hardware).

The input control unit 2124 receives various types of input from the input unit 2013, and controls the input. For example, a user can input, by operating the input unit 2013, image designation information for designating color plane image data to which a surface effect is to be provided, (hereinafter, appropriately referred to as a "target image") from among various images (for example, a photograph, a character, a figure, and a composite image of a photograph, a character, and a figure) stored in the storage unit 2012. Note that a method of inputting the image designation information is not limited to the above, and any methods may be employed.

The display control unit 2121 controls display of various types of information on the display unit 2014. In the present embodiment, when the input control unit 2124 receives the image designation information, the display control unit 2121 reads out an image designated in the image designation information from the storage unit 2012, and controls the display unit 2014 to display the read image on a screen.

The user can input designation information for designating a region to which a surface effect is provided and a type of the surface effect by operating the input unit 2013 while checking the target image displayed on the display unit 2014. Note that a method of inputting the designation information is not limited to the above, and any methods may be employed.

Figure 7:
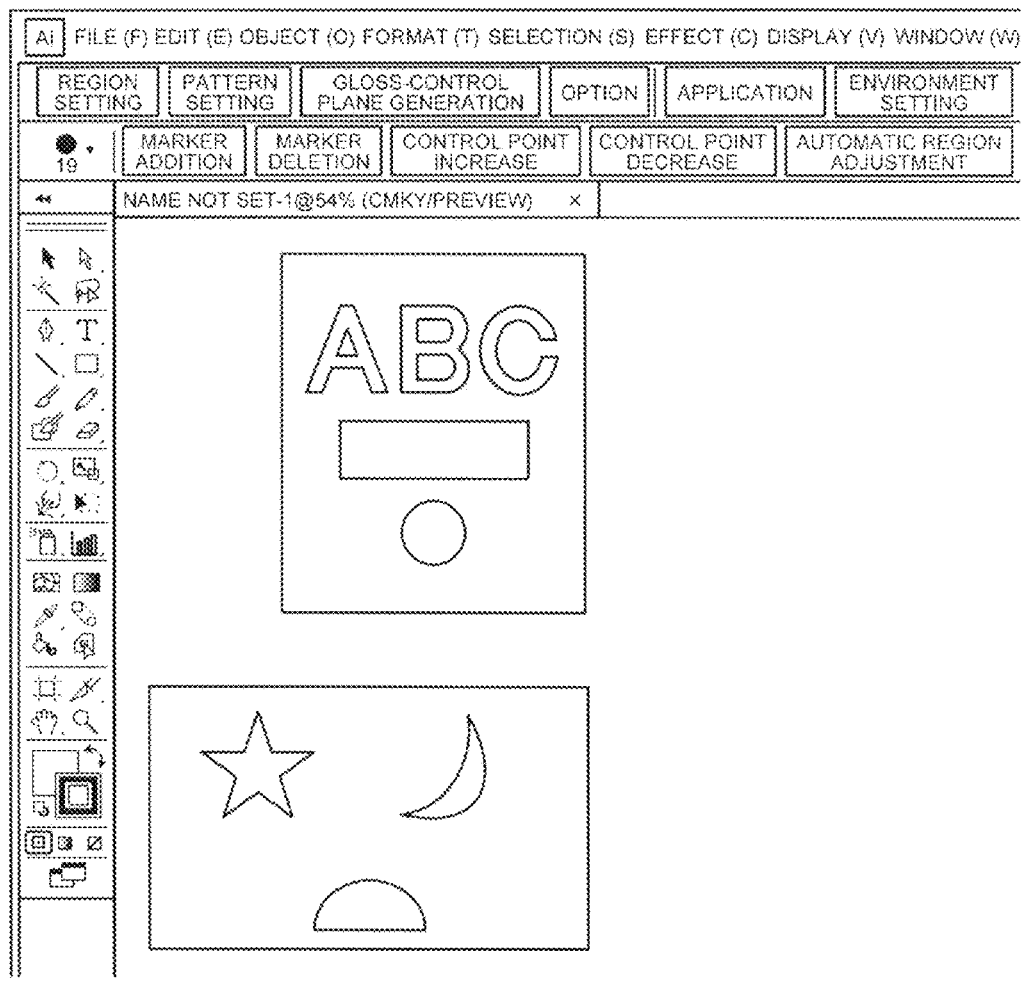
FIG. 7 is a diagram illustrating an example of a screen displayed by an image processing application.

More specifically, the display control unit 2121 displays a screen exemplarily illustrated in FIG. 7 on the display unit 2014. FIG. 7 is an example of a screen displayed when plug-in is incorporated in Adobe Illustrator (Registered) sold by Adobe Systems Inc. In the screen illustrated in FIG. 7, an image indicated by target image data to be processed (color plane image data) is displayed. When the user inputs operation that designates a region to which a surface effect is provided by pressing a marker addition button through the input unit 2013, the region to which the surface effect is applied is designated. The user performs such operation input for all regions to which a surface effect is provided.

Figure 8:
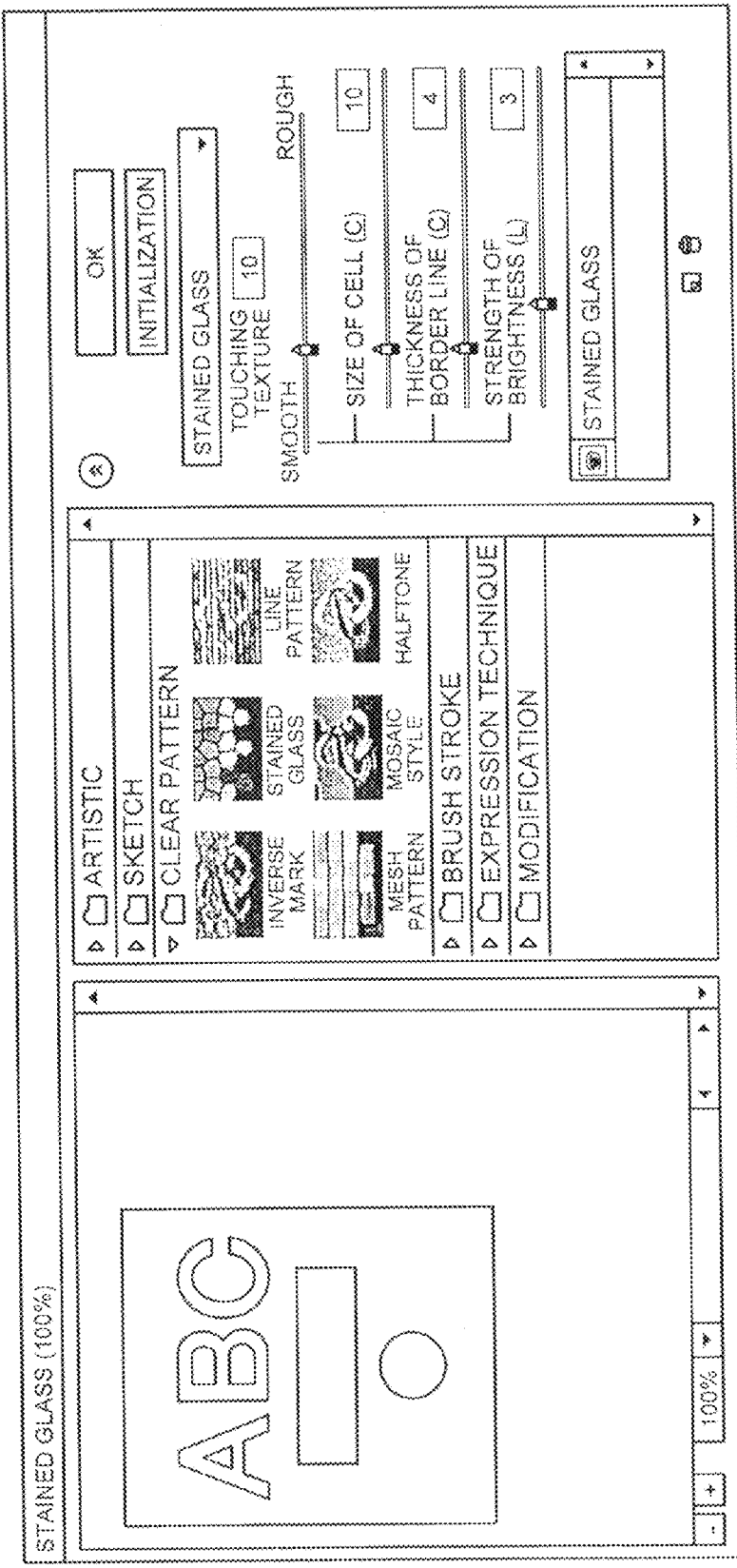
FIG. 8 is a diagram illustrating an example of a screen displayed by the image processing application.

The display control unit 2121 of the host device 2010 displays a screen exemplarily illustrated in FIG. 8 on the display unit 2014 for each designated region. In the screen illustrated in FIG. 8, an image of the region is displayed in each region that is designated as a region to which the surface effect is to be provided. The type of the surface effect to be provided to the region and the density ratio are designated by inputting the operation that designates the type of the surface effect to be provided to the image and the density ratio through the input unit 2013. As the type of the surface effect, the specular gloss and the solid gloss in FIG. 3 are expressed as an "inverse mask" in FIG. 8 while the effects other than the specular gloss and the solid gloss in FIG. 3 are expressed as a stained glass, a line pattern, a mesh pattern, a mosaic style, a halftone matt, and a halftone in FIG. 8. It is also indicated that each surface effect can be designated.

Referring back to FIG. 6, the image processing unit 2120 performs various types of image processing with respect to the target image on the basis of an instruction received from the user through the input unit 2013.

The plane data generating unit 2122 generates color plane image data, gloss-control plane image data, and clear plane image data. That is, when the input control unit 2124 receives designation of a color for a drawing object of the target image from a user, the plane data generating unit 2122 generates color plane image data in accordance with the designation of the color.

When the input control unit 2124 receives designation of a transparent image such as a watermark or a texture other than the surface effect, and designation of a region to which the transparent image is to be provided, the plane data generating unit 2122 generates clear-plane data for designating the transparent image and the region to which the transparent image is to be provided in a sheet of paper in accordance with the designation made by the user.

When the input control unit 2124 receives designation information (a region to which the surface effect is provided and a type of the surface effect), the plane data generating unit 2122 generates gloss-control plane image data capable of identifying the region to which the surface effect is to be provided in the sheet and the type of the surface effect on the basis of the designation information. Here, the plane data generating unit 2122 generates the gloss-control plane image data that designates a region to which the surface effect indicated by the gloss-control value is provided in a unit of a drawing object of image data of the target image.

Figures 9, 10:
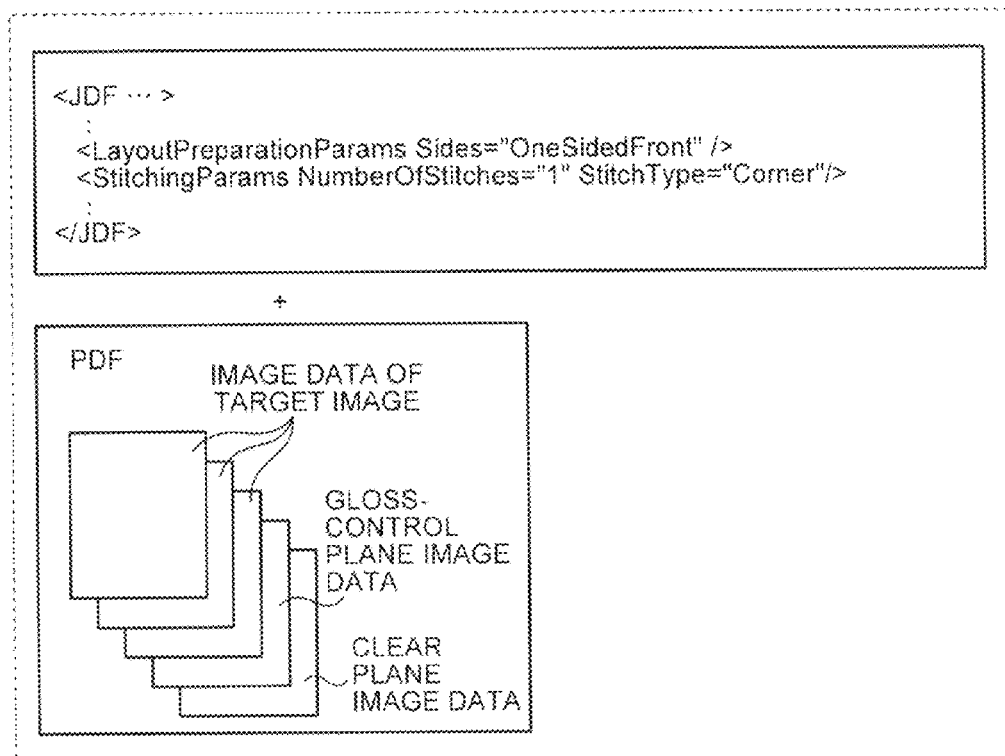
FIG. 9 is a diagram illustrating an example of a density-value selection table.
FIG. 10 is a schematic diagram conceptually illustrating a configuration example of print data.

Here, the storage unit 2012 stores the density-value selection table that stores a type of a surface effect designated by the user and a density value of the gloss-control plane image data corresponding to the type of the surface effect. FIG. 9 is a diagram illustrating a part of the density-value selection table. In the example in FIG. 9, the density ratio of the gloss-control plane image data corresponding to a region in which "PG" (specular gloss) is designated by the user is "98%", the density ratio of the gloss-control plane image data corresponding to a region in which "G" (solid gloss) is designated by user is "90%", the density ratio of the gloss-control plane image data corresponding to a region in which "M" (halftone matt) is designated by the user is "16%", and the density ratio of the gloss-control plane image data corresponding to a region in which "PM" (matt) is designated by the user is "6%".

The density-value selection table is a part of data contained in a surface-effect selection table (to be described below) stored in the DFE 2050. The control unit 2015 acquires the surface-effect selection table at a predetermined timing, generates the density-value selection table from the acquired surface-effect selection table, and stores the density-value selection table in the storage unit 2012. It is possible to store the surface-effect selection table in a storage server (cloud) on the network such as the Internet, so that the control unit 2015 can acquire the surface-effect selection table from the server and generate the density-value selection tale from the acquired surface-effect selection table. However, data of the surface-effect selection table stored in the DFE 2050 needs to be the same as data of the surface-effect selection table stored in the storage unit 2012.

Referring back to FIG. 6, the plane data generating unit 2122 generates the gloss-control plane image data by referring to the density-value selection table illustrated in FIG. 9 and by setting a density value (a gloss-control value) of a drawing object to which a predetermined surface effect is designated by the user in accordance with the type of the designated surface effect. For example, assumed that the user designates "PG" for a region represented by "ABC", designates "G" for the rectangular region, and designates "M" for the circular region in the target image that is the color plane image data illustrated in FIG. 2. In this case, the plane data generating unit 2122 sets "98%" to a density value of the drawing object ("ABC") for which the "PG" is designated by the user, sets "90%" to a density value of the drawing object ("the rectangle") for which the "G" is designated, and sets "16%" to a density value of the drawing object ("the circle") for which the "M" is designated, thereby generating the gloss-control plane image data.

The gloss-control plane image data generated by the plane data generating unit 2122 is data in a vector format, which is expressed as aggregation of coordinates of points, parameters in formulae on lines and planes connecting the points, and drawing objects indicating painted portions and special effects. FIG. 4 is a diagram illustrating the gloss-control plane image data as an image. The plane data generating unit 2122 generates document data by integrating the gloss-control plane image data, the image data of the target image (the color plane image data), and the clear plane image data, and passes the document data to the print data generating unit 2123.

The print data generating unit 2123 generates print data based on the document data. The print data includes the image data of the target image (the color plane image data), the gloss-control plane image data, the clear plane image data, and a job command for designating, for example, printer setting, aggregation setting, or duplex setting for a printer. FIG. 10 is a schematic diagram conceptually illustrating a configuration example of the print data. In the example of FIG. 10, Job Definition Format (JDF) is used as the job command; however, the job command is not limited thereto. The JDF illustrated in FIG. 10 is a command for designating "single-sided printing/stapling" as the aggregation setting. Also, the print data may be converted into page description language (PDL) such as PostScript, or may be maintained in the PDF format if the DFE 2050 can handle the PDF format.

Figure 11:
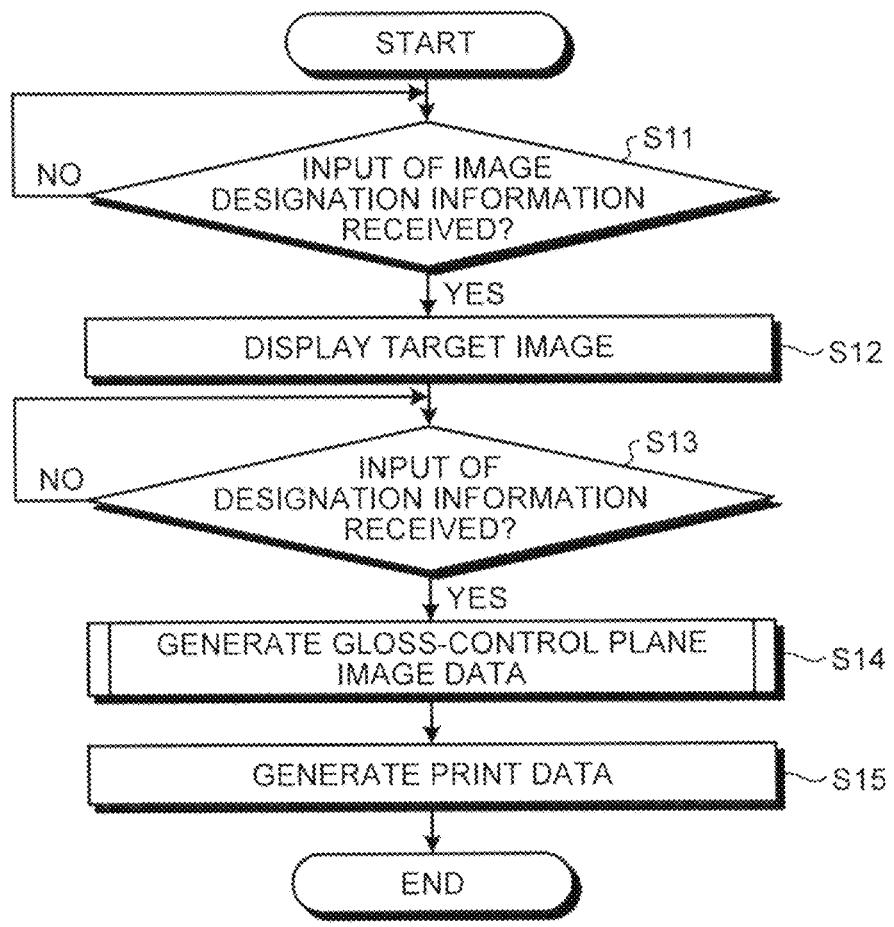
FIG. 11 is a flowchart illustrating a procedure of generation processing of print data performed by the host device.

Next, a print-data generation processing performed by the host device 2010 configured like the above description will be described. FIG. 11 is a flowchart illustrating a procedure of the print-data generation processing performed by the host device 2010 according to the embodiment. Note that, in the following example of the processing, a case in which a transparent image is not designated and thus the clear plane image data is not generated will be described.

When the input control unit 2124 receives input of image designation information (YES at step S11), the display control unit 2121 controls the display unit 2014 to display an image designated by the received image designation information (step S12). Next, when the input control unit 2124 receives input of surface-effect designation information (YES at step S13), the plane data generating unit 2122 generates gloss-control plane image data based on the received designation information (step S14).

Here, details of the generation processing of the gloss-control plane at step S14 will be described. FIG. 12 is a flowchart illustrating a procedure of the generation processing of the gloss-control plane image data. First, the plane data generating unit 2122 identifies a drawing object in which a surface effect is provided to the target image with the designation information and the coordinates thereof (step S21). Identification of the drawing object and the coordinates thereof is performed, for example, using a drawing command provided when the image processing unit 2120 draws a drawing object to the target image, a coordinate value set with the drawing command, and the like.

Next, the plane data generating unit 2122 determines a density value as a gloss-control value corresponding to the type of the surface effect provided by the user with the designation information, by referring to the density-value selection table stored in the storage unit 2012 (step S22).

The plane data generating unit 2122 then registers, in the gloss-control plane image data (which is initially blank data), the drawing object and the density value determined in accordance with the type of the surface effect in association with each other (step S23).

Next, the plane data generating unit 2122 determines whether the processing from step S21 to step S23 has been completed for all of drawing objects existing in the target image (step S24). When the processing has not been completed (NO at step S24), the plane data generating unit 2122 selects an unprocessed drawing object in the target image (step S25), and repeats the processing from step S21 to step S23.

When it is determined that the processing from step S21 to step S23 has been completed for all of the drawing objects existing in the target image at step S24 (YES at step S24), the plane data generating unit 2122 completes the generation of the gloss-control plane data. As a result, the gloss-control plane image data illustrated in FIG. 4 is generated. FIG. 13 is a diagram illustrating a corresponding relation of the drawing object, the coordinates, and the density value in the gloss-control plane image data of FIG. 4.

Referring back to FIG. 11, when the gloss-control plane image data is generated, the plane data generating unit 2122 generates document data by integrating the gloss-control plane image data and the image data of the target image, and passes the document data to the print data generating unit 2123. Then, the print data generating unit 2123 generates print data based on the document data (step S15). As described above, the print data is generated.

Next, a configuration of the DFE 2050 will be described below. As exemplarily illustrated in FIG. 14, the DFE 2050 includes a rendering engine 2051, an si1 unit 2052, a tone reproduction curve (TRC) 53, an si2 unit 2054, a halftone engine 2055, a clear processing 2056, and an si3 unit 2057.

The rendering engine 2051, the si1 unit 2052, the TRC 2053, the si2 unit 2054, the halftone engine 2055, the clear processing 2056, and the si3 unit 2057 are realized by causing a control unit of the DFE 2050 to execute various programs stored in a main storage unit or in an auxiliary storage unit. The si1 unit 2052, the si2 unit 2054, and the si3 unit 2057 have functions to separate image data and to integrate image data.

The rendering engine 2051 receives input of the image data (for example, print data illustrated in FIG. 10) transmitted from the host device 2010. The rendering engine 2051 interprets language of the input image data, converts the image data expressed in the vector format into image data expressed in a raster format, converts a color space expressed in an RGB format or the like into a color space expressed in a CMYK format, and outputs color plane image data of eight bits each of CMYK and gloss-control plane image data of eight bits.

The si1 unit 2052 outputs each piece of the eight-bit CMYK image data to the TRC 2053, and outputs the eight-bit gloss-control plane image data to the clear processing 2056.

Here, the DFE 2050 converts the gloss-control plane image data in the vector format output from the host device 2010 into image data in the raster format. As a result, the DFE 2050 outputs the gloss-control plane image data, in which the type of the surface effect to be provided to the drawing object and designated by the user through the image processing application is set as the density value in a unit of a pixel.

The TRC 2053 receives each eight-bit CMYK image data through the sit unit 2052. The TRC 2053 performs gamma correction on the input image data using a gamma correction table. Here, the gamma correction table is one-dimensional look-up table (1D_LUT), and corresponds to a gamma curve generated by calibration on the input image data.

Note that the image processing includes, for example, total toner amount control in addition to the gamma correction. The total amount control is processing of setting a limitation on each eight-bit CMYK image data after the gamma correction because the amount of toner that can be attached to one pixel on a recording medium by the printer device 2070 is limited. Note that, if printing is performed in excess of the total amount control, the image quality deteriorates due to transfer failure or fixing failure. In the present embodiment, only the related gamma correction is described.

The si2 unit 2054 outputs each eight-bit CMYK image data subjected to gamma correction by the TRC 2053 to the clear processing 2056 as data used for generating an inverse mask. Here, the inverse mask is image data used when clear-toner plane image data for realizing specular gloss (PG) or solid gloss (G) is generated. The inverse mask is, to be specific, data that indicates a region to which a clear toner is attached, and in which a density value of the clear toner is designated in a unit of a pixel. The inverse mask will be described below.

The halftone engine 2055 receives, through the si2 unit 2054, each eight-bit CMYK image data after the gamma correction. The halftone engine 2055 performs halftone processing of converting the input image data into a data format of two-bit image data of CMYK to be input to the printer device 2070, and outputs each two-bit CMYK image data after the halftone processing. Note that two-bit image data is an example, and the image data is not limited thereto.

The clear processing 2056 receives, through the si1 unit 2052, the eight-bit gloss-control plane image data converted by the rendering engine 2051, and also receives, through the si2 unit 2054, the color plane image data (each eight-bit CMYK image data) after subjected to the gamma correction by the TRC 2053.

The clear processing 2056 appropriately generates two-bit clear-toner plane image data for which a clear toner is attached by referring to the surface-effect selection table described below using the input gloss-control plane image data, determining a surface effect with respect to a density value (pixel value) indicated by each pixel that configures the gloss-control plane image data, determining ON or OFF of the glosser 2080 in accordance with the determination, and appropriately generating an inverse mask or a solid mask (described below) using each input eight-bit CMYK image data. Then, the clear processing 2056 appropriately generates and outputs clear-toner plane image data to be used in the printer device 2070 and clear-toner plane image data to be used in the low-temperature fixing device 2090 in accordance with the determination result of a surface effect, and the glosser 2080 outputs on-off information that indicates ON or OFF.

The clear processing 2056 includes, as a configuration to realize the above, a gloss-control plane storage unit 2151, a surface-effect-selection-table storage unit 2152, a density-conversion-table storage unit 2153, a non-image region generating unit 2154, an inverse-mask generating unit 2155, a conversion unit 2156, a clear-toner plane generating unit 2157, a halftone processing unit 2158, and a post-processing determination unit 2159. The gloss-control plane storage unit 2151 and the surface-effect-selection-table storage unit 2152, and the density-conversion-table storage unit 2153 are realized by an auxiliary storage unit, for example.

The gloss-control plane storage unit 2151 stores gloss-control plane image data output from the rendering engine 2051 and input to the DFE 2050.

The surface-effect-selection-table storage unit 2152 stores the surface-effect selection table. FIG. 15 is a diagram schematically illustrating a data configuration of the surface-effect table. The surface-effect selection table is a table indicating a corresponding relation between a density value as a gloss-control value indicating a surface effect and a type of a surface effect, as well as indicating a corresponding relation of the density value, the type of a surface effect, control information related to a post-processing device in accordance with an image forming system, clear-toner plane image data to be used by the printer device 2070, and clear-toner plane image data to be used by the post-processing device.

The image forming system can be configured in various ways. However, in the present embodiment, the glosser 2080 and the low-temperature fixing device 2090 serving as the post-processing devices are connected to the printer device 2070. Therefore, the control information related to the post-processing device in accordance with the configuration of the image forming system is the on-off information indicating ON or OFF of the glosser 2080. Also, the clear-toner plane image data used by the post-processing device includes clear-toner plane image data used in the low-temperature fixing device 2090.

The surface-effect selection table may be configured to indicate the corresponding relation of the control information related to the post-processing device, clear-toner plane image data 1 to be used by the printer device 2070, clear-toner plane image data 2 to be used by the post-processing device, the density value, and the type of the surface effect, in each configuration of different image forming systems. In FIG. 15, the data configuration in accordance with the configuration of the image forming system according to the present embodiment is exemplarily illustrated.

In the corresponding relation between the type of the surface effect and the density value illustrated in the drawing, each type of the surface effect is associated with each numerical range of the density value. Furthermore, each type of the surface effect is associated with a percentage of the density (the density ratio) for every 2%, which is calculated from a value representing the range of the density value (i.e., a representative value).

More specifically, the surface effects of providing gloss (the specular gloss and the solid gloss) are associated with a range of the density values (pixel values) where the density ratio is 84% or more ("212" to "255"), and the surface effects for suppressing gloss (the halftone matt and the matt) are associated with a range of the density values where the density ratio is 16% or less ("1" to "43"). Also, the surface effects such as a texture and a background watermark are associated with a range of the density values where the density ratio is 20 to 80%

More specifically, the specular gloss (PM: Premium Gloss) as the surface effect is associated with the density values from "238" to "255", and among the values, different types of specular gloss are respectively associated with three ranges of the density values: "238" to "242"; "243" to "247"; and "248" to "255". Further, the solid gloss (G: Gloss) is associated with the density values of "212" to "232", and among the values, different types of solid gloss are respectively associated with four ranges of the density values: "212" to "216"; "217" to "221"; "222" to "227"; and "228" to "232".

Further, the halftone matt (M: Matt) is associated with the density values of "23" to "43", and among the values, different types of halftone matt are respectively associated with four ranges of the density values: "23" to "28"; "29" to "33"; "34" to "38"; and "39" to "43". Furthermore, the matt (PM: Premium Matt) is associated with the density values of "1" to "17", and among the values, different types of matt are respectively associated with three ranges of the density values: "1" to "7"; "8" to "12"; and "13" to "17".

The different types of the same surface effect are different from one another in terms of formulae used for obtaining clear-toner plane image data used in the printer device 2070 and in the low-temperature fixing device 2090, and the operations performed by the printer device 2070 and the post-processing devices are the same. Note that the density value of "0" is associated with giving no surface effect.

Also, the on-off information that indicates ON and OFF of the glosser 2080, clear-toner plane image data 1 (Clr-1 in FIG. 1) to be used in the printer device 2070, and clear-toner plane image data 2 (Clr-2 in FIG. 1) to be used in the low-temperature fixing device 2090 are stored in the surface-effect selection table corresponding to the pixel values and the types of the surface effects.

For example, when the surface effect is the specular gloss, it is indicated that the glosser 2080 is turned ON, the clear-toner plane image data 1 to be used in the printer device 2070 is an inverse mask, and there is no clear-toner plane image data 2 (Clr-2 in FIG. 1) to be used in the low-temperature fixing device 2090. The inverse mask is obtained by, for example, Formula 1 described below. The inverse mask will be described below.

Note that the example illustrated in FIG. 15 is a case in which a region where the specular gloss is designated as the surface effect corresponds to the whole region defined by the image data. A case in which a region that designates the specular gloss as the surface effect is corresponding to a part of the whole region defined by the image data will be explained below.

Also, when the density value is in the range of "212" to "232" and the solid gloss is designated as the surface effect, it is indicated that the glosser 2080 is turned OFF, the clear-toner plane image data 1 to be used in the printer device 2070 is the inverse mask 1, and there is no clear-toner plane image data 2 to be used in the low-temperature fixing device 2090. Since the glosser 2080 is OFF, the total amount of toners to be smoothed becomes different, and surface irregularity due to the specular gloss becomes more prominent. As a result, the solid gloss having lower glossiness than the specular gloss can be obtained.

When the surface effect is the halftone matt, it is indicated that the glosser 2080 is turned OFF, the clear-toner plane image data 1 to be used in the printer device 2070 is halftone (halftone dot), and there is no clear-toner plane image data 2 to be used in the low-temperature fixing device 2090.

When the surface effect is the matt, it is indicated that the glosser 2080 can be either turned ON or OFF, there is no clear-toner plane image data 1 to be used in the printer device 2070, and the clear-toner plane image data 2 to be used in the low-temperature fixing device 2090 is a solid mask. The solid mask is obtained by, for example, Formula 2 described below.

Here, the inverse mask and the solid mask will be described. The inverse mask and the solid mask are generated by the inverse-mask generating unit 2155 described below. The inverse mask is data used for enhancing the smoothness of a surface in order to realize the specular gloss (PG) and the solid gloss (G), and is, more specifically, data that indicates a density value in a unit of a pixel. The inverse mask is used for uniforming the total amount of toners of CMYK toners and a clear toner attached on pixels that configure a region on which the surface effect is provided.

Further, in the surface-effect selection table, the on-off information of the glosser 2080 that turns the glosser 2080 ON is associated with the specular gloss (PG). That is, in the specular gloss (PG), an image once fixed by the printer device 2070 is fixed again by a cooling and removing technology that the glosser 2080 has by turning the glosser 2080 ON.

Figure 16A:
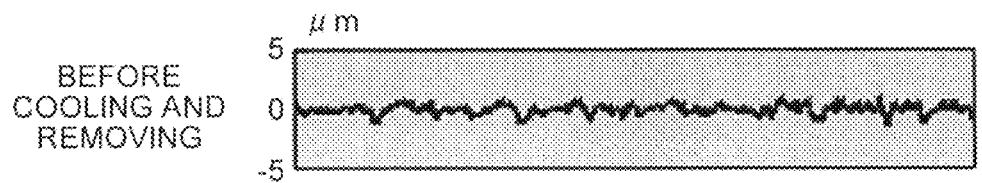
FIG. 16A is a diagram for describing a cooling and removing technology.
Figure 16B:
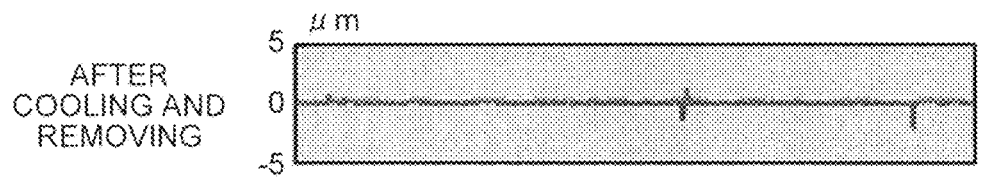
FIG. 16B is a diagram for describing a cooling and removing technology.

FIGS. 16A and 16B are diagrams for describing the cooling and removing technology. The cooling and removing technology is a technology in which an image surface after fixation and a smoothed surface come in contact with each other, and is cooled and removed after re-heating, so that the image surface is smoothed. Consequently, the image is subjected to high-gloss processing. That is, only a portion on which a toner exists is subjected to the high-gloss processing in principle.

The graph in FIG. 16A illustrates an image surface form before being subjected to the cooling and removing technology, and the graph in FIG. 16B illustrates the image surface form after being subjected to the cooling and removing technology. It can be seen that the image surface is smoothed by the cooling and removing technology from values of the surface forms in the both graphs.

Referring back to FIG. 14, the density-conversion-table storage unit 2153 stores the density conversion table used for converting the density of each pixel of the inverse mask. The density conversion table is a one-dimensional look-up table (1D_LUT), and stores a density value (input density value) of each pixel of the inverse mask and a density value (output density value) after being subjected to density conversion in association with each other. Note that the output density value is larger than the input density value.

Figure 17:
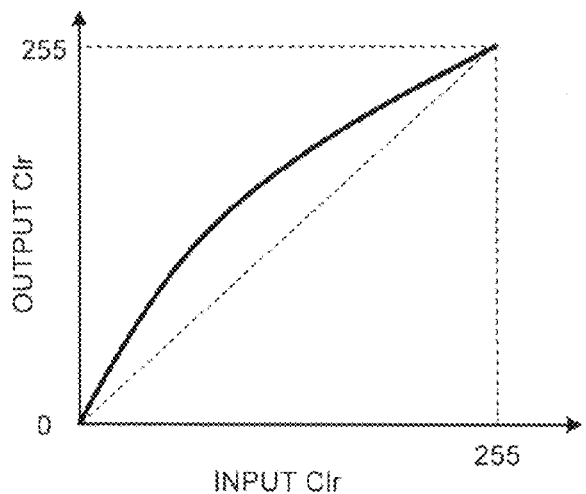
FIG. 17 is a diagram for describing a density conversion table.

FIG. 17 is a diagram for describing the density-conversion table referenced by the conversion unit 2156 described below. The density conversion table is a conversion table corresponding to a density function as illustrated in FIG. 17, for example. This density function is a function of converting the input density value into a value larger than the input density value, and is a function drawing a convex. The density function is determined in advance based on a variable factor of the printer device 2070 described below. The density conversion table is a conversion table corresponding to the density function determined based on the variable factor.

Note that the density value of the density conversion table represents an amount of toner, attached to a position of a recording medium corresponding to each pixel, that is, an amount of toner used in the printer device 2070. Further, the density conversion table is a conversion table used for converting a first amount of toner into a second amount of toner.

Figure 18:
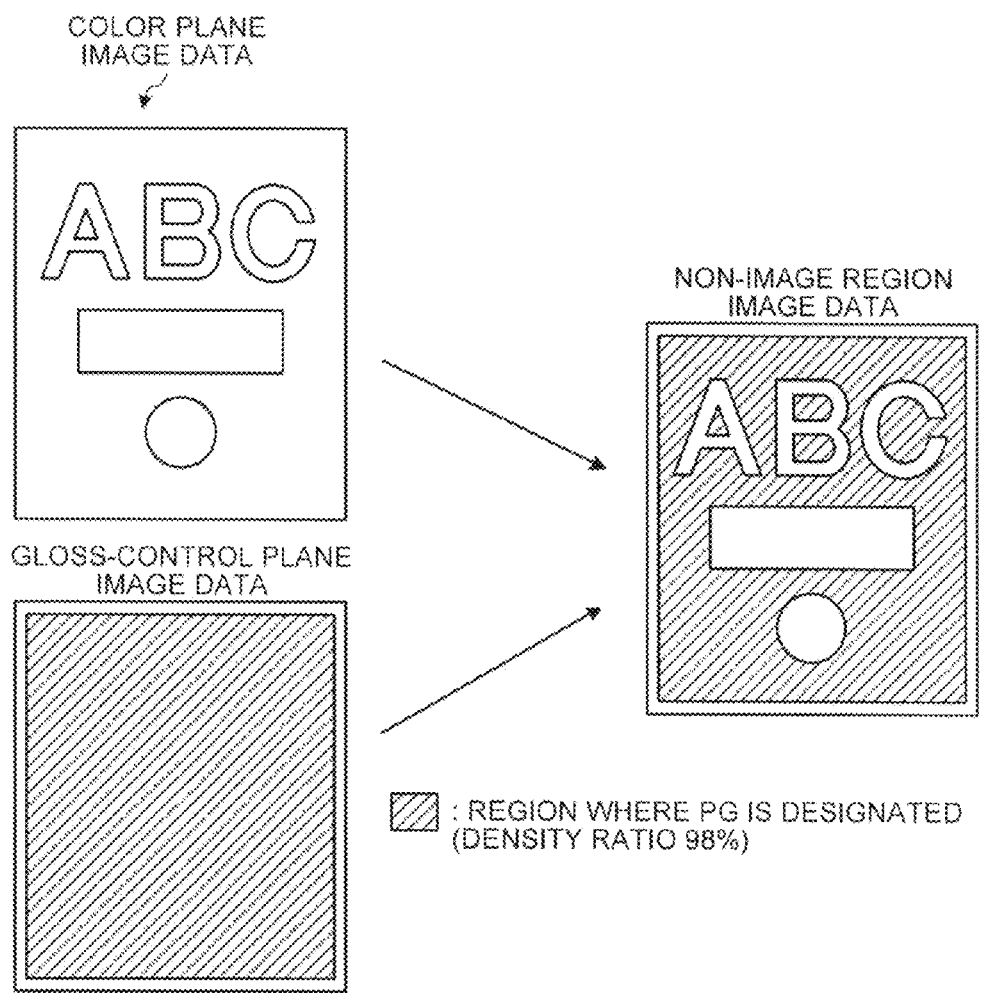
FIG. 18 is a diagram for describing processing of generating image data in a non-image region.

Referring back to FIG. 14, the non-image region generating unit 2154 generates non-image region image data that indicates a non-image region that is a region other than an object, based on the color plane image data and the gloss-control plane image data. FIG. 18 is a diagram for describing processing of generating non-image region image data. As illustrated in FIG. 18, the non-image region image data can be generated by masking the gloss-control plane image data with the color plane image data.

Referring back to FIG. 14, the inverse-mask generating unit 2155 acquires eight-bit gloss-control plane image data input from the rendering engine 2051 through the si1 unit 2052 and a color plane image data (each eight-bit CMYK image data) after gamma correction input from the TRC 2053 through the si2 unit 2054, and appropriately generates an inverse mask or a solid mask of the color plane image data using the color plane image data after gamma correction. The inverse-mask generating unit 2155 also generates an inverse mask of the non-image region image data using the non-image region image data.

Hereinafter, processing in which the inverse-mask generating unit 2155 generates the inverse mask of the color plane image data will be described. Note that the processing in which the inverse-mask generating unit 2155 generates the inverse mask of the non-image region image data is similar to the processing of generating the inverse mask of the color plane image data.

First, the inverse-mask generating unit 2155 adds all density values of pixels that configure a target region in image data of CMYK color plane. The inverse-mask generating unit 2155 calculates a value by subtracting the added value from a predetermined value. The inverse-mask generating unit 2155 generates image data that indicates a calculated density value in a unit of a pixel as an inverse mask.

Note that a pixel value corresponds to an amount of a color toner, and an added pixel value corresponds to a total amount of the color toner. The inverse mask corresponds to inverse image data of color plane image data. Note that, in the present embodiment, an inverse mask in which a pixel value is designated in a unit of a pixel is described. However, a unit of a density value is not limited to a unit of a pixel as long as the pixel value is designated in a predetermined unit of a region.

The inverse mask 1 illustrated in FIG. 15 is expressed in Formula 1 below.

$$Clr = 100 - (C + M + Y + K) \quad (1)$$

where, when Clr<0, Clr=0

In Formula 1, Clr, C, M, Y, and K represent the density ratio calculated from the density values in the pixels of the clear toner, C toner, M toner, Y toner, and K toner, respectively. Note that, here, for the purpose of easy understanding, the density ratio is used in place of the density value.

The inverse-mask generating unit 2155 uses Formula 1 to determine that density values, which allow a total value of the density ratio to be 100%, as pixel values of an inverse mask, in all pixels that configure a target region to which a total amount of C, M, Y, and K toners and a clear toner provides a surface effect, where the total amount is obtained by adding a total amount of attached C, M, Y, and K toners and an amount of attached clear toner.

When the total amount of the attached toners C, M, Y, and K is 100% or more, the clear toner is not to be attached and the density ratio of the clear toner is set to be 0%. This is because a portion where the total amount of the attached toners of C, M, Y, and K exceeds 100% is smoothed by fixing processing.

As described above, by setting the total amount of the attached toner on all the pixels in the target region to which the surface effect is to be provided to be 100% or more, the surface irregularity caused by a difference in the total amount of the attached toners in the target region can be reduced. As a result, gloss by specular reflection of light is caused.

In an inverse mask generated from the above-described non-image region image data, a pixel value corresponding to the density ratio of 100% is set with Formula 1. Therefore, a value of each pixel of the clear-toner plane image data in this region becomes a density value converted from the density ratio of 100%, that is, becomes 255. Also, in a drawing region designated with the color plane image data, a value of an inverse mask (Clr) of each pixel is calculated from Formula 1.

Note that the inverse mask may be calculated from a formula other than Formula 1, and there may be various types of inverse masks.

For example, the inverse mask may be one that uniformly attaches the clear toner to each pixel. The inverse mask in this case serves as a solid mask, and is expressed in Formula 2 below.

$$Clr=100 \quad (2)$$

Note that there may be a pixel with which a density ratio other than 100% is associated among target pixels to which a surface effect is to be provided. Therefore, there may be various patterns of the solid masks.

Also, the inverse mask may be, for example, obtained by multiplication of background exposure ratios of respective colors. The inverse mask in this case is expressed in, for example, Formula 3 below.

$$Clr=100\times\{(100-C)/100\}\times\{(100-M)/100\}\times\{(100-Y)/100\}\times\{(100-K)/100\} \quad (3)$$

In Formula 3, (100−C)/100 represents a background exposure ratio of C, (100−M)/100 represents a background exposure ratio of M, (100−Y)/100 represents a background exposure ratio of Y, and (100−K)/100 represents a background exposure ratio of K.

The inverse mask may be obtained by a method based on the assumption that a halftone dot having a maximum area ratio regulates the smoothness. The inverse mask in this case is expressed in, for example, Formula 4 below.

$$Clr=100-\max(C,M,Y,K) \quad (4)$$

In Formula 4, max(C, M, Y, K) indicates that a density ratio of a color having the maximum density ratio among CMYK is used as a representative value.

Thus, any inverse mask can be employed for the inverse mask illustrated in FIG. 15 as long as it is expressed in any one of Formulae 1 to 4 is applicable.

Referring back to FIG. 14, the conversion unit 2156 converts a density value of each pixel of an inverse mask corresponding to an input density ratio (input Clr) into an output density value corresponding to an output density ratio (output Clr) using the density-conversion table stored in the density-conversion-table storage unit 2153.

The clear-toner plane generating unit 2157 appropriately generates eight-bit clear-toner plane image data by merging an inverse mask generated for a non-image region, an inverse mask and a solid mask generated from color plane image data.

The halftone processing unit 2158 appropriately obtains two-bit clear-toner plane image data by applying halftone processing to the eight-bit clear-toner plane image data.

Here, as the clear-toner plane image data, there are clear-toner plane image data used in the printer device 2070 and clear-toner plane image data used in the low-temperature fixing device 2090. The clear-toner plane image data obtained in the halftone processing unit 2158 is output to the si3 unit 2057.

In a case where the specular gloss (PG) is designated for an entire one page regardless of whether for a drawing region or not, the clear processing 2056 generates clear-toner plane image data that attaches a clear toner to a non-image region. Further, the clear processing 2056 generates, for each pixel, an inverse mask to which a larger density value than the density value determined from the color plane image data is allocated. Consequently, an image with a clear toner can be formed at a position corresponding to variable factors such as a misregistration and a dot gain in the printer device 2070.

An output image from the printer device 2070 does not necessarily reproduce image data faithfully. This is owing to an image-forming process of the printer device 2070. A typical printer device 2070 writes a latent image on a photosensitive element with a light beam in accordance with image data, and develops a toner for the latent image. Further, the printer device 2070 transfers the toner on a sheet of paper, and fixes the image on the sheet by providing heat and a pressure. In this series of image-forming process, a dot gain, a misregistration, and the like occur.

Due to these variable factors such as a misregistration and a dot gain, the output image differs from original image data in a unit of a pixel. All of FIGS. 19A to 19C are diagrams illustrating the original image data and the output image. As illustrated in the examples of FIGS. 19A to 19C, it can be seen that an area of a region to which a toner is actually attached in the output image is larger than an area of a region to which image forming is designated in the original image data.

In the case where the specular gloss (PG) is designated for an entire sheet as described above, it is necessary to generate clear-toner plane image data capable of reliably putting a clear toner over a color toner and covering the color toner in consideration of the variable factors.

In response, in the image forming system in the present embodiment, the clear processing 2056 generates, for each pixel, an inverse mask to which a density value is set, which is higher than the density value determined from the color plane image data to the extent in accordance with the variable factors of the printer device 2070. Therefore, a clear toner can be attached to an appropriate region in consideration of the variable factors of the printer device 2070.

Further, in a case where the specular gloss (PG) is determined for an entire sheet, it is necessary to attach a clear toner to a region other than a drawing region, that is, a non-image region.

In response, in the image forming system of the present embodiment, the clear processing 2056 can generate non-image region image data indicating a region that is not designated as a drawing region in color plane image data by referring to the color plane image data.

The post-processing determination unit 2159 determines a surface effect with respect to a density value (pixel value) indicated by pixels that configure gloss-control plane image data by referring to the surface-effect selection table stored in the surface-effect-selection-table storage unit 2152 using the gloss-control plane image data input to the DFE 2050. Then, the post-processing determination unit 2159 determines ON or OFF of the glosser 2080 according to the determination. The post-processing determination unit 2159 outputs on-off information indicating ON or OFF of the glosser 2080 to the si3 unit 2057.

As described above, the clear processing 2056 determines the surface effect in associated with pixel values indicated by the gloss-control plane image data, and determines ON or OFF of the glosser 2080 by referring to the above-described surface-effect selection table, and determines what type of clear-toner plane image data is to be used in the printer device 2070 and the low-temperature fixing device 2090. Note that the clear processing 2056 determines ON or OFF of the glosser 2080 for every page. Then, as described above, the clear processing 2056 appropriately generates and outputs the clear-toner plane image data according to the determination, and outputs the on-off information on the glosser 2080.

The si3 unit 2057 integrates each two-bit CMYK image data after being subjected to the halftone processing and the two-bit clear-toner plane image data generated by the clear processing 2056, and outputs the integrated image data to the MIC 2060.

Note that there may be a case where the clear processing 2056 does not generate at least one of the clear-toner plane image data to be used in the printer device 2070 and the clear-toner plane image data to be used in the low-temperature fixing device 2090. In this case, the si3 unit 2057 integrates the clear-toner plane image data generated by the clear processing 2056. In a case where the clear processing 2056 does not generate both of the clear-toner plane image data, the si3 unit 2057 outputs image data obtained by integrating each two-bit CMYK image data.

As a result, the DFE 2050 sends four to six pieces of two-bit image data to the MIC 2060. The si3 unit 2057 also outputs, to the MIC 2060, the on-off information on the glosser 2080 output by the clear processing 2056.

Next, a procedure of gloss control processing performed by the DFE 2050 will be described with reference to FIG. 20. Note that, here, a case will be described, in which the specular effect (PG) is designated for an entire one page in gloss-control plane image data.

When the DFE 2050 receives image data from the host device 2010 (step S31), the rendering engine 2051 interprets language of the image data, converts the image data expressed in the vector format into image data expressed in the raster format, converts a color space expressed in the RGB format into a color space expressed in the CMYK format, and obtains each eight-bit CMYK color plane image data and eight-bit gloss-control plane image data (step S32). The gloss-control plane image data obtained in the rendering engine 2051 is input to the clear processing 2056, and is stored in the gloss-control plane storage unit 2151.

Figure 21:
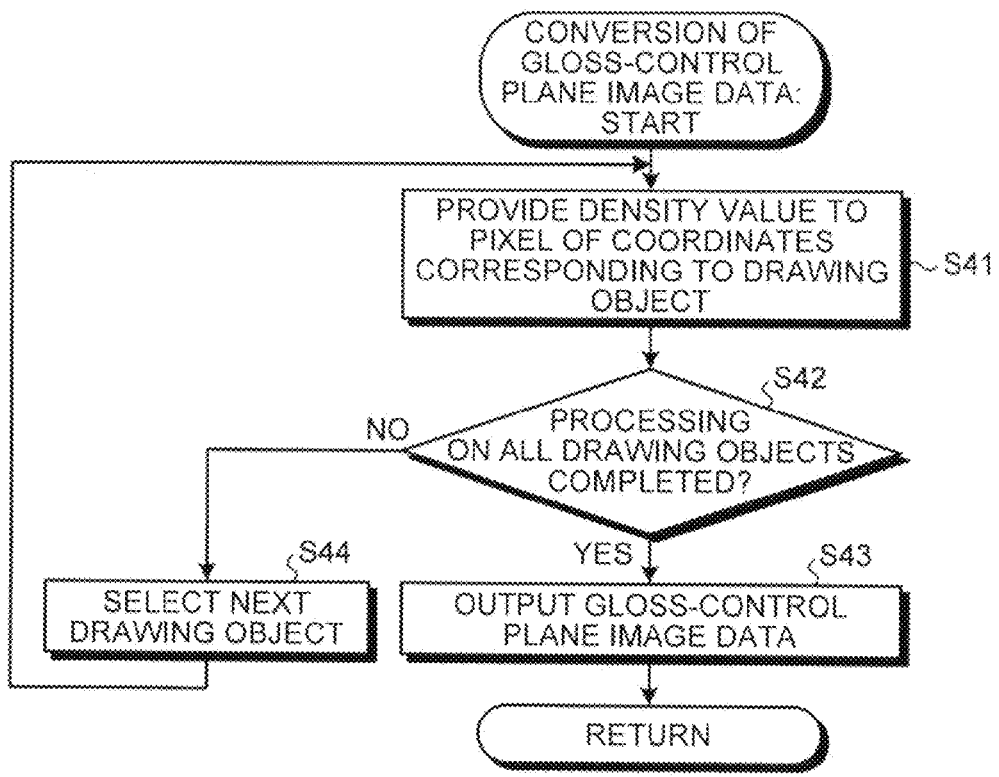
FIG. 21 is a flowchart illustrating a procedure of conversion processing of gloss-control plane image data.

Here, details of the processing of converting gloss-control plane image data at step S32 will be described. FIG. 21 is a flowchart illustrating a procedure of the processing of converting gloss-control plane image data. In the conversion processing, the gloss-control plane image data in FIG. 8, that is, the gloss-control plane image data in which a density value that identifies a surface effect for each drawing object as illustrated in FIG. 13 is converted into gloss-control plane image data in which a density value is designated for each pixel that configures the drawing object.

The rendering engine 2051 converts the gloss-control plane image data by providing the density value set to the drawing object to a pixel in a range of coordinates corresponding to the gloss-control plane drawing object illustrated in FIG. 13 (step S41). Then, the rendering engine 2051 determines whether the processing on all drawing objects existing in the gloss-control plane image data has been completed (step S42).

Then, when the processing has not been completed (No at step S42), the rendering engine 2051 selects a next drawing object in the gloss-control plane image data (step S44), and repeats the processing of step S41.

Meanwhile, at step S42, when the processing of step S41 has been completed with respect to all drawing objects in the gloss-control plane image data (Yes at step S42), the rendering engine 2051 outputs the converted gloss-control plane image data (step S43). With the above-described processing, the gloss-control plane image data is converted into data to which a surface effect is set for each pixel.

Referring back to FIG. 20, when the eight-bit gloss-control plane image data is output, the TRC 2053 of DFE 2050 performs gamma correction on each eight-bit CMYK image data (step S33). Note that each eight-bit CMYK image data after the gamma correction is input to the clear processing 2056 via the si2 unit 2054.

The halftone engine 2055 performs halftone processing on the image data after the gamma correction to convert the image data into a data format of each two-bit CMYK image data to be output to the printer device 2070, and obtains each two-bit CMYK image data after the halftone processing (step S34).

Meanwhile, the clear processing 2056 determines a surface effect designated for each pixel indicated by the gloss-control plane image data by referring to the surface-effect selection table using the eight-bit gloss-control plane image data (step S35). The clear processing 2056 performs such determination on all of the pixels that configure the gloss-control plane image data. Note that, in the gloss-control plane image data, all pixels that configure a region to which the same surface effect is provided basically have a density value in the same range. Therefore, the clear processing 2056 determines that pixels near the pixels determined to have the same surface effect are contained in the region to which the same surface effect is provided. In this manner, the clear processing 2056 determines the region to which the surface effect is to be provided and the type of the surface effect to be provided to the region.

Further, the post-processing determination unit 2159 of the clear processing 2056 identifies the on-off information of the glosser 2080 based on a determination result of the type of the surface effect by referring to the surface-effect selection table (step S36).

Meanwhile, the clear-toner plane generating unit 2157 of the clear processing 2056 appropriately generates eight-bit clear-tone plane image data for attaching a clear toner using the color plane image data after the gamma correction appropriately (step S37).

Figure 22:
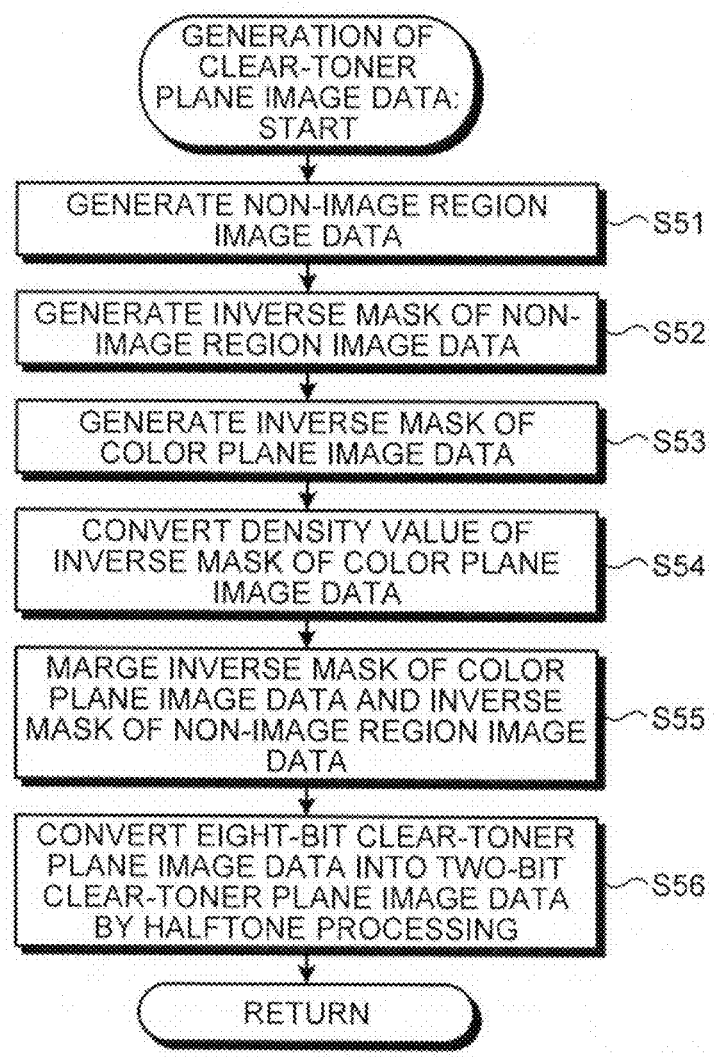
FIG. 22 is a flowchart illustrating a procedure of generation processing of clear-toner plane image data.

Here, details of the processing of generating clear-toner plane image data at step S37 will be described. FIG. 22 is a flowchart illustrating a procedure of the processing of generating the clear-toner plane image data.

The non-image region generating unit 2154 of the clear processing 2056 generates non-image region image data based on CMYK image data after the gamma correction and eight-bit gloss-control plane image data in a case where the specular gloss is designated for an entire one page (step S51).

Next, the inverse-mask generating unit 2155 generates an inverse mask of the non-image region image data (step S52), and further generates an inverse mask of the color plane image data (step S53). Next, the conversion unit 2156 converts a density value of each pixel of the inverse mask of the color plane image data into a larger value using the density-conversion table stored in the density-conversion-table storage unit 2153 (step S54).

Next, the clear-toner plane generating unit 2157 merges the inverse mask of the non-image region image data and the inverse mask of the color plane image data (step S55). Next, the halftone processing unit 2158 performs the halftone processing on the eight-bit clear-toner plane image data, and obtains two-bit clear-toner plane image data (step S56). Consequently, clear-toner plane image data can be obtained.

Referring back to FIG. 20, the si3 unit 2057 of the DFE 2050 integrates each two-bit CMYK image data obtained through the halftone processing at step S33 and the two-bit clear-toner plane image data generated at step S38, and outputs the integrated image data and the on-off information indicating ON or OFF of the glosser 2080 identified at step S36 to the MIC 2060 (step S38).

Note that, at Step S37, when having not generated the clear-toner plane image data, the clear processing 2056 integrates only each two-bit CMYK image data after the halftone processing obtained at step S33 and outputs the integrated image data to the MIC 2060 at step S38.

The gloss-control processing will be specifically described by taking an example in which gloss-control plane image data is input to the DFE 2050 as illustrated in FIG. 18, in which the specular gloss (PG) of the density ratio of 98% is designated for an entire one page. The gloss-control plane image data is rasterized in the rendering engine 2051 (step S32), and the eight-bit gloss-control plane image data is input to the clear processing 2056, and is stored in the gloss-control plane storage unit 2151.

Then the clear processing 2056 determines to perform clear processing by referring to the density value of each pixel of the gloss-control plane image data stored in the gloss-control plane storage unit 2151 and the surface-effect selection table illustrated in FIG. 15.

It can be seen that, in the gloss-control plane image data illustrated in FIG. 18, the specular gloss (PG) type A is employed from the density value corresponding to 98%, and the glosser 2080 is turned ON from the on-off information of the glosser 2080. Therefore, the clear processing 2056 generates clear-toner plane image data by processing defined with the specular gloss type A. For example, in the type A, an inverse mask is generated with Formula 1.

As for non-image region image data, a value corresponding to the density value of 100% is determined from Formula 1. Consequently, in the clear-toner plane image data, a pixel value of 255 is allocated to pixels corresponding to the non-image region.

Meanwhile, as for a region corresponding to the color plane image data, a density value (Clr) of the inverse mask (eight-bits for each pixel) is generated from Formula 1. The generated density value (Clr) is converted into a larger value (output Clr) with the density-conversion table.

In this manner, in the case where the specular gloss (PG) is designated for a whole surface of one page, a larger value than the density value determined from the color plane image data is set to each pixel of the inverse mask. Consequently, the amount of clear toners determined after the halftone processing in step S38 is further increased. Therefore, the image forming system according to the present embodiment is capable of forming a clear toner image having a uniform amount of toners while responding to the variable factors such as a misregistration. That is, the image forming system can accurately provide specular gloss to image data in which a misregistration and the like are caused.

Figure 23:
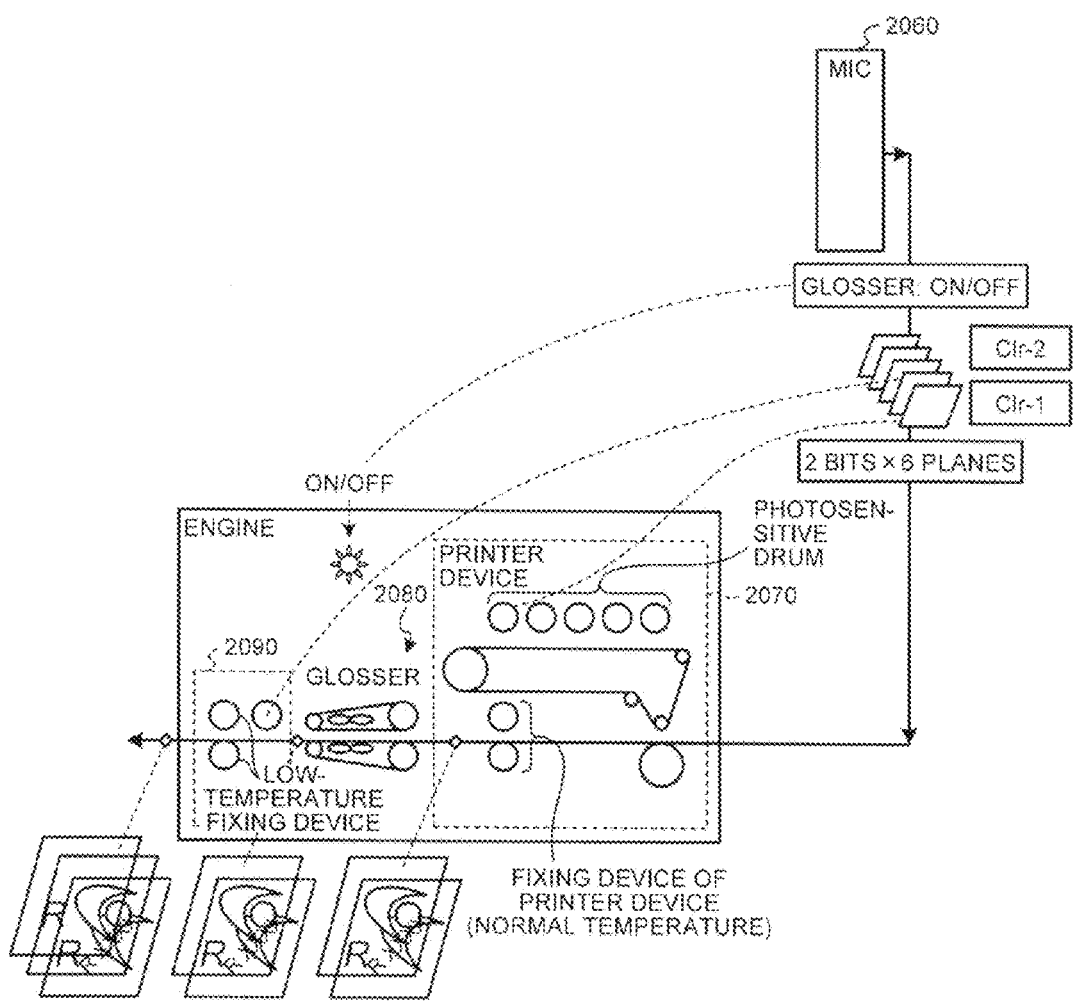
FIG. 23 is a diagram conceptually exemplarily illustrating a configuration of an MIC.

FIG. 23 is a diagram for describing a configuration of the MIC 2060. The MIC 2060 is connected to the DFE 2050 and the printer device 2070, receives the color plane image data and the clear-toner plane image data from the DFE 2050, distributes the received image data to corresponding devices, and controls the post-processing devices. More specifically, as illustrated in FIG. 23, the MIC 2060 outputs the color plane image data of CMYK from among the color plane image data output from the DFE 2050 to the printer device 2070, also outputs the clear-toner plane image data to be used in the printer device 2070 to the printer device 2070 if when this plane data is present, turns on or off the glosser 2080 by using the on-off information output from the DFE 2050, and outputs the clear-toner plane data to be used by the low-temperature fixing device 2090 to the low-temperature fixing device 2090 when this data exists. The glosser 2080 may switch between a process in which the fixing operation is performed and a process in which the fixing operation is not performed depending on the on-off information. The low-temperature fixing device 2090 may switch ON and OFF in accordance with the existence of the clear-toner plane image data or may switch the processes similarly to the glosser 2080.

Figure 24:
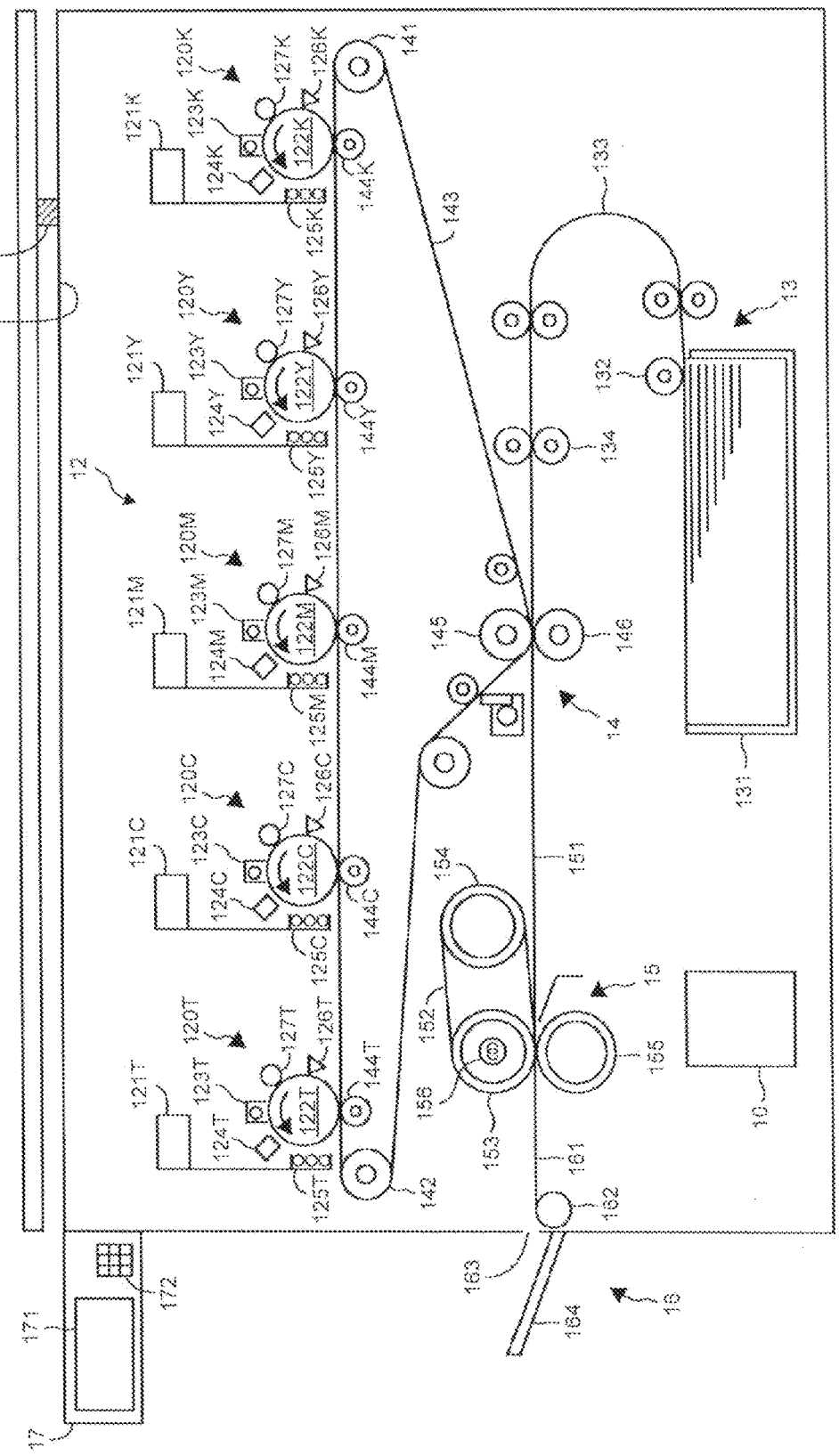
FIG. 24 is a diagram illustrating a hardware configuration of a printer device.

FIG. 24 is a diagram illustrating a hardware configuration of the printer device 2070. The printer device 2070 forms an image on a sheet of paper as an example of a recording medium by fixing a toner image. The printer device 2070 includes, as illustrated in FIG. 24, a control unit 10, an image reading unit 11, an image forming unit 12, a paper feeding unit 13, a transfer unit 14, a fixing unit 15, a discharging unit 16, a display/operating unit 17, and the like.

Figure 25:
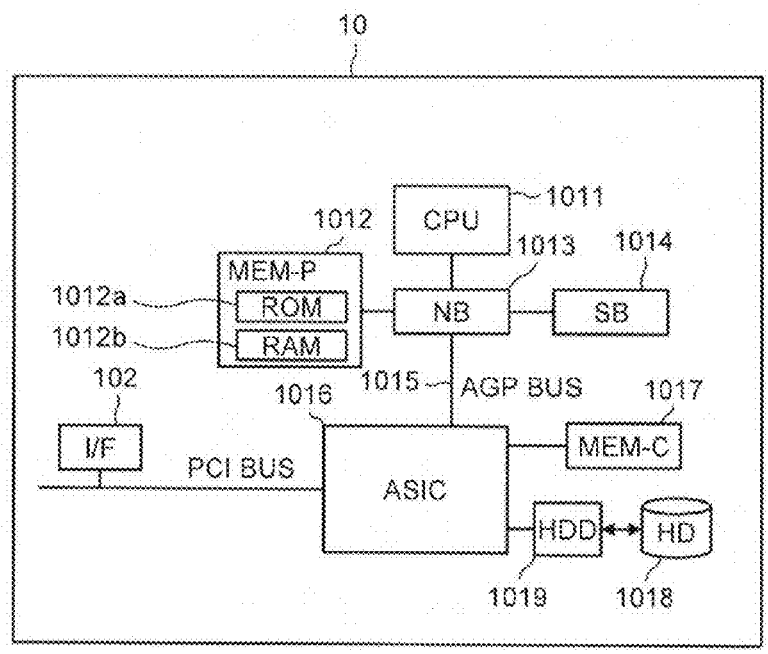
FIG. 25 is a diagram illustrating a hardware configuration of a control unit.

FIG. 25 is a diagram illustrating a hardware configuration of the control unit 10. The control unit 10 includes, as illustrated in FIG. 25, a central processing unit (CPU) 1011, a main memory (MEM-P) 1012, a northbridge (NB) 1013, a southbridge (SB) 1014, an accelerated graphics port (AGP) bus 1015, an application specific integrated circuit (ASIC) 1016, a local memory (MEM-C) 1017, a hard disk (HD) 1018, a hard disk drive (HDD) 1019, and a network I/F 102.

The CPU 1011 processes/calculates data according to a program stored in the main memory 1012, and controls operations of the image reading unit 11, the image forming unit 12, the paper feeding unit 13, the transfer unit 14, the fixing unit 15, and the discharging unit 16. The main memory 1012 is a storage area of the control unit 10, and includes a read only memory (ROM) 1012a and a random access memory (RAM) 1012b. The ROM 1012a is storage memory for a program and data used for realizing functions of the control unit 10. The program stored in the ROM 1012a may be configured to be recorded in a computer-readable recording medium such as a CD-ROM, an FD, a CD-R, and a DVD with a file in an installable format or in a executable format.

The RAM 1012b is used as drawing memory at the time of developing a program and data and memory-printing. The NB 1013 is a bridge used for connecting the CPU 1011, the MEM-P 1012, the SB 1014, the AGP bus 1015. The SB 1014 is a bridge used for connecting the NB 1013, the PCI device, and peripheral devices. The AGP bus 1015 is a bus interface for graphics accelerator cards proposed in order to accelerate graphic processing.

The ASIC 1016 is configured from a plurality of direct memory access controllers (DMAC) that performs rotation of image data and the like with a PCI target and AGP master, an arbiter serving as a core of the ASIC 1016 (ARB), a memory controller that controls the MEM-C 1017, a hardware logic, and the like. This ASIC 1016 is connected to an interface of a universal serial bus (USB) and an interface of Institute of Electrical and Electronic Engineers 1394 (IEEE1394) via a PCI bus.

The MEM-C1017 is local memory used as a copy image buffer and a code buffer. The HD 1018 is a storage used for storing image data, font data used at the time of printing, and a form. The HDD 1019 controls reading/writing of data from/on the HD 1018 according to control by the CPU 1011. The network I/F 102 transmits/receives information to/from external devices such as an information processing apparatus via a communication network.

Referring back to FIG. 24, the image reading unit 11 generates image information by optically reading an image written on a sheet. To be specific, the image reading unit 11 exposes the sheet to light, and receives a reflected light with a reading sensor such as charge coupled devices (CCD) and a contact image sensor (CIS) to read the image information. Note that the image information is information that indicates an image to be formed on a recording medium such as a sheet, and is represented using electrical color separation image signals that indicate colors of red (R), green (G), and blue (B).

The image reading unit 11 includes an exposure glass 111, a reading sensor 112, and the like, as illustrated in FIG. 24. The exposure glass 111 allows a sheet on which an image is written to be placed thereon. The reading sensor 112 reads the image information of the image written on the sheet placed on the exposure glass 111.

The image forming unit 12 forms an image (toner image) by attaching a toner to a surface of the intermediate transfer belt 143 of the transfer unit 14 based on the image information read by the image reading unit 11 or the image information received by the network I/F 102.

The image forming unit 12 includes an image forming unit 120C that forms a toner image using a developer including a cyan (C) toner, an image forming unit 120M that forms a toner image using a magenta (M) toner, an image forming unit 120Y that forms a toner image using a yellow (Y) toner, an image forming unit 120K that forms a toner image using a black (K) toner, and an image forming unit 120T that forms a toner image using a clear (T) toner.

Note that any one of or more than one of a C-color toner, an M-color toner, a Y-color toner, and a K-color toner are referred to as color toners. Each of the color toners is resin particles containing a color material such as pigments or dyes, and having charging ability.

Further, the clear toner is a colorless transparent toner, and is resin particles that allow a color toner to be visible when the clear toner is attached to the color toner attached on a recording medium. Further, the clear toner is resin particles that allow the recording medium to be visible when the clear toner attached on the recording medium. The clear toner is produced by, for example, adding silicon dioxide ($SiO_2$) or titanium dioxide ($TiO_2$) to a polyester resin having a low molecular weight. Note that the clear toner may include a color material as long as the amount thereof is small enough to allow the recording medium or a color toner attached on the recording medium to be visible.

Hereinafter, any one of the image forming unit 120C, the image forming unit 120M, the image forming unit 120Y, the image forming unit 120K, and the image forming unit 120T will be represented by an "image forming unit 120".

The image forming unit 120C includes a toner supplying unit 121C, a photosensitive drum 122C, a charging unit 123C, an exposing unit 124C, a developing unit 125C, a neutralization unit 126C, and a cleaning unit 127C.

The toner supplying unit 121C houses a C-color toner, and supplies the C-color toner to the developing unit 125C. The toner housed in the toner supplying unit 121C is supplied to the developing unit 125C by a predetermined amount by driving of a conveying screw in the toner supplying unit 121C. A surface of the photosensitive drum 122C is uniformly charged by the charging unit 123C, and an electrostatic latent image is formed on the surface by the exposing unit 124C based on the image information received from the control unit 10. Further, the developing unit 125C attaches a toner to the surface of the photosensitive drum 122C, on which the electrostatic latent image has been formed, so that a toner image is formed thereon. Also, the photosensitive drum 122C is provided to come in contact with the intermediate transfer belt 143, and to rotate in the same direction as a moving direction of the intermediate transfer belt 143 at a point of contact with the intermediate transfer belt 143.

The charging unit 123C uniformly charges the surface of the photosensitive drum 122C. The exposing unit 124C irradiates the surface of the photosensitive drum 122C charged by the charging unit 123C with light based on a C-color halftone dot area ratio determined by the control unit 10 to form an electrostatic latent image. The developing unit 125C develops and forms a toner image by attaching the C-color toner housed in a developer housing unit 121C to the electrostatic latent image formed on the surface of the photosensitive drum 122C by the exposing unit 124C.

The neutralization unit 126C neutralizes the surface of the photosensitive drum 122C after an image is transferred to the intermediate transfer belt 143. The cleaning unit 127C removes a residual toner remained on the surface of the photosensitive drum 122C neutralized by the neutralization unit 126C.

The image forming unit 120M includes a developer housing unit 121M, a photosensitive drum 122M, a charging unit 123M, an exposing unit 124M, a developing unit 125M, a neutralization unit 126M, and a cleaning unit 127M. The developer housing unit 121M houses an M-color toner. The photosensitive drum 122M, the charging unit 123M, the exposing unit 124M, the developing unit 125M, the neutralization unit 126M, and the cleaning unit 127M respectively have similar functions to the photosensitive drum 122C, the charging unit 123C, the exposing unit 124C, the developing unit 125C, the neutralization unit 126C, and the cleaning unit 127C, and therefore, description thereof is omitted.

The image forming unit 120Y includes a developer housing unit 121Y, a photosensitive drum 122Y, a charging unit 123Y, an exposing unit 124Y, a developing unit 125Y, a neutralization unit 126Y, and a cleaning unit 127Y. The developer housing unit 121Y houses a Y-color toner. The photosensitive drum 122Y, the charging unit 123Y, the exposing unit 124Y, the developing unit 125Y, the neutralization unit 126Y, and the cleaning unit 127Y respectively have similar functions to the photosensitive drum 122C, the charging unit 123C, the exposing unit 124C, the developing unit 125C, the neutralization unit 126C, and the cleaning unit 127C, and therefore, description thereof is omitted.

The image forming unit 120K includes a developer housing unit 121K, a photosensitive drum 122K, a charging unit 123K, an exposing unit 124K, a developing unit 125K, a neutralization unit 126K, and a cleaning unit 127K. The developer housing unit 121K houses a K-color toner. The photosensitive drum 122K, the charging unit 123K, the exposing unit 124K, the developing unit 125K, the neutralization unit 126K, and the cleaning unit 127K respectively have similar functions to the photosensitive drum 122C, the charging unit 123C, the exposing unit 124C, the developing unit 125C, the neutralization unit 126C, and the cleaning unit 127C, and therefore, description thereof is omitted.

The image forming unit 120T includes a developer housing unit 121T, a photosensitive drum 122T, a charging unit 123T, an exposing unit 124T, a developing unit 125T, a neutralization unit 126T, and a cleaning unit 127T. The developer housing unit 121T houses a clear toner. The photosensitive drum 122T, the charging unit 123T, the exposing unit 124T, the developing unit 125T, the neutralization unit 126T, and the cleaning unit 127T respectively have similar functions to the photosensitive drum 122C, the charging unit 123C, the exposing unit 124C, the developing unit 125C, the neutralization unit 126C, and the cleaning unit 127C, and therefore, description thereof is omitted.

Note that, hereinafter, any one of the developer housing unit 121C, the developer housing unit 121M, the developer housing unit 121Y, the developer housing unit 121K, and the developer housing unit 121T is represented by a "developer housing unit 121". Also, any one of the photosensitive drum 122C, the photosensitive drum 122M, the photosensitive drum 122Y, the photosensitive drum 122K, and the photosensitive drum 122T is represented by a "photosensitive drum 122". Also, any one of the charging unit 123C, the charging unit 123M, the charging unit 123Y, the charging unit 123K, and the charging unit 123T is represented by a "charging unit 123". Also, any one of the exposing unit 124C, the exposing unit 124M, the exposing unit 124Y, the exposing unit 124K, and the exposing unit 124T is represented by an "exposing unit 124". Also, any one of the developing unit 125C, the developing unit 125M, the developing unit 125Y, the developing unit 125K, and the developing unit 125T is represented by a "developing unit 125". Also, any one of the neutralization unit 126C, the neutralization unit 126M, the neutralization unit 126Y, the neutralization unit 126K, and the neutralization unit 126T is represented by a "neutralization unit 126". Also, any one of the cleaning unit 127C, the cleaning unit 127M, the cleaning unit 127Y, the cleaning unit 127K, and the cleaning unit 127T is represented by a "cleaning unit 127".

The paper feeding unit 13 supplies a sheet to the transfer unit 14. The paper feeding unit 13 includes a sheet housing unit 131, a paper feeding roller 132, a paper feeding belt 133, and a registration roller 134.

The sheet housing unit 131 houses a sheet as an example of a recording medium. The paper feeding roller 132 is provided to rotate to allow the sheet housed in the sheet housing unit 131 to move toward the paper feeding belt. The paper feeding roller 132 provided in this manner takes out a sheet existing on an uppermost layer from the housed sheets one by one, and places the sheet on the paper feeding belt. The paper feeding belt 133 conveys the sheet taken out by the paper feeding roller 132 to the transfer unit 14. The registration roller 134 takes out the sheet conveyed by the paper feeding belt 133 at a timing when a portion of the intermediate transfer belt 143 described below on which the toner image is formed reaches the transfer unit 14.

The transfer unit 14 transfers the image formed on the photosensitive drum 122 by the image forming unit 12 to the intermediate transfer belt 143 (primary transfer), and transfers the image transferred to the intermediate transfer belt 143 to the sheet (secondary transfer).

The transfer unit 14 includes a driving roller 141, a driven roller 142, the intermediate transfer belt 143, primary transfer rollers 144C, 144M, 144Y, 144K, and 144T, a secondary transfer roller 145, and a secondary facing roller 146.

The driving roller 141 bridges the intermediate transfer belt 143 along with the driven roller 142. The driving roller 141 drives and rotates, so that the bridged intermediate transfer belt 143 is moved. The driven roller 142 bridges the intermediate transfer belt 143 along with the driving roller 141. The driven roller 142 rotates as the driving roller 141 rotates and the intermediate transfer belt 143 is moved.

The intermediate transfer belt 143 is bridged over the driving roller 141 and the driven roller 142, and is moved while being contact with the photosensitive drum 122 with the rotation of the driving roller 141. The intermediate transfer belt 143 is moved while being contact with the photosensitive drum 122, so that an image formed on the photosensitive drum 122 is transferred to a surface of the intermediate transfer belt 143.

The primary transfer rollers 144C, 144M, 144Y, 144K, and 144T are respectively provided to face the photosensitive drums 122C, 122M, 122Y, 122K, and 122T across the intermediate transfer belt 143, and rotate to allow the intermediate transfer belt 143 to move. The secondary transfer roller 145 rotates while sandwiching the intermediate transfer belt 143 and a sheet between itself and the secondary facing roller 146. The secondary facing roller 146 rotates while sandwiching the intermediate transfer belt 143 and a sheet between itself and the secondary transfer roller 145.

The fixing unit 15 fixes a toner transferred to the sheet by the transfer unit 14. Fixing means that a resin component of the toner is melted and mixed on the sheet by simultaneously adding heat and a pressure to the toner. The toner transferred on the sheet by the transfer unit 14 is subjected to the fixing processing, whereby the condition of the toner on the sheet becomes stable.

The fixing unit 15 includes a conveying belt 151, a fixing belt 152, a fixing roller 153, a fixing belt conveying roller 154, a fixing-facing roller 155, and a heating unit 156.

The conveying belt 151 conveys the sheet on which the toner is transferred by the transfer unit 14 toward the fixing roller 153 and the fixing-facing roller 155. The fixing belt 152 is bridged over the fixing roller 153 and the fixing belt conveying roller 154, and is moved as these rollers rotate. The fixing roller 153 sandwiches the sheet conveyed by the conveying belt 151 between itself and the fixing-facing roller 155 disposed to face thereto, and heats and pressurizes the sheet.

The fixing belt conveying roller 154 bridges the fixing belt 152 with the fixing roller 153, and the fixing belt conveying roller 154 rotates to move the fixing belt 152. The fixing-facing roller 155 is disposed to face the fixing roller 153, and sandwiches the sheet conveyed between the fixing-facing roller 155 and the fixing roller 153.

The heating unit 156 is disposed inside the fixing roller 153, generates heat, and heats the sheet via the fixing roller 153.

The discharging unit 16 discharges the sheet on which a toner is fixed by the fixing unit 15 from the printer device 2070, and includes a discharging belt 161, a discharging roller 162, a discharging port 163, and a sheet housing unit 164.

The discharging belt 161 conveys the sheet subjected to the fixing processing by the fixing unit 15 toward the discharging port 163. The discharging roller 162 discharges the sheet conveyed by the discharging belt 161 from the discharging port 163, and houses the sheet in the sheet housing unit 164. The sheet housing unit 164 houses the sheet discharged by the discharging roller 162.

The display/operating unit 17 includes a panel display unit 171 and an operating unit 172. On the panel display unit 171, a setting value, a selection screen, and the like are displayed. Further, the panel display unit 171 is a touch panel or the like that receives an input from an operator. The operating unit 172 is operated by a user to perform an input, examples of which include a numeric keypad that receives various conditions related to image formation, and a start key that receives a copy start instruction.

Figure 26:
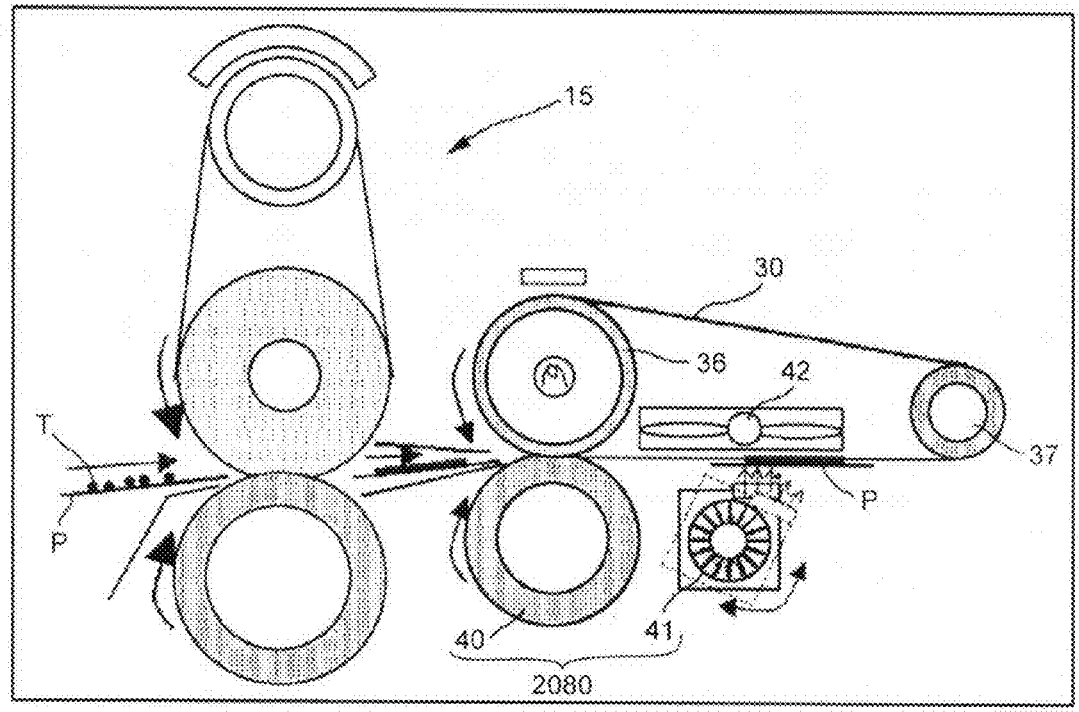
FIG. 26 is a diagram illustrating a configuration of a glosser.

FIG. 26 is a diagram illustrating a configuration of the glosser 2080 (gloss-providing apparatus: cooling and removing apparatus). The glosser 2080 of the present embodiment is closely disposed at a downstream of the fixing unit 15. However, the displacement is not indispensable, and for example, there is functionally no difference if the glosser 2080 is positioned outside the image forming apparatus.

A gloss-providing belt 30 is formed of polyimide that is a heat-resistant resin having the thickness of 10 to 200 µm, or of metal such nickel or SUS, and has an outer diameter of 80 to 300 mm. The gloss-providing belt 30 may have an elastic layer formed of silicone rubber on a surface layer with the thickness of 5 to 50 µm in order to improve adhesion property between the surface layer and a conveyed image surface. Further, the gloss-providing belt 30 may have a release layer coated with a silicone or fluorinated resin on an outermost layer in order to secure good releasing at the time of separation. A heating roller 36 has the outer diameter φ of 30 to 90 mm, and is formed of Al, SUS, or Fe. To broadly form a nip with a pressing roller 40, an elastic layer formed of silicon rubber and the like may be provided with the thickness of 0.5 to 5 mm on a surface of the roller. A separating roller 37 has an outer diameter φ of 10 to 30 mm, and is formed of Fe, Al, or SUS. The pressing roller 40 has φ of 30 to 90 mm, and has an elastic layer such as fluororubber or silicon rubber with the thickness of 1 to 50 mm formed on a core bar formed of Fe, Al, SUS, or the like. The outermost layer of the pressing roller 40 is configured from a release layer formed of a fluorine compound with the thickness of 5 to 50 μm.

The pressing roller 40 is capable of moving toward and away from the gloss-providing belt 30 using a cam (not illustrated), and is capable of variably controlling a nip width and a load by changing the center distance with the heating roller 36. Further, the pressing roller 40 is connected to a motor (not illustrated), and rotates and drives, so that the heating roller 36, the gloss-providing belt 30, and the separating roller 37 are driven to rotate.

The gloss-providing belt 30 may be provided with a cooling device such as a heat sink, a fan, heat pipe, or a Peltier element in its inside to cool the gloss-providing belt 30. In the example illustrated in FIG. 26, the internal cooling fan 42 is arranged to serve as an internal cooling device. Further, an external cooling fan 41 is provided outside the gloss-providing belt 30 at a lower portion. The external cooling fan 41 is controlled by a drive unit (not illustrated) to change the wind direction of arrows in the drawing.

After a print signal is input as a print operation, and a recording material P on which a toner T produced in an image forming unit is placed passes through the fixing unit 15, the recording material P passes through a nip unit formed by the heating roller 36 and the pressing roller 40 via the gloss-providing belt 30 in a fixing state.

The nip unit provides a pressure and the gloss-providing belt 30 applies heat, so that a remelted toner adheres to the gloss-providing belt 30 and is conveyed with the recording material in an adhering state to the gloss-providing belt 30. At the timing when the recording material enters the nip unit, the external cooling fan 41 is driven from a back surface side of the recording material, and an air current generated by a fan blows into the back surface side of the recording material, so that the recording material is rapidly cooled.

Further, the gloss-providing belt 30 is cooled by the internal cooling fan 42 and the toner image in a melting state is solidified, and a surface of the fixing image portion is smoothed by following the belt surface, and glossiness is provided. The recording material on which the toner image is placed is further conveyed while adhering to the gloss-providing belt 30, and is subjected to curvature separation and is discharged by the separating roller 37.

Next, specific processing in accordance with the types of the surface effects will be described. First, the types of specular gloss and solid gloss for providing gloss and the types of halftone matt and matt for toning down gloss will be specifically described. Here, a case will be described in which the same type of the surface effects is designated within one page. At step S35 illustrated in FIG. 20, the clear processing 2056 of the DFE 2050 determines that the surface effect designated for pixels having the density values of "238" to "255" is the specular gloss by referring to the surface-effect selection table exemplarily illustrated in FIG. 15 using the density values indicated by pixels of eight-bit gloss-control plane. In this case, the clear processing 2056 of the DFE 2050 further determines whether a region where the specular gloss is designated as the surface effect corresponds to an entire region defined by image data. When a result of the determination is positive, the clear processing 2056 of the DFE 2050 generates an inverse mask in eight-bit CMYK image data after gamma correction with Formula 1 using the image data corresponding to the region, for example. Clear-toner plane image data to be used in the printer device 2070 indicates the inverse mask. Note that the low-temperature fixing device 2090 does not use clear-toner plane image data in this region, the DFE 2050 does not generate clear-toner plane image data to be used in the low-temperature fixing device 2090. Then, at step S38 illustrated in FIG. 20, the si3 unit 2057 of the DFE 2050 integrates the clear-toner plane image data to be used in the printer device 2070 and each of the two-bit CMYK image data after the halftone processing obtained at step S33, and outputs the integrated image data and the on-off information that indicates ON of the glosser 2080 to the MIC 2060.

The MIC 2060 outputs the CMYK-color plane image data output from the DFE 2050 and the clear-toner plane image data to be used in the printer device 2070 to the printer device 2070, and turns the glosser 2080 ON using the on-off information output from the DFE 2050.

The printer device 2070 irradiates with light beams from the exposing units 124C, 124M, 124Y, 124K, and 124T, forms toner images according to toners on the photosensitive drums 122C, 122M, 122Y, 122K, and 122T using the CMYK-color plane image data output from the MIC 2060 and the clear-toner plane image data, transfers the images on a sheet, and fixes the image with heat and a pressure under a normal temperature. Consequently, the toners of CMYK and the clear toner are attached on the sheet, and the image is formed.

Following that, the glosser 2080 pressurizes the sheet with a high temperature and a high pressure. Since the clear-toner plane image data is not output to the low-temperature fixing device 2090, in the low-temperature fixing device 2090, the sheet is discharged without attaching the clear toner. As a result, the total amount of the CMYK toners and the clear toner is uniformly compressed throughout the entire region defined by the image data, high gloss can be obtained from a surface of the region.

Meanwhile, in a case where the region in which the specular gloss is designated as the surface effect corresponds to a part of the region defined by the image data, the following situation might happen. First, the above-described clear-toner plane image data that indicates the inverse mask is used for the region in which the specular gloss is designated. However, in a case where a total amount of attached CMYK toners is set to be a predetermined value or more for all pixels other than the above region, when the glosser 2080 pressurizes, the total amount of the CMYK toners and the clear toner becomes equalized in the region in which the specular gloss is designated and the region in which the total amount of attached CMYK toners is set to be a predetermined value or more, accordingly.

For example, in a case where the total amount of attached CMYK toners is set to be a predetermined value or more for all pixels that configure the region defined by the image data, the same result is obtained as the case where the specular gloss is designated for the entire region defined by the image data.

Therefore, in a case where the region in which the specular gloss is designated as the surface effect corresponds to a part of the region defined by the image data, the DFE 2050 generates the clear-toner plane image data that is the same as the case where the specular gloss is designated for the entire region defined by the image data, and pressurizes the sheet by the glosser 2080 after the clear toner is attached on the sheet. Next, clear-toner plane image data to be used in the low-temperature fixing device 2090 is generated for the sheet pressurized by the glosser 2080 in order to provide the surface effect of matt to a region other than the region in which the specular gloss is designated as the surface effect.

To be specific, the DFE 2050 generates an inverse mask with Formula 1 in a similar manner to the above description as the clear-toner plane image data to be used in the printer device 2070. Further, the DFE 2050 generates a solid mask with Formula 2 for the region other than the region in which the specular gloss is designated as the surface effect as the clear-toner plane image data to be used in the low-temperature fixing device 2090. Then, at step S38 illustrated in FIG. 20, the si3 unit 2057 of the DFE 2050 integrates the clear-toner plane image data to be used in the printer device 2070, the clear-toner plane image data to be used in the low-temperature fixing device 2090, and each of the two-bit CMYK image data after the halftone processing obtained at step S33 illustrated in FIG. 20, and outputs the integrated image data and the on-off information that indicates ON of the glosser 2080 to the MIC 2060.

The MIC 2060 outputs the CMYK-color plane image data output from the DFE 2050 and the clear-toner plane image data to be used in the printer device 2070 to the printer device 2070, turns the glosser 2080 ON using the on-off information output from the DFE 2050, and outputs, to the low-temperature fixing device 2090, the clear-toner plane image data to be used in the low-temperature fixing device 2090 from among the image data output from the DFE 2050. The printer device 2070 forms an image on which the CMYK toners and the clear toner on the sheet using the CMYK-color plane image data output from the MIC 2060 and the clear-toner plane image data. Following that, the glosser 2080 pressurizes the sheet with a high temperature and a high pressure. The low-temperature fixing device 2090 forms a toner image with the clear toner using the clear-toner plane image data output from the MIC 2060, and superimposes the toner image over the sheet having passed through the glosser 2080, and fixes the toner image on the sheet with heat at a low temperature and a pressure. As a result, in the region where the specular gloss is designated, the total amount of attached toners of the CMYK toners and the clear toner is uniformly compressed, so that high gloss can be obtained from a surface of the region. Meanwhile, in a region other than the region in which the specular gloss is designated, the surface irregularity is caused by the attachment of the clear toner with the solid mask after the pressure by the glosser 2080, so that the gloss on a surface of the region is suppressed.

Figure 20:
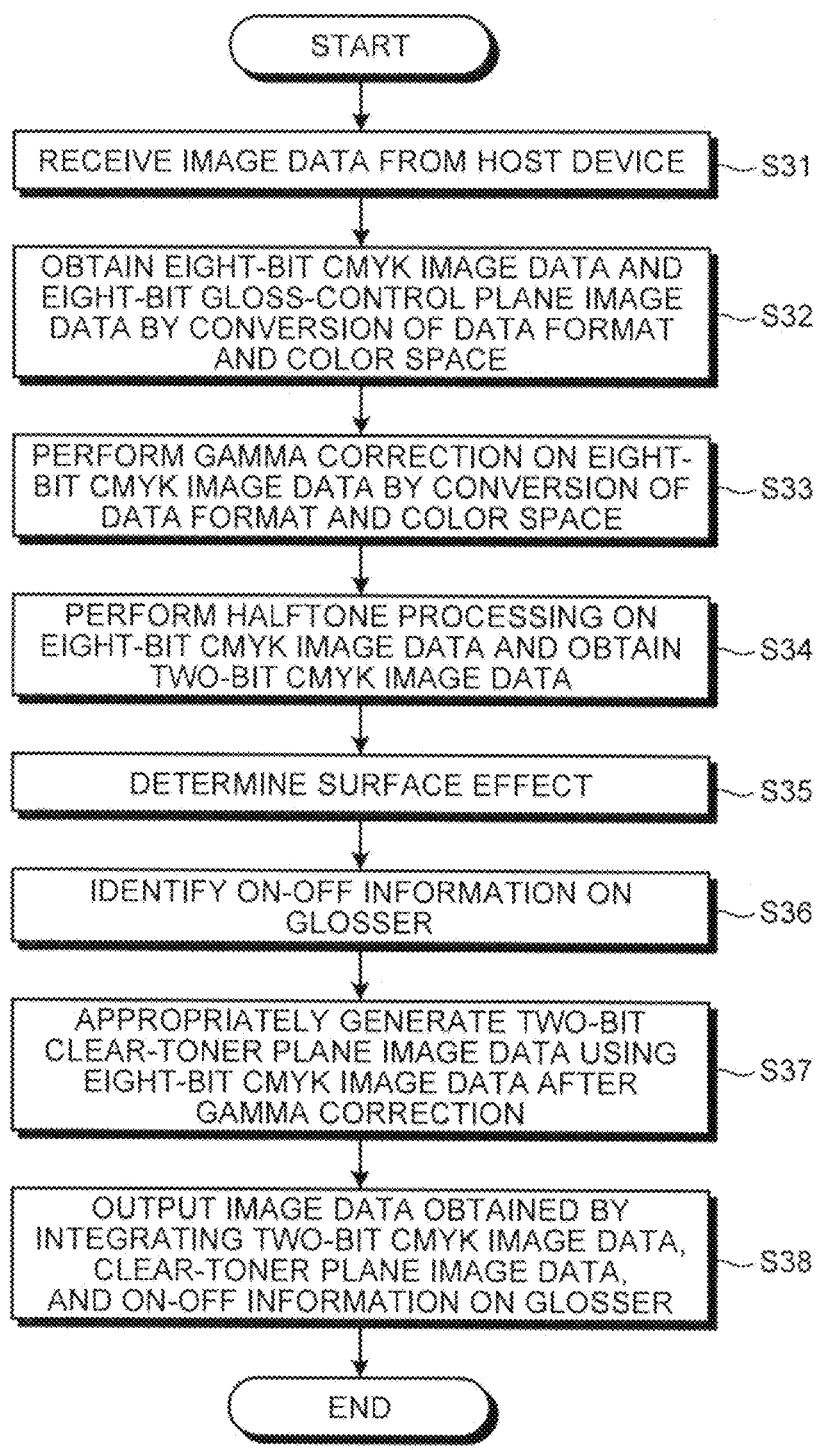
FIG. 20 is a flowchart illustrating a procedure of gloss-control processing.

Further, at step S35 illustrated in FIG. 20, the clear processing 2056 of the DFE 2050 determines that the surface effect designated for pixels having the density values of "212" to "232" is the solid gloss by referring to the surface-effect selection table using the density value indicated by pixels of eight-bit gloss-control plane, and especially determines that the surface effect is the solid gloss type 1 for the pixels having the density values of "228" to "232". In this case, the clear processing 2056 of the DFE 2050 generates an inverse mask 1 in the eight-bit CMYK image data after the gamma correction using the image data corresponding to the region. Clear-toner plane image data to be used in the printer device 2070 indicates the inverse mask 1. Note that, since the low-temperature fixing device 2090 does not use the clear-toner plane image data for the region, the DFE 2050 does not generate the clear-toner plane image data to be used in the low-temperature fixing device 2090. Then, at step S38 illustrated in FIG. 20, the si3 unit 2057 of the DFE 2050 integrates the clear-toner plane image data to be used in the printer device 2070 and each of the two-bit CMYK image data after the halftone processing obtained at step S33, and outputs the integrated image data and the on-off information that indicates OFF of the glosser 2080 to the MIC 2060. The MIC 2060 outputs the CMYK-color plane image data output from the DFE 2050 and the clear-toner plane image data to be used in the printer device 2070 to the printer device 2070, and turns the glosser 2080 OFF using the on-off information output from the DFE 2050. The printer device 2070 forms an image on which the CMYK toners and the clear toner are attached on the sheet using the CMYK-color plane image data output from the MIC 2060 and the clear-toner plane image data to be used in the printer device 2070. Since the glosser 2080 is OFF, the sheet is not pressurized at a high temperature and a high pressure afterwards. Also, since the clear-toner plane image data has not been output to the low-temperature fixing device 2090, in the low-temperature fixing device 2090, the clear toner is not attached and the sheet is discharged. As a result, in the region where the solid gloss is designated as the surface effect, the total amount of attached toners of the CMYK toners and the clear toner is relatively uniform, and slightly strong gloss can be obtained from a surface of the region.

Also, at step S35 illustrated in FIG. 20, the clear processing 2056 of the DFE 2050 determines that the surface effect designated for pixels having the density values of "23" to "43" is halftone matt by referring to the surface-effect selection table using the density values indicated by pixels of eight-bit gloss-control plane image data. In this case, the clear processing 2056 of the DFE 2050 generates image data that indicates halftone as the clear-toner plane image data to be used in the printer device 2070. Note that, since the low-temperature fixing device 2090 does not use the clear-toner plane image data for the region, the DFE 2050 does not generate the clear-toner plane image data to be used in the low-temperature fixing device 2090. Then, at step S38 illustrated in FIG. 20, the si3 unit 2057 of the DFE 2050 integrates the clear-toner plane image data to be used in the printer device 2070 and each of the two-bit CMYK image data after the halftone processing obtained at step S33, and outputs the integrated image data and the on-off information that indicates OFF of the glosser 2080 to the MIC 2060. The MIC 2060 outputs the CMYK-color plane image data output from the DFE 2050 and the clear-toner plane image data to be used in the printer device 2070 to the printer device 2070, and turns the glosser 2080 OFF using the on-off information output from the DFE 2050. The printer device 2070 forms an image on which the CMYK toners and the clear toner are attached on the sheet using the CMYK-color plane image data output from the MIC 2060 and the clear-toner plane image data to be used in the printer device 2070. Since the glosser 2080 is OFF, the sheet is not pressurized at a high temperature and a high pressure afterwards. Also, since the clear-toner plane image data has not been output to the low-temperature fixing device 2090, in the low-temperature fixing device 2090, the clear toner is not attached and the sheet is discharged. As a result, in the region where the halftone matt is designated as the surface effect, the halftone dot is added with the clear toner, whereby surface irregularity is caused, and the gloss on the surface of the region is slightly suppressed.

Also, at step S35 illustrated in FIG. 20, the clear processing 2056 of the DFE 2050 determines that the surface effect designated for pixels having the density values of "1" to "17" is matt by referring to the surface-effect selection table using the density values indicated by pixels of eight-bit gloss-control plane. In this case, the clear processing 2056 of the DFE 2050 follows a setting of another surface effect about ON and OFF of the glosser 2080 if the setting is designated within one page, and does not generate clear-toner plane image data to be used in the printer device 2070 regardless of ON or OFF and generates a solid mask as clear-toner plane image data to be used in the low-temperature fixing device 2090. Then, at step S38 illustrated in FIG. 20, the si3 unit 2057 of the DFE 2050 integrates the clear-toner plane image data to be used in the low-temperature fixing device 2090 and each of the two-bit CMYK image data after the halftone processing obtained at step S33, and outputs the integrated image data and the on-off information that indicates ON or OFF of the glosser 2080 to the MIC 2060. The MIC 2060 outputs the CMYK-color plane image data output from the DFE 2050 to the printer device 2070, and outputs, to the low-temperature fixing device 2090, the clear-toner plane image data to be used in the low-temperature fixing device 2090 from among the image data output from the DFE 2050. The printer device 2070 forms image on which the CMYK toners are attached on the sheet using the CMYK-color plane image data output from the MIC 2060. When the glosser 2080 is turned ON, the sheet is pressurized at a high temperature and a high pressure by the glosser 2080, and when the glosser 2080 is turned OFF, the sheet is not pressurized at a high temperature and a high pressure. The low-temperature fixing device 2090 forms a toner image with the clear toner using the clear-toner plane image data output from the MIC 2060, superimposes the toner image on the sheet having passed the glosser 2080, and fixes the toner image on the sheet with heat at a low temperature and a pressure. As a result, in the region where the matt is designated as the surface effect, surface irregularity is caused by the attachment of the clear toner with the solid mask, and the gloss on a surface of the region is suppressed.

Although, in the above description, a case where the same type of the surface effects is designated within one page has been described, a case where different types of surface effects are designated within one page can be similarly realized by the above-described processing. That is, in a case where a plurality of surface effects is designated within one page, density values corresponding to the types of the surface effects illustrated in FIG. 15 are set, in the gloss-control plane image data, for pixels in a region to which the types of the surface effects are to be provided. That is, in the gloss-control plane image data, a region to which a surface effect is to be provided is designated for each type of the surface effects. Therefore, the DFE 2050 simply determines a range of pixels to which the same density value is set as a region to which the same surface effect is to be provided in the gloss-control plane image data. Therefore, each surface effect can be easily realized within the one page.

However, in the gloss-control plane image data, when a plurality of types of the surface effects is designated within the one page with the density values, ON and OFF of the glosser 2080 cannot be switched within the same one page. Therefore, there are types of the surface effects that can be simultaneously realized and types of the surface effects that cannot be simultaneously realized.

As illustrated in FIG. 1, in the present embodiment that employs a configuration provided with the printer device 2070, the glosser 2080, and the low-temperature fixing device 2090, when the surface effects of the specular gloss (PG) and the matt (PM) are designated within one page, the glosser 2080 is turned ON for the specular gloss (PG), and for the matt (PM), ON or OFF of the glosser 2080 follows the designation of other surface effects in the page, according to FIG. 15. Therefore, these two types of the surface effects can be simultaneously realized within one page.

In this case, at step S35 illustrated in FIG. 20, the clear processing 2056 of the DFE 2050 determines that the surface effect designated for a region of pixels having the density values of "238" to "255" is specular gloss (PG) by referring to the surface-effect selection table exemplarily illustrated in FIG. 15 using the density values indicated by pixels of eight-bit gloss-control plane image data. Then, the clear processing 2056 of the DFE 2050 generates an inverse mask with Formula 1 using the image data corresponding to the region in each of eight-bit CMYK image data after the gamma correction. Clear-toner plane image data to be used in the printer device 2070 for the region where the surface effect of the specular gloss (PG) is designated indicates the inverse mask. Note that, since the low-temperature fixing device 2090 does not use the clear-toner plane image data for the region where the specular gloss is designated, the DFE 2050 does not generate the clear-toner plane image data to be used in the low-temperature fixing device 2090 for the region where the specular gloss is generated.

Also, at step S35 illustrated in FIG. 20, the clear processing 2056 of the DFE 2050 determines that the surface effect designated for a region of pixels having the density values of "1" to "17" is matt (PM) by referring to the surface-effect selection table in a similar manner in the above-described same one page. In this case, the clear processing 2056 of the DFE 2050 identifies the on-off information that indicates ON of the glosser 2080 by following the setting of the specular gloss that is another surface effect in the one page, does not generate the clear-toner plane image data to be used in the printer device 2070 for the region where the matt is designated, and generates the solid mask for the region where the matt is designated as the clear-toner plane image data to be used in the low-temperature fixing device 2090.

Then, at step S38 illustrated in FIG. 20, the si3 unit 2057 of the DFE 2050 integrates the clear-toner plane image data to be used in the printer device 2070 for the region where the specular gloss is designated, the clear-toner plane image data to be used in the low-temperature fixing device 2090 for the region where the matt is designated, and each of the two-bit CMYK image data after the halftone processing obtained at step S33, and outputs the integrated image data and the on-off information that indicates ON of the glosser 2080 to the MIC 2060.

The MIC 2060 outputs, to the printer device 2070, the CMYK-color plane image data and the clear-toner plane image data to be used in the printer device 2070 for the region where the specular gloss is designated from among the image data output from the DFE 2050. Also, the MIC 2060 outputs, to the low-temperature fixing device 2090, the clear-toner plane image data to be used in the low-temperature fixing device 2090 for the region where the matt is designated from among the image data output from the DFE 2050, and turns the glosser 2080 ON using the on-off information output from the DFE 2050.

The printer device 2070 irradiates with light beams from the exposing units 124C, 124M, 124Y, 124K, and 124T to form toner images in accordance with the toners on the photosensitive drums 122C, 122M, 122Y, 122K, and 122T using the CMYK-color plane image data output from the MIC 2060 and the clear-toner plane image data for the region where the specular gloss is designated, and transfers the toner images on the sheet and fixes the toner images with heat at a normal temperature and a pressure. Consequently, the CMYK toners and the clear toner are attached on the sheet, and the image is formed. Following that, the glosser 2080 pressurizes the sheet at a high temperature and a high pressure.

The low-temperature fixing device 2090 forms a toner image with the clear toner using the clear-toner plane image data for the region where the matt is designated output from the MIC 2060, superimposes the toner image on the sheet having passed through the glosser 2080, and fixes the toner image on the sheet with heat at a low temperature and a pressure. As a result, strong gloss is obtained from a surface of the region where the specular gloss is designated as the surface effect, and surface irregularity is caused by the attachment of the clear toner with the solid mask for the region where the matt is designated as the surface effect, whereby the gloss on a surface of the region is suppressed.

Further, other than the above, in a case where the surface effects of the solid gloss (G), the halftone matt (M), and the matt (PM) are designated in one page in the configuration of the present embodiment, the glosser 2080 is turned OFF for the solid gloss (G) and the halftone matt (M), and ON and OFF of the glosser 2080 follows the designation of other surface effect in the page for the matt (PM), according to FIG. 15. Therefore, these three types of the surface effects can be simultaneously realized within one page.

The above case will be more specifically described. At step S35 illustrated in FIG. 20, the clear processing 2056 of the DFE 2050 determines that the surface effect designated for region of pixels having the density values of "212" to "232" is the solid gloss by referring to the surface-effect selection table using the density values indicated by pixels of eight-bit gloss-control plane image data, and especially determines that the surface effect is the solid gloss type 1 for the pixels having the density values of "228" to "232". In this case, the clear processing 2056 of the DFE 2050 generates an inverse mask 1 in eight-bit CMYK image data after the gamma correction using the image data corresponding to the region. Clear-toner plane image data to be used in the printer device 2070 for the region where the solid gloss is designated indicates the inverse mask 1. Note that, since the low-temperature fixing device 2090 does not use the clear-toner plane image data for the region where the solid gloss is designated, the DFE 2050 does not generate the clear-toner plane image data to be used in the low-temperature fixing device 2090.

Also, in step S35, the clear processing 2056 of the DFE 2050 determines, in the above-described same one page, that the surface effect designated for region of pixels having the density values of "23" to "43" is halftone matt (M) by referring to the surface-effect selection table in a similar manner. In this case, the clear processing 2056 of the DFE 2050 generates the image data that indicates the halftone as the clear-toner plane image data to be used in the printer device 2070 for the region where the halftone matt is designated. Note that, since the low-temperature fixing device 2090 does not use the clear-toner plane image data for the region where the halftone matt is designated, the DFE 2050 does not generate the clear-toner plane image data to be used in the low-temperature fixing device 2090.

Further, at step S35 illustrated in FIG. 20, the clear processing 2056 of the DFE 2050 determines, in the above-described same one page, that the surface effect of a region of pixels having the density values of "1" to "17" is the matt (PM) by referring to the surface effect selection table in a similar manner. In this case, the clear processing 2056 of the DFE 2050 follows, regarding ON or OFF of the glosser 2080, the setting of the solid gloss and the halftone matt, which are other surface effects designated in one page, and turns the glosser 2080 OFF. The clear processing 2056 does not generate the clear-toner plane image data to be used in the printer device 2070 for the region where the matt is designated, and generates the solid mask for the region where the matt is designated as the clear-toner plane image data to be used in the low-temperature fixing device 2090.

Then, step S38 illustrated in FIG. 20, the si3 unit 2057 of the DFE 2050 integrates the clear-toner plane image data to be used in the printer device 2070 for the region where the solid gloss is designated, the clear-toner plane image data to be used in the printer device 2070 for the region where the halftone matt is designated, the clear-toner plane image data to be used in the low-temperature fixing device 2090 for the region where the matt is designated, and each of the two-bit CMYK image data after the halftone processing obtained at step S33, and outputs the integrated image data and the on-off information that indicates OFF of the glosser 2080 to the MIC 2060.

The MIC 2060 outputs, to the printer device 2070, the CMYK-color plane image data output from the DFE 2050, the clear-toner plane image data to be used in the printer device 2070 for the region where the solid gloss is designated, and the clear-toner plane image data to be used in the printer device 2070 for the region where the halftone matt is designated, and turns the glosser 2080 OFF using the on-off information output from the DFE 2050. Also, the MIC 2060 outputs, to the low-temperature fixing device 2090, the clear-toner plane image data to be used in the low-temperature fixing device 2090 for the region where the matt is designated from among the image data output from the DFE 2050.

The printer device 2070 forms an image on which the CMYK toners and the clear toners are attached on the sheet using the CMYK-color plane image data output from the MIC 2060, the clear-toner plane image data to be used in the printer device 2070 for the region where the solid gloss is designated, and the clear-toner plane image data to be used in the printer device 2070 for the region where the halftone matt is designated. Since the glosser 2080 is OFF, the sheet is not pressurized at a high temperature and a high pressure afterwards.

Further, the low-temperature fixing device 2090 forms a toner image with a clear toner on the region where the matt is designated using the clear-toner plane image data for the region where the matt is designated output from the MIC 2060, layers the toner image on the sheet, and fixes the toner image on the sheet by heat at a low temperature and a pressure.

As a result, in the region where the solid gloss is designated as the surface effect in one page, the total amount of attached toners of the CMYK toners and the clear toner is relatively uniform, and slightly strong gloss is obtained from a surface of the region. Further, in the region where the halftone matt is designated as the surface effect in one page, the halftone dot is added with the clear toner, whereby surface irregularity is caused, and the gloss on a surface of the region is slightly suppressed. Further, in the region where the matt is designated as the surface effect in one page, surface irregularity is caused by the attachment of the clear toner with the solid mask, whereby the gloss on a surface of the region is suppressed.

In this way, when a plurality of different surface effects is designated within the same one page, and when ON and OFF of the glosser 2080 needs to be switched according to the surface effects, the plurality of different surface effects can be realized in one page. However, the plurality of different surface effects where ON and OFF of the glosser 2080 needs to be switched in the one page cannot be realized within one page.

For example, in the present embodiment that employs the configuration provided with the printer device 2070, the glosser 2080, and the low-temperature fixing device 2090, when the specular gloss (PG) and the solid gloss (G) are designated within one page, the glosser 2080 is turned ON for the specular gloss (PG), and the glosser 2080 is turned OFF for the solid gloss (G) according to FIG. 15, the two types of the surface effects: specular gloss (PG) and the solid gloss (G) cannot be realized within one page.

In this way, when a plurality of different types of surface effects are designated in one page but it cannot be realized in one page, in the present embodiment, the DFE 2050 causes some types of surface effects, which cannot be simultaneously realized, to be substituted for surface effect other than the designated surface effects and realized.

Figure 27:
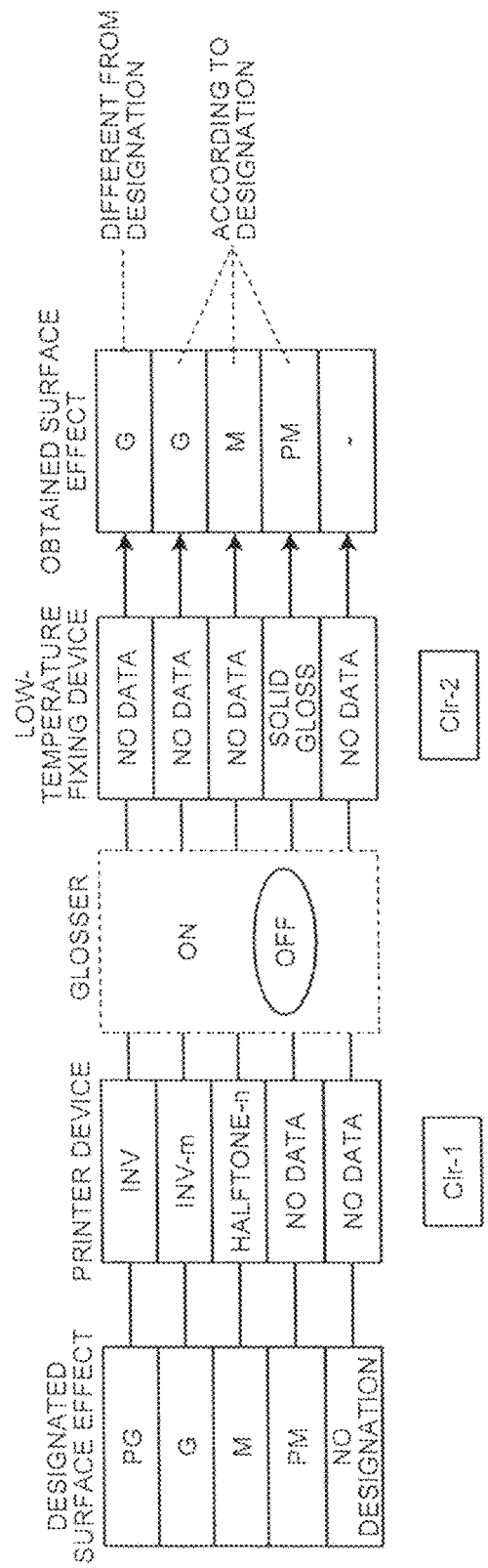
FIG. 27 illustrates comparison of types of designated surface effects, clear-toner plane image data used in the printer device, clear-toner plane image data used in a low-temperature fixing unit, and actually obtained surface effects.

For example, as exemplarily illustrated in FIG. 27, when four types of the surface effects: the specular gloss (PG), the solid gloss (G), the halftone matt (M), and the matt (PM) are designated, the DFE 2050 turns the glosser 2080 OFF, realizes the surface effects in the region determined that the surface effect is the solid gloss, the region determined that the surface effect is the halftone matt, and the region determined that the surface effect is the matt with the density values in the gloss-control plane, and selects the solid gloss as a substitution surface effect for the region determined that the surface effect is the specular gloss. Then, the DFE 2050 generates any one of inverse masks A, B, and C for the region determined that the surface effect is the specular gloss, in each of eight-bit CMYK image data after the gamma correction, as the clear-toner plane image data to be used in the printer device 2070 (corresponding to INV in FIG. 27) using the image data corresponding to the region, similarly to the case of the solid gloss. The DFE 2050 does not generate the clear-toner plane image data to be used in the low-temperature fixing device 2090. In FIG. 15, when the density values are "248" to "255", the DFE 2050 determines that the effect thereof is the specular gloss type A, and the inverse mask A is used. Also, INV-m in FIG. 27 corresponds to the inverse masks 1 to 4 in FIG. 15, and halftone-n in FIG. 27 corresponds to the halftones 1 to 4 in FIG. 15. Then, on a sheet discharged through the printer device 2070, the glosser 2080 turned OFF, and the low-temperature fixing device 2090 in the above-described manner, the region where the specular gloss is designated and the region where the solid gloss is designated are provided with the surface effect as the solid gloss, the region where the halftone matt is designated is provided with the surface effect as the halftone matt, and the region where the matt is designated is provided with the surface effect as the matt. Note that none of the surface effects is provided to a region that is not designated as a region where a surface effect is provided.

As described above, the DFE 2050 determines the existence of post-processing in the post-processing devices according to the existence or the types of the post-processing devices such as the glosser 2080 and the low-temperature fixing device 2090 following the printer device 2070, using the gloss-control plane image data in which the density values are set according to the types of surface effects designated by the user, and appropriately generates the clear-toner plane image data for attaching the clear toner. Consequently, clear-toner plane image data that provides common surface effects in image forming systems having various configurations can be generated. Various surface effects can be provided using the clear-toner plane image data by attaching a clear toner to an image formed with CMYK toner image. Therefore, the user can provide a desired surface effect to a printing sheet on which an image is formed with a minimum of fuss.

Further, in the present embodiment, a density value is set for each pixel of the gloss-control plane image data. Therefore, a plurality of types of surface effects can be provided within one page of the sheets.

As described above, in the image forming system according to the present embodiment, a density value of each pixel designated in an inverse mask of color plane image data is converted into a larger value by a certain ratio. Therefore, even in a case where a dot gain or a misregistration is caused in the image forming apparatus, the clear toner can be attached to an appropriate range, and a surface effect providing high glossiness can be realized.

Figure 28:
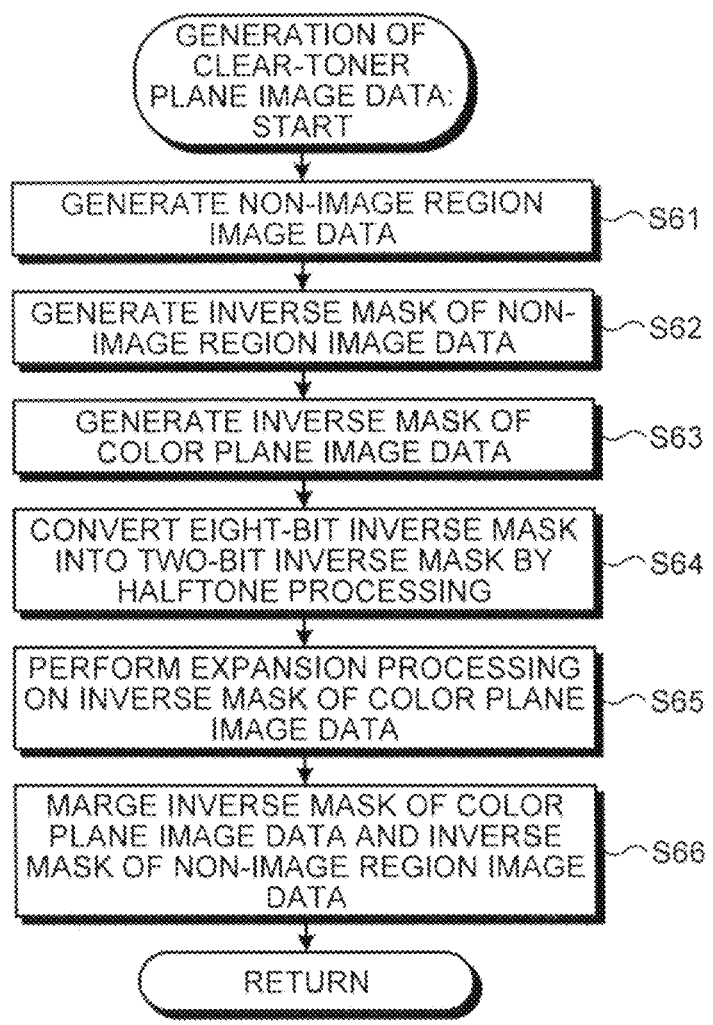
FIG. 28 is a flowchart illustrating a procedure of generation processing of clear-toner plane image data according to a first modification.

FIG. 28 is a flowchart illustrating a procedure of clear-toner plane image data generation processing according to a first modification. Processing from step S61 to step S63 in processing of generating clear-toner plane image data according to a first modification is similar to the processing from step S51 to step S53 described with reference to FIG. 22 in the embodiment.

Then, at step S63, after an inverse mask of color plane image data is generated, a halftone processing unit respectively converts the inverse mask of eight-bit color plane image data and an inverse mask of eight-bit non-image region image data into two-bit inverse masks by halftone processing (step S64).

Figure 29:
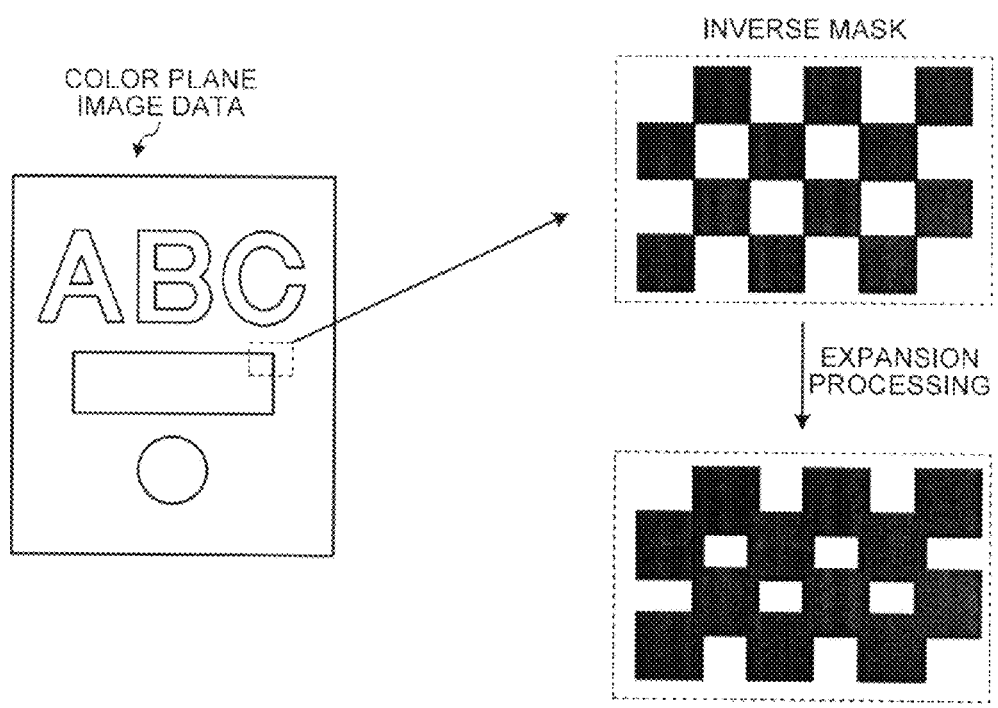
FIG. 29 is a diagram for describing expansion processing.

Next, a clear-toner plane generating unit performs expansion processing on the inverse mask of the color plane image data, in which an area of a region where image formation with a color toner is designated is expanded by a predetermined ratio (step S65). That is, the clear-toner plane generating unit according to the present example functions as an expansion processing unit. FIG. 29 is a diagram for describing the expansion processing. The clear-toner plane generating unit binarizes "00" and "01" into "0", and "10" and "11" into "1" from among pixels of the inverse mask of the two-bit color plane image data, for example. Here, the pixel of "1" corresponds to a region where image formation is designated, and the area of the pixel of "1" is changed to a larger area by a predetermined ratio. In this way, halftone can be expanded and the area to which a clear toner is attached can be expanded by a predetermined ratio by the expansion processing.

Next, the clear-toner plane generating unit merges the inverse mask of the color plane image data after the expansion processing and the inverse mask of the non-image region image data, and generates clear-toner plane image data (step S66).

In this way, in the processing of generating clear-toner plane image data according to the present example, an area to which a clear toner is attached is expanded by applying the expansion processing after the halftone processing. Consequently, even in a case where a dot gain or a misregistration is caused in a printer device 2070, the clear toner can be attached to an appropriate range, and a surface effect providing high glossiness can be realized.

Figure 30:
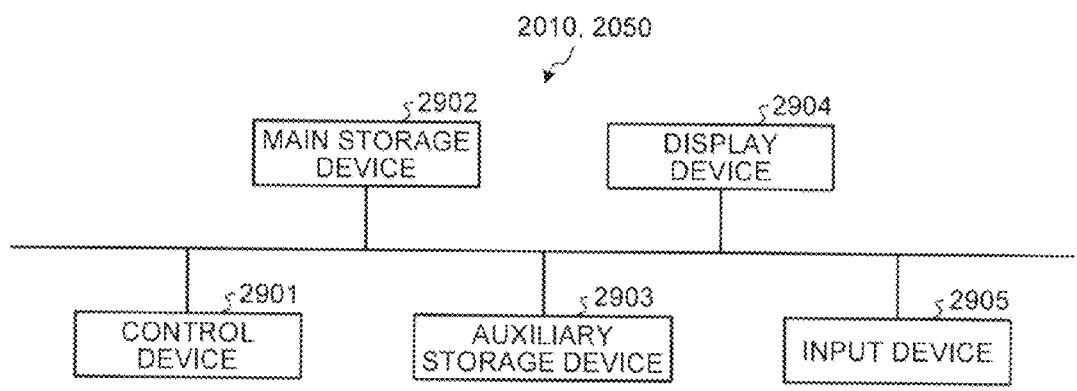
FIG. 30 is a diagram illustrating a hardware configuration of a host device and a DFE.

Hardware configurations of the host device 2010 and the DFE 2050 in the above-described embodiment will be described below. FIG. 30 is hardware configurations of the host device 2010 and the DFE 2050. The host device 2010 and the DFE 2050 mainly includes, as the hardware configuration using a normal computer, a control device 2901 such as a CPU that controls the entire device, a main storage device 2902 such as ROM or RAM that stores various types of data and various programs, an auxiliary storage device 2903 such as an HDD that stores various types of data and various programs, an input device 2905 such as a keyboard or a mouse, and a display device 2904 such as a display device.

An image processing program (including an image processing application: the same is applied in the following description) executed by the host device 2010 of the above-described embodiments is recorded in a computer-readable recording medium such as a CD-ROM, a flexible disk (FD), a CD-R, or a digital versatile disk (DVD) in a computer-installable or a computer-executable format, and is provided as a computer program product.

Alternatively, the image processing program executed by the host device 2010 of the above-described embodiment may be stored in a computer connected to a network such as the Internet, and may be provided by being downloaded via the network. Alternatively, the image processing program executed by the host devices 2010 of the above-described embodiment may be provided or distributed via the network such as the Internet.

Alternatively, the image processing program executed by the host device 2010 of the above-described embodiment may be provided by being installed in ROM or the like in advance.

The image processing program executed by the host device 2010 of the embodiment has a module configuration including the above-described units (the image processing unit, the plane data generating unit, the print data generating unit, the input control unit, and the display control unit). As actual hardware, a CPU (processor) reads the image processing program from the storage medium and executes the image processing program to load the above-described units on the main storage device, so that the image processing unit, the plane data generating unit, the print data generating unit, the input-control unit, and the display control unit are generated on the main storage device.

Print control processing executed by the DFE 2050 of the embodiment may be realized by hardware as well as by a print control program as software. In this case, the print control program executed by the DFE 2050 of the embodiment is provided by being installed in ROM or the like in advance.

The print control program executed by the DFE 2050 of the embodiment may be recorded in a computer-readable recording medium such as a CD-ROM, a flexible disk (FD), a CD-R, or a digital versatile disk (DVD) in a computer-installable or a computer-executable format, and is provided as a computer program product.

Alternatively, the print control program executed by the DFE 2050 of the embodiment may be stored in a computer connected to the network such as the Internet, and may be provided by being downloaded via the network. Alternatively, the print control program executed by the DFE 50 of the embodiment may be provided or distributed via the network such as the Internet.

The print control program executed by the DFE 2050 of the embodiment has a module configuration including the above-described units (the rendering engine, the halftone engine, the TRC, the si1 unit, the si2 unit, the si3 unit, and the clear processing). As actual hardware, a CPU (processor) reads and executes the print control program from the ROM to load the above-described units on the main storage device, so that the rendering engine, the halftone engine, the TRC, the si1 unit, the si2 unit, the si3 unit, and the clear processing are generated on the main storage device.

Although, in the above-described embodiment, the image forming system is configured to include the host device 2010, the DFE 2050, the MIC 2060, the printer device 2070, the glosser 2080, and the low-temperature fixing device 2090, the image forming system is not limited to the configuration. For example, the DFE 2050, the MIC 2060, and the printer device 2070 may be integrally formed to configure a single image forming apparatus, and the image forming apparatus may further include the glosser 2080 and the low-temperature fixing device 2090.

In the image forming system of the above-described embodiment, a plurality of color toners, i.e., CMYK toners, are used to form an image. However, an image may be formed using a single color toner.

Note that the image forming system according to the above-described embodiment includes the MIC 2060. However, the configuration is not limited thereto. Alternatively, the function and processing of the MIC 2060 may be provided to other device such as the DFE 2050 and the like, and so that a configuration without the MIC 2060 may be employed.

Hereinafter, a clear toner used in the image forming system according to the above-described embodiment will be described in detail. Here, a method of manufacturing a dry-type two-component toner including a transparent toner will be described. Note that a method of manufacturing a clear toner is not limited to the present embodiment. The clear toner may be any toner as long as it can be obtained by causing a toner constituent liquid, in which at least, polyester prepolymer having a functional group including nitrogen atoms, polyester, a colorant, and a release agent are dispersed in an organic solvent, to crosslink and/or to elongate in an aqueous medium. Hereinafter, constituent materials and a manufacturing method of toners will be described.

Polyester

Polyester is prepared by a polycondensation reaction between a polyalcohol compound and a polycarboxylic acid compound.

Examples of the polyalcohol compound (PO) include a diol (DIO) and a polyol having 3 or more valances (TO), and the DIO alone, and a mixture of the DIO and a small amount of the TO are favorably used as the PO. Examples of the diol (DIO) include alkylene glycol (e.g., ethylene glycol, 1,2-propylene glycol, 1,3-propylene glycol, 1,4-butanediol and 1,6-hexanediol); alkylene ether glycols (e.g., diethylene glycol, triethylene glycol, dipropylene glycol, polyethylene glycol, polypropylene glycol and polytetramethylene ether glycol); alicyclic diols (e.g., 1,4-cyclohexane dimethanol and hydrogenated bisphenol A); bisphenols (e.g., bisphenol A, bisphenol F, and bisphenol S); adducts of the alicyclic diols mentioned above with an alkylene oxide (e.g., ethylene oxide, propylene oxide and butylene oxide); and adducts of the bisphenols mentioned above with an alkylene oxide (e.g., ethylene oxide, propylene oxide and butylene oxide); etc.

Among these compounds, alkylene glycols having 2 to 12 carbon atoms and adducts of a bisphenol with an alkylene oxide are favorable. Adducts of bisphenol with an alkylene oxide and a mixture of the adduct of a bisphenol with an alkylene oxide and the alkylene glycol having 2 to 12 carbon atoms are particularly favorable.

Examples of the polyol having 3 or more valances (TO) include aliphatic polyols having 3 to 8 or more valances (e.g., glycerin, trimethylolethane, trimethylol propane, pentaerythritol, and sorbitol), phenols having 3 or more valances (e.g., trisphenol PA, phenol novolac, and cresol novolac), and alkylene oxide adducts of polyphenols having 3 or more valances.

Examples of the polycarboxylic acids (PC) include dicarboxylic acids (DIC) and polycarboxylic acids having 3 or more valances (TC). The DIC alone, and a mixture of the DIC and a small amount of the TC are favorably used as the PC. Examples of the dicarboxylic acids (DIC) include alkylene dicarboxylic acids (e.g., succinic acid, adipic acid and sebacic acid); alkenylene dicarboxylic acids (e.g., maleic acid and fumaric acid); and aromatic dicarboxylic acids (e.g., phthalic acid, isophthalic acid, terephthalic acid, and naphthalene dicarboxylic acids).

Among these compounds, alkenylene dicarboxylic acids having 4 to 20 carbon atoms and aromatic dicarboxylic acids having 8 to 20 carbon atoms are favorably used. Examples of the polycarboxylic acids having 3 or more valances (TC) include aromatic polycarboxylic acids having 9 to 20 carbon atoms (e.g., trimellitic acid and pyromellitic acid). The polycarboxylic acid (PC) may be reacted with the polyol (PO)

using acid anhydrides or lower alkyl esters (e.g., methyl ester, ethyl ester, and isopropyl ester) of the above-described materials.

A ratio of the polyol (PO) and the polycarboxylic acid (PC) is normally set in a range between 2/1 and 1/1, favorably between 1.5/1 and 1/1, and more favorably between 1.3/1 and 1.02/1 as an equivalent ratio [OH]/[COOH] between a hydroxyl group [OH] and a carboxyl group [COOH].

The polycondensation reaction between the polyol (PO) and the polycarboxylic acid (PC) is carried out by heating the PO and the PC to from 150 to 280° C. in the presence of a known catalyst for esterification such as tetrabutoxy titanate and dibutyltin oxide and removing produced water under a reduced pressure as necessary to obtain a polyester having hydroxyl groups. The polyester favorably has a hydroxyl value of 5 or more, and an acid value of typically from 1 to 30, and favorably from 5 to 20. When the polyester has the acid value, the resultant toner tends to be negatively charged to have good affinity with a recording sheet, and low-temperature fixability of the toner on the recording sheet improves. However, when the acid value exceeds 30, the resultant toner is not stably charged and the stability becomes worse by environmental variations.

The polyester favorably has a weight-average molecular weight of from 10,000 to 400,000, and more favorably from 20,000 to 200,000. When the weight-average molecular weight is less than 10,000, offset resistance of the resultant toner deteriorates. By contrast, when the weight-average molecular weight exceeds 400,000, low-temperature fixability thereof deteriorates.

The polyester favorably includes a urea-modified polyester as well as an unmodified polyester obtained by the above-described polycondensation reaction. The urea-modified polyester is prepared by reacting a polyisocyanate compound (PIC) with a carboxyl group or a hydroxyl group at the end of the polyester obtained by the above-described polycondensation reaction to form a polyester prepolymer (A) having an isocyanate group, and reacting amine with the polyester prepolymer (A) to crosslink and/or elongate a molecular chain thereof.

Examples of the polyisocyanate compound (PIC) include aliphatic polyisocyanate (e.g., tetramethylene diisocyanate, hexamethylene diisocyanate, and 2,6-diisocyanatomethyl caproate); alicyclic polyisocyanate (e.g., isophorone diisocyanate, and cyclohexyl methane diisocyanate); aromatic diisocyanate (e.g., tolylene diisocyanate, and diphenyl methane diisocyanate); aromatic aliphatic diisocyanate (e.g., .α., .α., .α', .α'-tetramethylxylene diisocyanate); isocyanurates; compounds in which the polyisocyanate is blocked with a phenol derivative, oxime, or caprolactam; and a mixture of two or more selected from the foregoing polyisocyanates.

A ratio of the polyisocyanate (PIC) is, as an equivalent ratio [NCO]/[OH] of isocyanate groups [NCO] to hydroxyl groups [OH] of polyester having hydroxyl groups, typically from 5/1 to 1/1, favorably from 4/1 to 1.2/1, and more favorably from 2.5/1 to 1.5/1. When [NCO]/[OH] exceeds 5, low-temperature fixability deteriorates. When a molar ratio of [NCO] is less than 1, a urea content in ester of the modified polyester decreases, which may impair hot offset resistance.

An amount of polyisocyanate (PIC) constituting component in the polyester prepolymer (A) having an isocyanate group is typically 0.5 to 40 wt %, favorably 1 to 30 wt %, and more favorably 2 to 20 wt %. When the amount thereof is less than 0.5 wt %, hot offset resistance may be impaired and heat resistance preservability and low-temperature fixability may not be attained together. Also, when the amount thereof exceeds 40 wt %, low-temperature fixability may be impaired.

The number of the isocyanate groups included in a molecule of the polyester prepolymer (A) is typically 1, favorably 1.5 to 3 on average, and more favorably 1.8 to 2.5 on average. When the number thereof per molecule is less than 1, a molecular weight of the urea-modified polyester becomes small, which may impair hot offset resistance.

Next, examples of amines (B) reacted with the polyester prepolymer (A) include diamines (B1), polyamines (B2) having 3 or more amino groups, amino alcohols (B3), amino mercaptans (B4), amino acids (B5), and blocked amines (B6) in which the amines (B1 to B5) described above are blocked.

Examples of the diamine (B1) include aromatic diamine (e.g., phenylene diamine, diethyl toluene diamine, and 4,4'-diaminodiphenyl methane); alicyclic diamine (e.g., 4,4'-diamino-3,3'-dimethyldicyclohexyl methane, diamine cyclohexane, and isophorone diamine); and aliphatic diamine (e.g., ethylene diamine, tetramethylene diamine, and hexamethylene diamine).

Examples of the polyamines (B2) having three or more amino groups include diethylene triamine and triethylene tetramine. Examples of the amino alcohols (B3) include ethanol amine and hydroxyethyl aniline. Examples of the amino mercaptan (B4) include aminoethyl mercaptan and aminopropyl mercaptan.

Examples of the amino acids (B5) include amino propioic acid and amino caproic acid. Examples of the blocked amines (B6) include ketimine compounds prepared by reacting one of the amines B1 to B5 described above with ketones (acetone, methyl ethyl ketone and methyl isobutyl ketone); and oxazoline compounds. Among the above-described amines (B), the B1 and a mixture of the B1 and a small amount of the B2 are favorably used.

A ratio of the amines (B) is, as equivalent ratio [NCO]/[NHx] of isocyanate groups [NCO] in the prepolymer having an isocyanate group, to amino groups [NHx] in the amine (B), typically 1/2 to 2/1, favorably 1.5/1 to 1/1.5, and more favorably 1.2/1 to 1/1.2. When [NCO]/[NHx] exceeds 2, or is less than ½, a molecular weight of urea-modified polyester decreases, resulting in deterioration of hot offset resistance.

The urea-modified polyester may include a urethane bonding as well as a urea bonding. The molar ratio of the urea bonding to the urethane bonding is typically 100/0 to 10/90, favorably 80/20 to 20/80, and more favorably 60/40 to 30/70. When the molar ratio of the urea bond is less than 10%, hot offset resistance of a resulting toner deteriorates.

The urea-modified polyester is prepared by a method such as a one-shot method. Polyol (PO) and polycarboxylic acid (PC) are heated to 150 to 280° C. in the presence of a known esterification catalyst, such as tetrabutoxy titanate and dibutyl tin oxide, generated water is removed under the reduced pressure as needed, so that polyester having a hydroxyl group is obtained. Next, the polyisocyanate (PIC) is reacted with the polyester at 40 to 140° C. to form a polyester prepolymer (A) having an isocyanate group. Further, the amines (B) are reacted with the polyester prepolymer (A) at from 0 to 140° C. to form a urea-modified polyester.

When PIC is reacted, and A and B are reacted, a solvent may be used as needed. Examples of a usable solvent include those inert to polyisocyanate (PIC), such as an aromatic solvent (e.g., toluene, and xylene); ketones (e.g., acetone, methyl ethyl ketone, and methyl isobutyl ketone); esters (e.g., ethyl acetate); amides (e.g., dimethyl formamide, and dimethyl acetoamide); and ethers (e.g., tetrahydrofuran).

A reaction terminator may be used as needed in the crosslink and/or the elongation reaction between the polyester prepolymer (A) and the amines (B) to control a molecular weight of the resultant urea-modified polyester. Examples of the reaction terminators include monoamines (e.g., diethylamine, dibutylamine, butylamine and laurylamine), and their blocked compounds (e.g., ketimine compounds).

The weight-average molecular weight of the urea-modified polyester is typically 10,000 or more, favorably 20,000 to 10,000,000, and more favorably 30,000 to 1,000,000. When the weight-average molecular weight is less than 10,000, hot offset resistance deteriorates. The number-average molecular weight of the urea-modified polyester and the like is not particularly limited when the above-described unmodified polyester is used. The weight-average molecular weight may just be the number-average molecular weight. However, when the urea-modified polyester is used alone, the number-average molecular weight is typically 2,000 to 15,000, favorably 2,000 to 10,000, and more favorably 2,000 to 8,000. When the number-average molecular weight exceeds 20,000, low-temperature fixability and glossiness when the toner is used in a full color device deteriorate.

A combination of the urea-modified polyester and the unmodified polyester improves low-temperature fixability and glossiness when the toner is used in a full color printer device. Therefore, it is more favorable than the urea-modified polyester is used alone. Note that the unmodified polyester may include polyester modified by chemical bonding other than urea bonding.

It is favorable that the urea-modified polyester at least partially mixes with the unmodified polyester to improve the low-temperature fixability and hot offset resistance. Therefore, the urea-modified polyester and the unmodified polyester favorably have a similar composition.

Further, a weight ratio between the unmodified polyester and the urea-modified polyester is typically 20/80 to 95/5, favorably 70/30 to 95/5, more favorably 75/25 to 95/5, and even more favorably 80/20 to 93/7. When the weight ratio of the urea-modified polyester is less than 5%, the hot offset resistance deteriorates, and this also brings a disadvantage in attaining heat resistance preservability and low-temperature fixability together.

A glass transition temperature (Tg) of a binder resin including the unmodified polyester and urea-modified polyester is typically 45 to 65° C., and favorably 45 to 60° C. When the glass transition temperature is less than 45° C., the heat resistance of the toner deteriorates. By contrast, when the glass transition temperature exceeds 65° C., the low temperature fixability deteriorates.

Because the urea-modified polyester is likely to be present on a surface of toner base particles, the resultant toner has better heat resistance preservability than known polyester toners even though the glass transition temperature of the urea-modified polyester is low.

Colorant

As colorant, all known dyes and pigments can be used, and examples of the colorant include carbon black, a nigrosin dye, iron black, naphthol yellow S, Hansa yellow (10G, 5G and G), cadmium yellow, yellow iron oxide, yellow ocher, yellow lead, titanium yellow, polyazo yellow, oil yellow, Hansa yellow (GR, A, RN and R), pigment yellow L, benzidine yellow (G and GR), permanent yellow (NCG), vulcan fast yellow (5G, R), tartrazinelake, quinoline yellow lake, anthrasan yellow BGL, isoindolinon yellow, colcothar, red lead, lead vermilion, cadmium red, cadmium mercury red, antimony vermilion, permanent red 4R, parared, fiser red, parachloroorthonitro anilin red, lithol fast scarlet G, brilliant fast scarlet, brilliant carmine BS, permanent red (F2R, F4R, FRL, FRLL and F4RH), fast scarlet VD, vulcan fast rubin B, brilliant scarlet G, lithol rubin GX, permanent red FSR, brilliant carmine 6B, pigment scarlet 3B, Bordeaux 5B, toluidine Maroon, permanent Bordeaux F2K, Helio Bordeaux BL, Bordeaux 10B, BON maroon light, BON maroon medium, eosin lake, rhodamine lake B, rhodamine lake Y, alizarin lake, thioindigo red B, thioindigo maroon, oil red, quinacridone red, pyrazolone red, polyazo red, chrome vermilion, benzidine orange, perinone orange, oil orange, cobalt blue, cerulean blue, alkali blue lake, peacock blue lake, Victoria blue lake, metal-free phthalocyanine blue, phthalocyanine blue, fast sky blue, indanthrene blue (RS and BC), indigo, ultramarine, iron blue, anthraquinone blue, fast violet B, methyl violet lake, cobalt purple, manganese violet, dioxane violet, anthraquinone violet, chrome green, zinc green, chromium oxide, viridian, emerald green, pigment green B, naphthol green B, green gold, acid green lake, malachite green lake, phthalocyanine green, anthraquinone green, titanium oxide, zinc flower, lithopone, and a mixture thereof. An amount of the colorant in the toner is typically 1 to 15% by weight, favorably 3 to 10% by weight.

The colorant can form a composite with a resin, which can be used as a master batch. Examples of a binder resin used for manufacturing the master batch or kneaded together with the master batch include styrene polymers and substituted styrene polymers (e.g., polystyrenes, poly-p-chlorostyrenes, and polyvinyltoluenes), copolymers of vinyl compounds and the above-described styrene polymers or substituted styrene polymers, polymethyl methacrylates, polybutyl methacrylates, polyvinyl chlorides, polyvinyl acetates, polyethylenes, polypropylenes, polyesters, epoxy resins, epoxy polyol resins, polyurethanes, polyamides, polyvinyl butyrals, polyacrylic acids, rosins, modified rosins, terpene resins, aliphatic or alicyclic hydrocarbon resins, aromatic petroleum resins, chlorinated paraffins, paraffin waxes, etc. These resins can be used alone or in combination. To create a transparent toner, simply remove the above-described colorant.

Charge Controlling Agent

As for a charge controlling agent, any known charge controlling agents can be used. Examples of the charge controlling agent include nigrosine dye, triphenylmethane dye, chrome-containing metal complex dye, molybdic acid chelate pigment, rhodamine dye, alkoxy amine, quaternary ammonium salt (including fluorine-modified quaternary ammonium salt), alkylamide, phosphorus, phosphorus compound, tungsten, tungsten compound, fluorine active agent, metal salt of salicylic acid, and metal salt of salicylic acid derivatives.

Specific examples thereof include nigrosine dye BONTRON 03, quaternary ammonium salt BONTRON P-51, metal-containing azo dye BONTRON S-34, oxynaphthoic acid-based metal complex E-82, salicylic acid-based metal complex E-84 and phenol condensate E-89 (all manufactured by Orient Chemical Industries Co., Ltd.); quaternary ammonium salt molybdenum complex TP-302 and TP-415 (all manufactured by Hodogaya Chemical Co., Ltd.); quaternary ammonium salt COPY CHARGE PSY VP 2038, triphenylmethane derivative COPY BLUE PR, quaternary ammonium salt COPY CHARGE NEGVP2036 and COPY CHARGE NX VP434 (all manufactured by Hoechst AG); LRA-901, and boron complex LR-147 (manufactured by Japan Carlit Co., Ltd.); copper phthalocyanine; perylene; quinacridone; azo pigments; and polymeric compounds having, as a functional group, a sulfonic acid group, carboxyl group, quaternary ammonium salt, etc. Among the above-described examples, materials negatively charging the toner are preferably used.

An amount of the charge controlling agent is determined depending on the species of the binder resin used, and toner manufacturing method (such as dispersion method) used, and is not particularly limited. However, the amount of the charge controlling agent is typically used in a range from 0.1 to 10 parts by weight per 100 parts by weight of the binder resin. A range of 0.2 to 5 parts by weight is more favorable. When the amount thereof exceeds 10 parts by weight, the toner has too large a charge quantity, which lowers an effect of the charge controlling agent, and increases an electrostatic attraction force between the toner and a developing roller. As a result, flowability of a developer and an image density may be degraded or lowered.

Release Agent

Low melting point waxes, for example, which have a melting point of 50 to 120° C., are available as a release agent. Such low melting point waxes effectively work as a release agent between a fixing roller and a toner boundary in dispersion with the binder resin. Thereby, it is possible to realize effective high temperature offset without applying a release agent, such as oil, on the fixing roller. Such waxes may have the following constituents.

Waxes may include waxes derived from plants, such as carnauba, cotton wax, wood wax, rice wax, waxes derived from animals, such as yellow beeswax and lanolin, waxes derived from mineral substances, such as ozokerite and cercine, and petroleum waxes, such as paraffin wax, microcrystalline, and petrolatum. Apart from these natural waxes, synthesized hydrocarbon waxes, such as Fischer-Tropsch wax and polyethylene wax, and synthesized wax, such as ester, ketone and ether, may be used.

In addition, aliphatic amide such as 12-hydroxystearate amide, amide stearate, imide phthalate anhydride and chlorinated hydrocarbon, crystalline polymer resin having low molecular weight homopolymer or copolymer such as poly-n-laurylmethacrylate and poly-n-stearylmethacrylate (for example, n-stearylacrylate-ethylmethacrylate copolymer), and crystalline polymer which side chain has long alkyl group may be used.

A charge control agent and a release agent together with master batch and binder resin may be fused and mixed, and may be dissolved and dispersed in organic solvent.

External Additive

As an external additive for aiding flowability, developability, and charging ability of the toner particles, inorganic particles are favorably used. A primary particle diameter of the inorganic particles is favorably $5 \times 10^{-3}$ to 2 μm, more favorably $5 \times 10^{-3}$ to 0.5 μm. Moreover, a specific surface area by a BET method is favorably 20 to 500 m$^2$/g. A ratio of the inorganic particles in use is favorably 0.01 to 5 wt %, more favorably 0.01 to 2.0 wt %, relative to the toner.

Specific examples of the inorganic particles include silica, alumina, titanium oxide, barium titanate, magnesium titanate, calcium titanate, strontium titanate, zinc oxide, tin oxide, quartz sand, clay, mica, wollastonite, diatomaceous earth, chromic oxide, cerium oxide, red iron oxide, antimony trioxide, magnesium oxide, zirconium oxide, barium sulfate, barium carbonate, calcium carbonate, silicon carbide, and silicon nitride.

Among these materials, a combination of hydrophobic silica particles and hydrophobic titanium oxide particles are favorably used as an additive to provide flowability. In particular, when these particles each having an average particle diameter of $5 \times 10^{-2}$ μm or less are agitated and mixed, an electrostatic force and van der Waals force with the toner particles are considerably improved. In addition, even in an agitation performed within the developing device in order to attain desired charging level, the additive to provide flowability is hardly released from the toner particles. As a result, a firefly-free good image can be obtained. Further, the amount of the residual toner can be reduced.

While titanium oxide fine particles have high environmental stability and image density stability, the titanium oxide fine particles have an insufficient electrification start feature. Therefore, if more titanium oxide fine particles are contained than silica fine particles, this adverse effect becomes more influential. However, if hydrophobic silica particles and hydrophobic titanium oxide particles are contained within a range from 0.3 to 1.5 wt %, a desired electrification start feature is obtained without significant damage. In other words, even if an image is repeatedly copied, stable image quality can be obtained.

Next, a method of manufacturing a toner will be described. Although description of a favorable manufacturing method will be provided here, the method is not limited thereto.

Method of Manufacturing a Toner

1) The colorant, the unmodified polyester, the polyester prepolymer having an isocyanate group, and the release agent are dispersed in an organic solvent to obtain toner constituent liquid.

From the viewpoint of removal after formation of toner base particles, it is favorable that the organic solvent be volatile and have a boiling point of less than 100° C. Examples of the organic solvent include toluene, xylene, benzene, carbon tetrachloride, methylene chloride, 1,2-dichloroethane, 1,1,2-trichloroethane, trichloroethylene, chloroform, monochlorobenzene, dichloroethylidene, methyl acetate, ethyl acetate, methyl ethyl ketone, and methyl isobutyl ketone, and these may be used independently, or in combination.

Among them, particularly favored are an aromatic solvent, such as toluene, and xylene, and a halogenated hydrocarbon, such as methylene chloride, 1,2-dichloroethane, chloroform, and carbon tetrachloride. An amount of the organic solvent used per 100 parts by weight of the polyester prepolymer is typically 0 to 300 parts by weight, favorably 0 to 100 parts by weight, and more favorably 25 to 70 parts by weight.

2) The toner constituent liquid is emulsified in an aqueous medium under the presence of a surfactant and a particulate resin.

The aqueous medium may include water alone or a mixture of water and an organic solvent. Examples of the organic solvent include alcohol (e.g., methanol, isopropanol, and ethylene glycol), dimethyl formamide, tetrahydrofuran, cellosolves (e.g., methyl cellosolve), and lower ketones (e.g., acetone, and methyl ethyl ketone). The toner constituent liquid includes the aqueous medium in an amount of 50 to 2,000 parts by weight, and favorably 100 to 1,000 parts by weight based on 100 parts by weight of the toner constituent liquid. When the amount of the aqueous medium is less than 50, the toner constituent liquid is not well dispersed and toner particles having a predetermined particle diameter cannot be formed. By contrast, when the amount of the aqueous medium exceeds 20,000 parts by weight, production costs increase.

Also, a dispersant such as a surfactant or resin fine particles is optionally included in the aqueous medium to improve the dispersion therein.

Examples of the surfactants include anionic surfactants such as alkylbenzene sulfonic acid salts, α-olefin sulfonic acid salts, and phosphoric acid salts; cationic surfactants such as amine salts (e.g., alkyl amine salts, aminoalcohol fatty acid derivatives, polyamine fatty acid derivatives, and imidazoline) and quaternary ammonium salts (e.g., alkyltrimethyl ammonium salts, dialkyldimethyl ammonium salts, alkyldimethyl benzyl ammonium salts, pyridinium salts, alkyl isoquinolinium salts, and benzethonium chloride); nonionic surfactants such as fatty acid amide derivatives and polyhydric alcohol derivatives; and ampholytic surfactants such as alanine, dodecyldi(aminoethyl)glycin, di(octylaminoethyle) glycin, and N-alkyl-N,N-dimethylammonium betaine.

Moreover, a surfactant having a fluoroalkyl group can achieve a dispersion having high dispersibility even when a smaller amount of the surfactant is used. Favorable examples of anionic surfactants having a fluoroalkyl group include C2-C10 fluoroalkyl carboxylic acid or a metal salt thereof, disodium perfluorooctane sulfonyl glutamate, sodium 3-[.ω-fluoroalkyl(C6-C11)oxy)-1-alkyl(C3-C4) sulfonate, sodium 3-[.ω-fluoroalkanoyl(C6-C8)-N-ethylamino]-1-propanesulfonate, fluoroalkyl(C11-C20) carboxylic acid or a metal salt thereof, perfluoroalkylcarboxylic acid (C7-C13) or a metal salt thereof, perfluoroalkyl(C4-C12)sulfonate or a metal salt thereof, perfluorooctanesulfonic acid diethanol amide, N-propyl-N-(2-hydroxyethyl)perfluorooctanesulfone amide, perfluoroalkyl(C6-C10)sulfoneamidepropyltrimethylammonium salt, a salt of perfluoroalkyl(C6-C10)-N-ethylsulfonylglycin and monoperfluoroalkyl(C6-C16) ethylphosphate.

Examples of product names of the products include SUR-FLON S-111, S-112, S-113 (manufactured by Asahi Glass Co., Ltd.); FRORARD FC-93, FC-95, FC-98, FC-129 (manufactured by Sumitomo 3M Ltd.); UNIDYNE DS-101, DS-102 (manufactured by Daikin Industries, Ltd.); MEGA-FACE F-110, F-120, F-113, F-191, F-812, F-833 (manufactured by DIC Corporation); EFTOP EF-102, 103, 104, 105, 112, 123A, 123B, 306A, 501, 201, 204 (manufactured by Tohchem Products Co., Ltd.); and FUTARGENT F-100, F150 (manufactured by NEOS COMPANY LIMITED).

Examples of the cationic surfactant include an aliphatic primary, secondary or tertiary amine acid containing a fluoroalkyl group, aliphatic quaternary ammonium salt such as perfluoroalkyl(C6-C10)sulfonic amide propyl trimethyl ammonium salt, benzalkonium salt, benzetonium chloride, pyridinium salt and imidazolinium salt. As for the cationic surfactant, commercial products can be used. Examples of product names of the products include SURFLON S-121 (manufactured by Asahi Glass Co., Ltd.); FRORARD FC-135 (manufactured by Sumitomo 3M Ltd.); UNIDYNE DS-202 (manufactured by Daikin Industries, Ltd.); MEGA-FACE F-150, F-824 (manufactured by DIC Corporation); EFTOP EF-132 (manufactured by Tohchem Products Co., Ltd.); and FUTARGENT F-300 (manufactured by NEOS COMPANY LIMITED).

The resin particles are added to stabilize toner base particles formed in the aqueous medium. Therefore, the resin particles are favorably added so as to have coverage within a range from 10 to 90% over a surface of the toner base particles.

For example, such resin fine particles may be methyl polymethacrylate particles of 1 µm and 3 µm, polystyrene particles of 0.5 µm and 2 µm, poly(styrene-acrylonitrile) particles of 1 µm, commercially, PB-200H (which is produced by Kao Co.), SGP, SGP-3G (Soken Chemical & Engineering Co., Ltd.), technopolymer SB (Sekisui Plastics Co., Ltd.), micropearl (Sekisui Chemical Co., Ltd.) or the like.

Also, an inorganic dispersant such as calcium triphosphate, calcium carbonate, titanium oxide, colloidal silica, and hydroxyapatite may be used.

To make dispersed drops stable, polymer protective colloid may be used together with the above-mentioned resin fine particles and inorganic dispersant. For example, acids such as acrylic acid, methacrylic acid, .α-cyanoacrylic acid, .α-cyanomethacrylic acid, itaconic acid, crotonic acid, fumaric acid, maleic acid, and maleic anhydride; a (meth)acryl monomer containing a hydroxyl group, such as .β-hydroxyethyl acrylate, .β-hydroxyethyl methacrylate, .β-hydroxypropyl acrylate, .β-hydroxypropyl methacrylate, .γ-hydroxypropyl acrylate, .γ-hydroxypropyl methacrylate, 3-chloro-2-hydroxypropyl acrylate, 3-chloro-2-hydroxypropyl methacrylate, diethylene glycol monoacrylic acid ester, diethylene glycol monoacrylic acid ester, glycerin monoacrylic acid ester, glycerin monomethacrylic acid ester, N-methylol acryl amide, and N-methylol methacryl amide; vinyl alcohol or ethers with vinyl alcohol, such as vinylmethyl ether, vinylethyl ether, and vinylpropyl ether; esters of vinyl alcohol with a compound containing a carboxyl group, such as vinyl acetate, vinyl propionate, and vinyl butyrate; acryl amides, such as acryl amide, methacryl amide, diacetone acryl amide or methylol compounds of the preceding amides; acid chlorides, such as acrylic acid chloride, and methacrylic acid chloride; a homopolymer or copolymer containing a nitrogen atom or its heterocycle, such as vinyl pyridine, vinyl pyrrolidone, vinyl imidazole, and ethylene imine; polyoxyethylenes, such as polyoxy ethylene, polyoxypropylene, polyoxy ethylene alkyl amine, polyoxypropylene alkyl amine, polyoxyethylene alkyl amide, polyoxypropylene alkyl amide, polyoxyethylene nonylphenyl ether, polyoxyethylene laurylphenyl ether, polyoxyethylene stearylphenyl ester, and polyoxyethylene nonylphenyl ester; and celluloses such as methyl cellulose, hydroxyethyl cellulose, and hydroxypropyl cellulose can be used.

The dispersion method is not particularly limited, and known methods such as low-speed shearing methods, high-speed shearing methods, friction methods, high-pressure jet methods, and ultrasonic methods can be used. Among the above-described methods, use of the high-speed shearing disperser is favorable to yield dispersed elements having a particle diameter of 2 to 20 µm can be easily prepared. When a high-speed shearing type dispersion machine is used, the rotation speed is not particularly limited, but the rotation speed is typically 1,000 to 30,000 rpm, and favorably 5,000 to 20,000 rpm. The dispersion time is not particularly limited, but is typically from 0.1 to 5 minutes for a batch method. The temperature in the dispersion process is typically 0 to 150° C. (under pressure), and preferably 40 to 98° C.

3) While the emulsion is prepared, amines (B) are added thereto to react with the polyester prepolymer (A) having an isocyanate group. This reaction is accompanied by crosslink and/or elongation of a molecular chain. The reaction time depends on reactivity of an isocyanate structure of the polyester prepolymer (A) and amines (B), but is typically 10 to 40 hours, and favorably 2 to 24 hours. The reaction temperature is typically 0 to 150° C., and favorably 40 to 98° C. In addition, a known catalyst can be used as needed. Specific examples include dibutyl tin laurate and dioctyl tin laurate.

4) After completion of the reaction, organic solvent is removed from the emulsified dispersed reactant, and subsequently the resulting material is cleaned and dried to obtain toner base particles.

The emulsified dispersion is gradually heated while stirred in a laminar flow, and an organic solvent is removed from the dispersion after stirred strongly when the dispersion has a specific temperature, whereby toner base particles having the shape of a spindle can be produced. When an acid such as calcium phosphate or a material soluble in alkaline is used as a dispersant, the calcium phosphate is dissolved with an acid such as a hydrochloric acid, and washed with water to remove the calcium phosphate from the toner base particles. Besides the above-described method, the organic solvent can also be removed by an enzymatic hydrolysis.

5) A charge control agent is provided to the toner base particles, and inorganic fine particles such as silica fine particles and titanium oxide fine particles are added thereto to obtain toner. Known methods using a mixer or the like are used to provide the charge control agent and to add the inorganic fine particles.

Accordingly, toner having a smaller particle diameter and a sharper particle diameter distribution can be easily obtained. Furthermore, if emulsified dispersed reactant is intensively stirred during a removal process of organic solvent, it is possible to control the shape of toner between true spherical shape and spindle shape. Moreover, it is possible to control surface morphology between a smooth surface and a rough surface.

According to the present invention, an effect to realize a surface effect that provides high glossiness using a clear toner is achieved even in a case where a dot gain or a misregistration is caused in an image forming apparatus.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A print control device comprising:
    a color plane image data acquisition unit configured to acquire a color plane image data used in an image forming apparatus and indicating a color developer amount that indicates an amount of one or more color developers, and a region where the color developer amount is used;
    an inverse image data generating unit configured to calculate a value obtained by subtracting a total amount of the one or more color developers allocated to the region from a predetermined value based on the color plane image data, and, by using a calculated value as an amount of a transparent developer used in the image forming apparatus, to generate inverse image data indicating a transparent developer amount that indicates the amount of a transparent developer, and a region where the transparent developer amount is used;
    a storage unit storing a conversion table configured to convert a first transparent developer amount into a second transparent developer amount determined based on the first transparent developer amount and larger than the first transparent developer amount;
    a conversion unit configured to convert the transparent developer amount of the inverse image data into the transparent developer amount larger than the transparent developer amount by referring to the conversion table; and
    a transparent developer plane image data generating unit configured to generate transparent developer plane image data used in image formation of the transparent developer in the image forming apparatus based on the inverse image data indicating the transparent developer amount after the conversion by the conversion unit.

2. A print control device comprising:
    a color plane image data acquisition unit configured to acquire a color plane image data used in an image forming apparatus and indicating a color developer amount indicating an amount of one or more color developers with a multi value larger than a binary, and a region where the color developer amount is used;
    an inverse image data generating unit configured to calculate a value obtained by subtracting a total amount of one or more color developers allocated to the region from a predetermined value based on the color plane image data, and, by using a calculated value as an amount of a transparent developer used in the image forming apparatus, to generate inverse image data indicating an transparent developer amount that indicates the amount of a transparent developer, and a region where the transparent developer amount is used;
    a halftone processing unit configured to binarize the transparent developer amount indicated with the multi value in the inverse image data by halftone processing;
    an expansion processing unit configured to expand an area of a region designated to use the transparent developer by the halftone processing unit; and
    a transparent developer plane image data generating unit configured to generate transparent developer plane image data for forming an image of a transparent developer in the image forming apparatus based on the inverse image data after expanded by the expansion processing unit.

3. A print control method executed in a print control device that generates transparent developer plane image data used for image formation of a transparent developer in an image forming apparatus, and
    the print control device including
    a storage unit storing a conversion table configured to convert a first transparent developer amount that is an amount of a transparent developer used for image formation into a second transparent developer amount determined based on the first transparent developer amount and larger than the first transparent developer amount,
    the method comprising:
    acquiring color plane image data used in the image forming apparatus and indicating a color developer amount that indicates an amount of one or more color developers, and a region where the color developer amount is used;
    calculating a value obtained by subtracting a total amount of the one or more color developers allocated to the region from a predetermined value based on the color plane image data, and, by using a calculated value as an amount of a transparent developer used in the image forming apparatus, generating inverse image data indicating a transparent developer amount that indicates the amount of a transparent developer, and a region where the transparent developer amount is used;
    converting the transparent developer amount of the inverse image data into the transparent developer amount larger than the transparent developer amount by referring to the conversion table; and
    generating transparent developer plane image data used in image formation of the transparent developer in the image forming apparatus based on the inverse image data indicating the transparent developer amount after conversion by a conversion unit using the conversion table.

* * * * *